United States Patent
Bantu et al.

(10) Patent No.: US 9,914,789 B2
(45) Date of Patent: *Mar. 13, 2018

(54) ZIEGLER-NATTA CATALYST SYSTEMS COMPRISING A 1,2-PHENYLENEDIOATE AS INTERNAL DONOR AND PROCESS FOR PREPARING THE SAME

(71) Applicant: INDIAN OIL CORPORATION LIMITED, Mumbai, Maharashtra (IN)

(72) Inventors: Bhasker Bantu, Faridabad (IN); Gurmeet Singh, Faridabad (IN); Sukhdeep Kaur, Faridabad (IN); Naresh Kumar, Faridabad (IN); Gurpreet Singh Kapur, Faridabad (IN); Shashi Kant, Faridabad (IN); Ravinder Kumar Malhotra, Faridabad (IN)

(73) Assignee: INDIAN OIL CORPORATION LIMITED, Mumbai (IN)

( * ) Notice: Subject to any disclaimer, the term of this patent is extended or adjusted under 35 U.S.C. 154(b) by 0 days.

This patent is subject to a terminal disclaimer.

(21) Appl. No.: 15/233,895

(22) Filed: Aug. 10, 2016

(65) Prior Publication Data
US 2016/0347880 A1    Dec. 1, 2016

Related U.S. Application Data

(63) Continuation of application No. 14/414,401, filed as application No. PCT/IB2013/055742 on Jul. 12, 2013, now Pat. No. 9,593,172.

(30) Foreign Application Priority Data

Jul. 14, 2012  (IN) .......................... 2040/MUM/2012

(51) Int. Cl.
*C08F 110/00*    (2006.01)
*C08F 4/649*    (2006.01)
*C08F 10/00*    (2006.01)

(52) U.S. Cl.
CPC ............ *C08F 4/6494* (2013.01); *C08F 10/00* (2013.01); *C08F 110/00* (2013.01)

(58) Field of Classification Search
None
See application file for complete search history.

(56) References Cited

U.S. PATENT DOCUMENTS

| 4,952,649 A | 8/1990 | Kioka et al. |
| 9,593,172 B2 * | 3/2017 | Bantu .................... C08F 10/00 |
| 2012/0289669 A1 * | 11/2012 | Lim ...................... C08F 110/06 |
| | | 526/123.1 |
| 2015/0133289 A1 | 5/2015 | Mignogna et al. |

FOREIGN PATENT DOCUMENTS

| EP | 0553805 A1 * | 8/1993 | .............. C08F 10/00 |
| WO | 2010/078494 A2 | 7/2010 | |
| WO | 2011/068770 A1 | 6/2011 | |

OTHER PUBLICATIONS

Dashti et al., "Kinetic and morphological study of a magnesium ethoxide-based Ziegler-Natta catalyst for propylene polymerization," Polym. Int. 2009, 58: 40-45.*
ritten Opinion and International Search Report dated Nov. 25, 2013 in application no. PCT/IB20131055742.

* cited by examiner

*Primary Examiner* — Catherine S Branch
(74) *Attorney, Agent, or Firm* — Maschoff Brennan

(57) ABSTRACT

A catalyst composition for use as precursor for Ziegler-Natta catalyst system, said catalyst composition comprising a combination of magnesium moiety, titanium moiety and an internal donor containing at least one 1,2-phenylenedioate compound of structure (A). Also, the present invention provides a process for preparing the aforesaid catalyst composition. Further, the present invention provides a Ziegler-Natta catalyst system incorporating the aforesaid catalyst composition and a method for polymerizing and/or copolymerizing olefins using the Ziegler-Natta catalyst system.

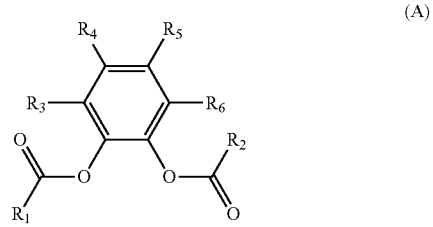

(A)

24 Claims, No Drawings

ZIEGLER-NATTA CATALYST SYSTEMS COMPRISING A 1,2-PHENYLENEDIOATE AS INTERNAL DONOR AND PROCESS FOR PREPARING THE SAME

CROSS REFERENCES TO RELATED APPLICATIONS

This application is a continuation of U.S. patent application Ser. No. 14/414,401, which is the U.S. national stage of International Application No. PCT/IB2013/055742, filed Jul. 12, 2013, which claims priority to India Patent Application No. 2040/MUM/2012, filed Jul. 14, 2012. The foregoing applications are incorporated herein by reference

FIELD OF THE INVENTION

The present invention relates to internal donors for Ziegler-Natta catalyst system. More particularly, the present invention relates to the usage of 1,2-phenylenedioates as internal donors and process for preparing the catalyst system thereof.

BACKGROUND OF THE INVENTION

Polyolefins have acquired a global status for itself in every field. The demand for polymers based on olefins has increased whether it is commodity or niche products. Ziegler-Natta catalyst is used, for example, in the synthesis of polymers of 1-alkenes (α-olefins).

Ziegler-Natta catalyst system typically consists of transition metal halide normally titanium halide supported on metal compound which is typically magnesium dihalide. Along with transition metal, also there is organic component known as internal electron donor, which has a typical role to play during catalyst synthesis and polymerization. The organic electron donors (Lewis base) that are being used as internal donors are organic compounds having oxygen, nitrogen, phosphorous and/or silicon components which may be in the form of acids, alcohols, esters, anhydrides, ketones etc. The current state of the art internal donors are organic compounds such as esters of phthalates, alkyl benzoate, succinates and 1,3-diethers which impart certain characteristics due to their chemical and electronic environment that enhances catalyst activity while imparting improved product properties like high melt flow index, good bulk density, narrow/broad molecular weight distributions and high isotacticity.

The role of internal donors in Ziegler-Natta catalyst is to stabilize the primary crystallites of magnesium dihalide which is generated in-situ. Apart from this, the internal donor also being better Lewis base have preferred coordination with the higher acidity coordination sites on magnesium dihalide matrix which in turn avoid the coordination of titanium and hence prevents the formation of inactive sites. They also increase the activity of low active sites.

The Ziegler-Natta catalyst system has gone through continual improvement in terms of better catalyst activity in olefin polymerization and at the same time production of polymer products having desirable properties with more simple and cleaner manner.

Production of polyolefins having desired properties like narrow MWD for non woven or broad MWD for pipe, blow molding and films, high isotacticity, better comonomer incorporation are always in demand. As there is a craving for better olefin product continual improvement in Ziegler-Natta catalyst system as well as polymerization processes is required.

SUMMARY OF THE INVENTION

The present invention provides an improved catalyst composition having internal donor compound containing at least one 1,2-phenylenedioate compound. The catalyst composition according to the present invention provides improved performance for the polymerization of olefin based polymers. The present invention also provides an improved catalyst system comprising a catalyst composition, organoaluminum compounds and external electron donors for polymerization of olefins.

DETAILED DESCRIPTION OF THE INVENTION

The "internal electron donor" is a compound that is added during the formation of catalyst composition where it is acting as Lewis base i.e. donating the electron pairs to the metal present in the catalyst composition. Not bounded by any particular theory, it is stated in literature that internal electron donor stabilizes the primary crystallites of magnesium dihalide which is generated in-situ. Apart from this, the internal donor also being better Lewis base have preferred coordination with the higher acidity coordination sites on magnesium dihalide matrix which in turn avoid the coordination of titanium and hence prevents the formation of inactive sites. They also increase the activity of low active sites. This in all enhances the catalyst stereoselectivity.

Once again, not bounded by any particular theory, it is believed that the 1,2-phenylenedioate compounds have such coordination sites that allows binding to both titanium and magnesium, both of which are typically present in the catalyst component of an olefin polymerization catalyst system. The 1,2-phenylenedioate compound acts as internal electron donor, owing to their chemical and electronic environment, in a solid catalyst component of an olefin polymerization catalyst system. Further the present invention provides a process of making the catalyst system and catalyst compositions. In addition, it provides a method of polymerizing and/or copolymerizing olefins using the catalyst system.

According to the present invention, the catalyst compositions having 1,2-phenylenedioates as internal donors are used to polymerize olefins and have moderate to high catalyst activity, low to high hydrogen response, low to high molecular weight distribution, high selectivity and better comonomer distribution.

According to the present invention, the catalyst composition comprises a combination of magnesium moiety, titanium moiety and an internal donor containing at least one 1,2-phenylenedioate compound. In particular, the catalyst composition comprises of magnesium moiety where it is in the form of magnesium dihalide which is preferably magnesium dichloride crystal lattice distorted as support or precursor for Ziegler-Natta catalysts.

The magnesium moiety used in the making of catalyst composition may be in the liquid or solid state. In one embodiment, the magnesium moiety can be anhydrous magnesium, halogen containing anhydrous magnesium compound, an alkylmagnesium halide compound, an alkoxy magnesium halide compound, an aryloxy magnesium halide compound, dialkoxymagnesium compound, an aryloxy magnesium compound, dialkylmagnesium compound, alcohol complexes of magnesium dihalide, and mixtures thereof.
a. Non limiting examples of halogen containing anhydrous magnesium compound being anhydrous magnesium chloride, anhydrous magnesium bromide, anhydrous magnesium fluoride and anhydrous magnesium iodide.
b. Non limiting examples of alkylmagnesium halide compound being methylmagnesium chloride, ethylmagnesium chloride, isopropylmagnesium chloride, isobutylmagnesium chloride, tert-butylmagnesium chloride, benzylmagnesium chloride, methylmagnesium bromide, ethylmagnesium bromide, isopropylmagnesium bromide, isobutylmagnesium bromide, tert-butylmagnesium bromide, hexylmagnesium bromide, benzylmagnesium bromide, methylmagnesium iodide, ethylmagnesium iodide, isopropylmagnesium iodide, isobutylmagnesium iodide, tert-butylmagnesium iodide and benzylmagnesium iodide.
c. Non limiting examples of alkoxy magnesium halide compound being methoxy magnesium chloride, ethoxy magnesium chloride, isopropoxy magnesium chloride, butoxy magnesium chloride and octoxy magnesium chloride.
d. Non limiting examples of aryloxy magnesium halide compound being phenoxy magnesium chloride and methyl phenoxy magnesium chloride.
e. Non limiting examples of dialkoxymagnesium compound being dimethoxymagnesium, diethoxymagnesium, dipropoxymagnesium, diisopropoxymagnesium, dibutoxymagnesium, and dioctoxymagnesium.
f. Non limiting examples of aryloxy magnesium compound being phenoxy magnesium and dimethylphenoxy magnesium.
g. Non limiting examples of dialkylmagnesium compound being dimethylmagnesium, diethylmagnesium, diisopropylmagnesium, dibutylmagnesium, dihexylmagnesium, dioctylmagnesium, ethylbutylmagnesium and butyloctylmagnesium;
h. Non limiting example of alcohol complex of magnesium dihalide being magnesium chloride.

In one embodiment, titanium moiety used in the making of catalyst composition may be titanium tetrahalide compound, alkoxytitanium trihalide compound, dialkoxy titanium dihalide compound, trialkoxytitanium monohalide compound, tetraalkoxytitanium compound, and mixtures thereof.
(a) Non limiting examples of titanium tetrahalide compound being titanium tetrachloride, titanium tetrabromide and titanium tetraiodide.
(b) Non limiting examples of alkoxytitanium trihalide compound being methoxytitanium trichloride, ethoxytitanium trichloride, butoxytitanium trichloride and phenoxytitanium trichloride.
(c) Non limiting example of dialkoxy titanium dihalide compound being diethoxy titanium dichloride.
(d) Non limiting example of trialkoxytitanium monohalide compound being triethoxy titanium chloride.
(e) Non limiting example of tetraalkoxytitanium compound being tetrabutoxy titanium and tetraethoxy titanium.

In particular, the catalyst composition comprises of titanium moiety where it is in the form of titanium in tetravalent state which is preferably titanium halide.

In a preferred embodiment, titanium tetrachloride being the preferred titanium compound.

According to the present invention 1,2-phenylenedioates used as internal donors for Ziegler-Natta catalysts has the following structure (A)

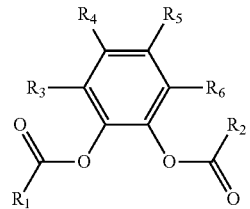

in which $R_1$-$R_6$ groups are equal or different from each other. Each of $R_1$-$R_6$ are selected from hydrogen, halogen, $C_1$-$C_{20}$ linear or branched alkyl group which can be linked with cyclic rings, $C_6$-$C_{14}$ aryl groups, $C_3$-$C_{15}$ cycloalkyl groups, $C_1$-$C_{20}$ alkoxy group, a heteroatom, arylalkyl or alkylaryl groups and combinations thereof.

Particularly, the structure (A) includes at least one of $R_3$-$R_6$ selected from hydrogen, halogen, $C_1$-$C_{20}$ linear or branched alkyl group which may be linked with cyclic ring, $C_6$-$C_{14}$ aryl groups, $C_3$-$C_{15}$ cycloalkyl groups, $C_1$-$C_{20}$ alkoxy group, a heteroatom, arylalkyl or alkylaryl groups and combinations thereof. Also, the structure (A) includes at least one of $R_1$-$R_2$ selected from hydrogen, halogen, $C_1$-$C_{20}$ linear or branched alkyl group which may be linked with cyclic ring, $C_3$-$C_{15}$ cycloalkyl groups, a heteroatom, arylalkyl or alkylaryl, alkylalkoxy or alkoxyalkyl, arylalkoxy or alkoxyaryl, alkylcycloalkyl or cycloalkylalkyl groups and combinations thereof. $R_1$-$R_2$ can be same or different.

Non-limiting examples of structure (A) are the following: 1,2-phenylene diacetate or 1,2-phenylene diethanoate, 1,2-phenylene dipropanoate, 1,2-phenylene dibutanoate, 1,2-phenylene dipentanoate, 1,2-phenylene dihexanoate, 1,2-phenylene diheptanoate, 1,2-phenylene dioctanoate, 1,2-phenylene dinonanoate, 1,2-phenylene didecanoate, 1,2-phenylene diundecanoate, 1,2-phenylene dipropionate, 2-(propionyloxy)phenyl butyrate, 2-(propionyloxy)phenyl pentanoate, 2-(propionyloxy)phenyl hexanoate, 2-(propionyloxy)phenyl heptanoate, 2-(propionyloxy)phenyl octanoate, 2-(propionyloxy)phenyl nonanoate, 2-(propionyloxy)phenyl decanoate, 2-(propionyloxy)phenyl undecanoate, 1,2-phenylene dibutyrate, 2-(butyryloxy)phenyl pentanoate, 2-(butyryloxy)phenyl hexanoate, 2-(butyryloxy)phenyl heptanoate, 2-(butyryloxy)phenyl octanoate, 2-(butyryloxy)phenyl nonanoate, 2-(butyryloxy)phenyl decanoate, 2-(butyryloxy)phenyl undecanoate, 1,2-phenylene dipentanoate, 2-(pentanoyloxy)phenyl hexanoate, 2-(pentanoyloxy)phenyl heptanoate, 2-(pentanoyloxy)phenyl octanoate, 2-(pentanoyloxy)phenyl nonanoate, 2-(pentanoyloxy)phenyl decanoate, 2-(pentanoyloxy)phenyl undecanoate, 1,2-phenylene dihexanoate, 2-(hexanoyloxy)phenyl heptanoate, 2-(hexanoyloxy)phenyl octanoate, 2-(hexanoyloxy)phenyl nonanoate, 2-(hexanoyloxy)phenyl decanoate, 2-(hexanoyloxy)phenyl undecanoate, 1,2-phenylene diheptanoate, 2-(heptanoyloxy)phenyl octanoate, 2-(heptanoyloxy)phenyl nonanoate, 2-(heptanoyloxy)phenyl decanoate, 2-(heptanoyloxy)phenyl undecanoate, 1,2-phenylene dioctanoate, 2-(octanoyloxy)phenyl nonanoate, 2-(octanoyloxy)phenyl decanoate, 2-(octanoyloxy)phenyl undecanoate, 1,2-phenylene dinonanoate, 2-(nonanoyloxy)phenyl decanoate, 2-(nonanoyloxy)phenyl undecanoate, 1,2-phenylene didecanoate, 2-(decanoyloxy)phenyl undecanoate, 1,2-phenylene diundecanoate, 2-acetoxyphenyl isobutyrate, 2-(propionyloxy)phenyl isobutyrate, 2-(isobutyryloxy)phenyl butyrate, 2-(isobutyryloxy)phenyl pentanoate, 2-(isobutyryloxy)phenyl hexanoate, 2-(isobutyryloxy)phenyl heptanoate, 2-(isobutyryloxy)phenyl octanoate, 2-(isobutyryloxy)phenyl nonanoate, 2-(isobutyryloxy)phenyl decanoate, 2-(isobutyryloxy)phenyl undecanoate, 1,2-phenylene diisobutyrate, 2-acetoxyphenyl 3-methylbutanoate, 2-(propionyloxy)phenyl 3-methylbutanoate, 2-(butyryloxy)phenyl 3-methylbutanoate, 2-(3-methylbutanoyloxy)phenyl pentanoate, 2-(3-methylbutanoyloxy)phenyl hexanoate, 2-(3-methylbutanoyloxy)phenyl heptanoate, 2-(3-methylbutanoyloxy)phenyl octanoate, 2-(3-methylbutanoyloxy)phenyl nonanoate, 2-(3-methylbutanoyloxy)phenyl decanoate, 2-(3-methylbutanoyloxy)phenyl undecanoate, 1,2-phenylene bis(3-methylbutanoate), 2-acetoxyphenyl 7-methyloctanoate, 2-(propionyloxy)phenyl 7-methyloctanoate, 2-(butyryloxy)phenyl 7-methyloctanoate, 2-(pentanoyloxy)phenyl 7-methyloctanoate, 2-(hexanoyloxy)phenyl 7-methyloctanoate, 2-(heptanoyloxy)phenyl 7-methyloctanoate, 2-(octanoyloxy)phenyl 7-methyloctanoate, 2-(7-methyloctanoyloxy)phenyl nonanoate, 2-(7-methyl octanoyl oxy)phenyl decanoate, 2-(7-methyloctanoyloxy)phenyl undecanoate, 1,2-phenylene bis(7-methyloctanoate), 2-acetoxyphenyl 8-methylnonanoate, 2-(propionyloxy)phenyl 8-methylnonanoate, 2-(butyryloxy)phenyl 8-methylnonanoate, 2-(pentanoyloxy)phenyl 8-methylnonanoate, 2-(hexanoyloxy)phenyl 8-methylnonanoate, 2-(heptanoyloxy)phenyl 8-methylnonanoate, 2-(octanoyloxy)phenyl 8-methylnonanoate, 2-(nonanoyloxy)phenyl 8-methylnonanoate, 2-(8-methylnonanoyloxy)phenyl decanoate, 2-(8-methylnonanoyloxy)phenyl undecanoate, 1,2-phenylene bis(8-methylnonanoate), 2-acetoxyphenyl 9-methyldecanoate, 2-(propionyloxy)phenyl 9-methyldecanoate, 2-(butyryloxy)phenyl 9-methyldecanoate, 2-(pentanoyloxy)phenyl 9-methyldecanoate, 2-(hexanoyloxy)phenyl 9-methyldecanoate, 2-(heptanoyloxy)phenyl 9-methyldecanoate, 2-(octanoyloxy)phenyl 9-methyldecanoate, 2-(nonanoyloxy)phenyl 9-methyldecanoate, 2-(decanoyloxy)phenyl 9-methyldecanoate, 2-(9-methyldecanoyloxy)phenyl undecanoate, 1,2-phenylene bis(9-methyldecanoate), 2-acetoxyphenyl 10-methylundecanoate, 2-(propionyloxy)phenyl 10-methylundecanoate, 2-(butyryloxy)phenyl 10-methylundecanoate, 2-(pentanoyloxy)phenyl 10-methylundecanoate, 2-(hexanoyloxy)phenyl 10-methylundecanoate, 2-(heptanoyloxy)phenyl 10-methylundecanoate, 2-(octanoyloxy)phenyl 10-methylundecanoate, 2-(nonanoyloxy)phenyl 10-methylundecanoate, 2-(decanoyloxy)phenyl 10-methylundecanoate, 2-(undecanoyloxy)phenyl 10-methylundecanoate, 1,2-phenylene bis(10-methylundecanoate), 2-acetoxyphenyl pivalate, 2-(propionyloxy)phenyl pivalate, 2-(pivaloyloxy)phenyl butyrate, 2-(pivaloyloxy)phenyl pentanoate, 2-(pivaloyloxy)phenyl hexanoate, 2-(pivaloyloxy)phenyl heptanoate, 2-(pivaloyloxy)phenyl octanoate, 2-(pivaloyloxy)phenyl nonanoate, 2-(pivaloyloxy)phenyl decanoate, 2-(pivaloyloxy)phenyl undecanoate, 1,2-phenylene dipivalate, 2-acetoxyphenyl 3,3-dimethylbutanoate, 2-(propionyloxy)phenyl 3,3-dimethylbutanoate, 2-(butyryloxy)phenyl 3,3-dimethylbutanoate, 2-(3,3-dimethylbutanoyloxy)phenyl pentanoate, 2-(3,3-dimethylbutanoyloxy)phenyl hexanoate, 2-(3,3-dimethylbutanoyloxy)phenyl heptanoate, 2-(3,3-dimethylbutanoyloxy)phenyl octanoate, 2-(3,3-dimethylbutanoyloxy)phenyl nonanoate, 2-(3,3-dimethylbutanoyloxy)phenyl decanoate, 2-(3,3-dimethylbutanoyloxy)phenyl undecanoate, 1,2-phenylene bis(3,3-dimethylbutanoate), 2-acetoxyphenyl 4,4-dimethylpentanoate, 2-(propionyloxy)phenyl 4,4-dimethylpentanoate, 2-(butyryloxy)phenyl 4,4-dimethylpentanoate, 2-(pentanoyloxy)phenyl 4,4-dimethylpentanoate, 2-(4,4-dimethylpentanoyloxy)phenyl hexanoate, 2-(4,4-dimethylpentanoyloxy)phenyl heptanoate, 2-(4,4-dimethylpentanoyloxy)phenyl octanoate, 2-(4,4-dimethylpentanoyloxy)phenyl nonanoate, 2-(4,4-dimethylpentanoyloxy)phenyl decanoate, 2-(4,4-dimethylpentanoyloxy)phenyl undecanoate, 1,2-phenylene bis(4,4-dimethylpentanoate), 2-acetoxyphenyl 5,5-dimethylhexanoate, 2-(propionyloxy)phenyl 5,5-dimethylhexanoate, 2-(butyryloxy)phenyl 5,5-dimethylhexanoate, 2-(pentanoyloxy)phenyl 5,5-dimethylhexanoate, 2-(hexanoyloxy)phenyl 5,5-dimethylhexanoate, 2-(5,5-dimethylhexanoyloxy)phenyl heptanoate, 2-(5,5-dimethylhexanoyloxy)phenyl octanoate, 2-(5,5-dimethylhexanoyloxy)phenyl nonanoate, 2-(5,5-dimethylhexanoyloxy)phenyl decanoate, 2-(5,5-dimethylhexanoyloxy)phenyl undecanoate, 1,2-phenylene bis(5,5-dimethylhexanoate), 2-acetoxyphenyl 6,6-dimethylheptanoate, 2-(propionyloxy)phenyl 6,6-dimethylheptanoate, 2-(butyryloxy)phenyl 6,6-dimethylheptanoate, 2-(pentanoyloxy)phenyl 6,6-dimethylheptanoate, 2-(hexanoyloxy)phenyl 6,6-dimethylheptanoate, 2-(heptanoyloxy)phenyl 6,6-dimethylheptanoate, 2-(6,6-dimethylheptanoyloxy)phenyl octanoate, 2-(6,6-dimethylheptanoyloxy)phenyl nonanoate, 2-(6,6-dimethylheptanoyloxy)phenyl decanoate, 2-(6,6-dimethylheptanoyloxy)phenyl undecanoate, 1,2-phenylene bis(6,6-dimethylheptanoate), 2-acetoxyphenyl 7,7-dimethyloctanoate, 2-(propionyloxy)phenyl 7,7-dimethyloctanoate, 2-(butyryloxy)phenyl 7,7-dimethyloctanoate, 2-(pentanoyloxy)phenyl 7,7-dimethyloctanoate, 2-(hexanoyloxy)phenyl 7,7-dimethyloctanoate, 2-(heptanoyloxy)phenyl 7,7-dimethyloctanoate, 2-(octanoyloxy)phenyl 7,7-dimethyloctanoate, 2-(7,7-dimethyloctanoyloxy)phenyl nonanoate, 2-(7,7-dimethyloctanoyloxy)phenyl decanoate, 2-(7,7-dimethyloctanoyloxy)phenyl undecanoate, 1,2-phenylene bis(7,7-dimethyloctanoate), 2-acetoxyphenyl 8,8-dimethylnonanoate, 2-(propionyloxy)phenyl 8,8-dimethylnonanoate, 2-(butyryloxy)phenyl 8,8-dimethylnonanoate, 2-(pentanoyloxy)phenyl 8,8-dimethylnonanoate, 2-(hexanoyloxy)phenyl 8,8-dimethylnonanoate, 2-(heptanoyloxy)phenyl 8,8-dimethylnonanoate, 2-(octanoyloxy)phenyl 8,8-dimethylnonanoate, 2-(nonanoyloxy)phenyl 8,8-dimethylnonanoate, 2-(8,8-dimethylnonanoyloxy)phenyl decanoate, 2-(8,8-dimethylnonanoyloxy)phenyl undecanoate, 1,2-phenylene bis(8,8-dimethylnonanoate), 2-acetoxyphenyl 9,9-dimethyldecanoate, 2-(propionyloxy)phenyl 9,9-dimethyldecanoate, 2-(butyryloxy)phenyl 9,9-dimethyldecanoate, 2-(pentanoyloxy)phenyl 9,9-dimethyldecanoate, 2-(hexanoyloxy)phenyl 9,9-dimethyldecanoate, 2-(heptanoyloxy)phenyl 9,9-dimethyldecanoate, 2-(octanoyloxy)phenyl 9,9-dimethyldecanoate, 2-(nonanoyloxy)phenyl 9,9-dimethyldecanoate, 2-(decanoyloxy)phenyl 9,9-dimethyldecanoate, 2-(9,9-dimethyldecanoyloxy)phenyl undecanoate, 1,2-phenylene bis(9,9-dimethyldecanoate), 2-acetoxyphenyl 10,10-dimethylundecanoate, 2-(propionyloxy)phenyl 10,10-dimethylundecanoate, 2-(butyryloxy)phenyl 10,10-dimethylundecanoate, 2-(pentanoyloxy)phenyl 10,10-dimethylundecanoate, 2-(hexanoyloxy)phenyl 10,10-dimethylundecanoate, 2-(heptanoyloxy)phenyl 10,10-dimethylundecanoate, 2-(octanoyloxy)phenyl 10,10-dimethylundecanoate, 2-(nonanoyloxy)phenyl 10,10-dimethylundecanoate, 2-(decanoyloxy)phenyl 10,10-dimethylundecanoate, 2-(undecanoyloxy)phenyl 10,10-dimethylundecanoate, 1,2-phenylene bis(10,10-dimethylundecanoate), 2-acetoxyphenyl 2-ethylbutanoate, 2-(propionyloxy)phenyl 2-ethylbutanoate, 2-(butyryloxy)phenyl 2-ethylbutanoate, 2-(2-ethylbutanoyloxy)phenyl pentanoate, 2-(2-ethylbutanoyloxy)phenyl hexanoate, 2-(2-ethylbutanoyloxy)phenyl heptanoate, 2-(2-ethylbutanoyloxy)phenyl octanoate, 2-(2-ethylbutanoyloxy)phenyl nonanoate, 2-(2-ethylbutanoyloxy)phenyl decanoate, 2-(2-ethylbutanoyloxy)phenyl undecanoate, 1,2-phenylene bis(2-ethylbutanoate), 2-acetoxyphenyl 3-ethylpentanoate, 2-(propionyloxy)phenyl 3-ethylpentanoate, 2-(butyryloxy)phenyl 3-ethylpentanoate, 2-(pentanoyloxy)phenyl 3-ethylpentanoate, 2-(3-ethylpentanoyloxy)phenyl hexanoate, 2-(3-ethyl pentanoyloxy)phenyl heptanoate, 2-(3-ethylpentanoyloxy)phenyl octanoate, 2-(3-ethyl pentanoyloxy)phenyl nonanoate, 2-(3-ethylpentanoyloxy)phenyl decanoate, 2-(3-ethyl pentanoyloxy)phenyl undecanoate, 1,2-phenylene bis (3-ethylpentanoate), 2-acetoxyphenyl 4-ethyl hexanoate, 2-(propionyloxy)phenyl 4-ethylhexanoate, 2-(butyryloxy)phenyl 4-ethylhexanoate, 2-(pentanoyloxy)phenyl 4-ethylhexanoate, 2-(hexanoyloxy)phenyl 4-ethylhexanoate, 2-(4-ethylhexanoyloxy)phenyl heptanoate, 2-(4-ethylhexanoyloxy)phenyl octanoate, 2-(4-ethylhexanoyloxy)phenyl nonanoate, 2-(4-ethylhexanoyloxy)phenyl decanoate, 2-(4-ethylhexanoyloxy)phenyl undecanoate, 1,2-phenylene bis (4-ethyl hexanoate), 2-acetoxyphenyl 6-ethyl octanoate, 2-(propionyloxy)phenyl 6-ethyl octanoate, 2-(butyryloxy)phenyl 6-ethyl octanoate, 2-(pentanoyloxy)phenyl 6-ethyloctanoate, 2-(hexanoyloxy)phenyl 6-ethyl octanoate, 2-(heptanoyloxy)phenyl 6-ethyloctanoate, 2-(octanoyloxy)phenyl 6-ethyl octanoate, 2-(6-ethyloctanoyloxy)phenyl nonanoate, 2-(6-ethyloctanoyloxy)phenyl decanoate, 2-(6-ethyloctanoyloxy)phenyl undecanoate, 1,2-phenylene bis(6-ethyl octanoate), 2-acetoxyphenyl 7-ethyl nonanoate, 2-(propionyloxy)phenyl 7-ethylnonanoate, 2-(butyryloxy)phenyl 7-ethylnonanoate, 2-(pentanoyloxy)phenyl 7-ethylnonanoate, 2-(hexanoyloxy)phenyl 7-ethylnonanoate, 2-(heptanoyloxy)phenyl 7-ethylnonanoate, 2-(octanoyloxy)phenyl 7-ethylnonanoate, 2-(nonanoyloxy)phenyl 7-ethylnonanoate, 2-(7-ethylnonanoyloxy)phenyl decanoate, 2-(7-ethylnonanoyloxy)phenyl undecanoate, 1,2-phenylene bis (7-ethylnonanoate), 2-acetoxyphenyl 8-ethyldecanoate, 2-(propionyloxy)phenyl 8-ethyldecanoate, 2-(butyryloxy)phenyl 8-ethyldecanoate, 2-(pentanoyloxy)phenyl 8-ethyldecanoate, 2-(hexanoyloxy)phenyl 8-ethyldecanoate, 2-(heptanoyloxy)phenyl 8-ethyldecanoate, 2-(octanoyloxy)phenyl 8-ethyldecanoate, 2-(nonanoyloxy)phenyl 8-ethyldecanoate, 2-(decanoyl oxy)phenyl 8-ethyldecanoate, 2-(8-ethyldecanoyloxy)phenyl undecanoate, 1,2-phenylene bis (8-ethyldecanoate), 2-acetoxyphenyl 9-ethylundecanoate, 2-(propionyloxy)phenyl 9-ethylundecanoate, 2-(butyryloxy)phenyl 9-ethylundecanoate, 2-(pentanoyloxy)phenyl 9-ethylundecanoate, 2-(hexanoyloxy)phenyl 9-ethylundecanoate, 2-(heptanoyloxy)phenyl 9-ethylundecanoate, 2-(octanoyloxy)phenyl 9-ethylundecanoate, 2-(nonanoyloxy)phenyl 9-ethylundecanoate, 2-(decanoyloxy)phenyl 9-ethylundecanoate, 1,2-phenylene bis(9-ethylundecanoate), 2-acetoxyphenyl 2-methylbutanoate, 2-(propionyloxy)phenyl 2-methylbutanoate, 2-(butyryloxy)phenyl 2-methylbutanoate, 2-(2-methylbutanoyloxy)phenyl pentanoate, 2-(2-methylbutanoyloxy)phenyl hexanoate, 2-(2-methylbutanoyloxy)phenyl heptanoate, 2-(2-methylbutanoyloxy)phenyl octanoate, 2-(2-methylbutanoyloxy)phenyl nonanoate, 2-(2-methylbutanoyloxy)phenyl decanoate, 2-(2-methylbutanoyloxy)phenyl undecanoate, 1,2-phenylene bis (2-methylbutanoate), 2-acetoxyphenyl 2-methylpentanoate, 2-(propionyloxy)phenyl 2-methylpentanoate, 2-(butyryloxy)phenyl 2-methylpentanoate, 2-(pentanoyloxy)phenyl 2-methylpentanoate, 2-(2-methylpentanoyloxy)phenyl hexanoate, 2-(2-methylpentanoyloxy)phenyl heptanoate, 2-(2-methylpentanoyloxy)phenyl octanoate, 2-(2-methylpentanoyloxy)phenyl nonanoate, 2-(2-methylpentanoyloxy) phenyl decanoate, 1,2-phenylene bis(2-methylpentanoate), 2-acetoxyphenyl 2-methylhexanoate, 2-(propionyloxy)phenyl 2-methylhexanoate, 2-(butyryloxy)phenyl 2-methylhexanoate, 2-(pentanoyloxy)phenyl 2-methylhexanoate, 2-(hexanoyloxy)phenyl 2-methylhexanoate, 2-(2-methylhexanoyloxy)phenyl heptanoate, 2-(2-methylhexanoyloxy) phenyl octanoate, 2-(2-methylhexanoyloxy)phenyl nonanoate, 2-(2-methylhexanoyloxy)phenyl decanoate, 2-(2-methylhexanoyloxy)phenyl undecanoate, 1,2-phenylene bis (2-methylhexanoate), 2-acetoxyphenyl 2-methylheptanoate, 2-(propionyloxy)phenyl 2-methylheptanoate, 2-(butyryloxy)phenyl 2-methylheptanoate, 2-(pentanoyloxy)phenyl 2-methylheptanoate, 2-(hexanoyloxy)phenyl 2-methylheptanoate, 2-(heptanoyloxy)phenyl 2-methylheptanoate, 2-(2-methylheptanoyloxy)phenyl octanoate, 2-(2-methylheptanoyloxy)phenyl nonanoate, 2-(2-methylheptanoyloxy) phenyl decanoate, 2-(2-methylheptanoyloxy)phenyl undecanoate, 1,2-phenylene bis(2-methylheptanoate), 2-acetoxyphenyl 2-methyloctanoate, 2-(propionyloxy)phenyl 2-methyloctanoate, 2-(butyryloxy)phenyl 2-methyloctanoate, 2-(pentanoyloxy)phenyl 2-methyloctanoate, 2-(hexanoyloxy)phenyl 2-methyloctanoate, 2-(heptanoyloxy)phenyl 2-methyloctanoate, 2-(octanoyloxy)phenyl 2-methyloctanoate, 2-(2-methyloctanoyloxy)phenyl nonanoate, 2-(2-methyloctanoyloxy)phenyl decanoate, 2-(2-methyloctanoyloxy)phenyl undecanoate, 1,2-phenylene bis (2-methyloctanoate), 2-acetoxyphenyl 2-methylnonanoate, 2-(propionyloxy)phenyl 2-methylnonanoate, 2-(butyryloxy) phenyl 2-methylnonanoate, 2-(pentanoyloxy)phenyl 2-methylnonanoate, 2-(hexanoyloxy)phenyl 2-methylnonanoate, 2-(heptanoyloxy)phenyl 2-methylnonanoate, 2-(octanoyloxy)phenyl 2-methylnonanoate, 2-(nonanoyloxy)phenyl 2-methylnonanoate, 2-(2-methylnonanoyloxy) phenyl decanoate, 2-(2-methylnonanoyloxy)phenyl undecanoate, 1,2-phenylene bis(2-methylnonanoate), 2-acetoxyphenyl 2-methyldecanoate, 2-(propionyloxy)phenyl 2-methyldecanoate, 2-(butyryloxy)phenyl 2-methyldecanoate, 2-(pentanoyloxy)phenyl 2-methyldecanoate, 2-(hexanoyloxy)phenyl 2-methyldecanoate, 2-(heptanoyloxy)phenyl 2-methyldecanoate, 2-(octanoyloxy)phenyl 2-methyldecanoate, 2-(nonanoyloxy)phenyl 2-melhyldecanoate, 2-(decanoyloxy)phenyl 2-methyldecanoate, 2-(2-methyldecanoyloxy)phenyl undecanoate, 1,2-phenylene bis (2-methyldecanoate), 2-acetoxyphenyl 2-propylpentanoate, 2-(propionyloxy)phenyl 2-propylpentanoate, 2-(butyryloxy) phenyl 2-propylpentanoate, 2-(pentanoyloxy)phenyl 2-propylpentanoate, 2-(2-propylpentanoyloxy)phenyl hexanoate, 2-(2-propylpentanoyloxy)phenyl heptanoate, 2-(2-propylpentanoyloxy)phenyl octanoate, 2-(2-propylpentanoyloxy) phenyl nonanoate, 2-(2-propylpentanoyloxy)phenyl decanoate, 2-(2-propylpentanoyloxy)phenyl undecanoate, 1,2-phenylene bis(2-propylpentanoate), 2-acetoxyphenyl 2-propylhexanoate, 2-(propionyloxy)phenyl 2-propylhexanoate, 2-(butyryloxy)phenyl 2-propylhexanoate, 2-(pentanoyloxy)phenyl 2-propylhexanoate, 2-(hexanoyloxy)phenyl 2-propylhexanoate, 2-(2-propylhexanoyloxy) phenyl heptanoate, 2-(2-propylhexanoyloxy)phenyl octanoate, 2-(2-propylhexanoyloxy)phenyl nonanoate, 2-(2-propylhexanoyloxy)phenyl decanoate, 2-(2-propylhexanoyloxy)phenyl undecanoate, 1,2-phenylene bis (2-propylhexanoate), 2-acetoxyphenyl 2-propylheptanoate, 2-(propionyloxy)phenyl 2-propylheptanoate, 2-(butyryloxy) phenyl 2-propylheptanoate, 2-(pentanoyloxy)phenyl 2-propylheptanoate, 2-(hexanoyloxy)phenyl 2-propylheptanoate, 2-(heptanoyloxy)phenyl 2-propylheptanoate, 2-(2-propylheptanoyloxy)phenyl octanoate, 2-(2-propylheptanoyloxy) phenyl nonanoate, 2-(2-propylheptanoyloxy)phenyl decanoate, 2-(2-propylheptanoyloxy)phenyl undecanoate, 1,2-phenylene bis(2-propylheptanoate), 2-acetoxyphenyl 2-propyloctanoate, 2-(propionyloxy)phenyl 2-propyloctanoate, 2-(butyryloxy)phenyl 2-propyloctanoate, 2-(pentanoyloxy)phenyl 2-propyloctanoate, 2-(hexanoyloxy)phenyl 2-propyloctanoate, 2-(heptanoyloxy)phenyl 2-propyloctanoate, 2-(octanoyloxy)phenyl 2-propyloctanoate, 2-(2-propyloctanoyloxy)phenyl nonanoate, 2-(2-propyloctanoyloxy)phenyl decanoate, 2-(2-propyloctanoyloxy)phenyl undecanoate, 1,2-phenylene bis(2-propyloctanoate), 2-acetoxyphenyl 2-propyl nonanoate, 2-(propionyloxy)phenyl 2-propyl nonanoate, 2-(butyryloxy)phenyl 2-propylhepanoate, 2-(pentanoyloxy)phenyl 2-propylhepanoate, 2-(hexanoyloxy)phenyl 2-propylhepanoate, 2-(heptanoyloxy)phenyl 2-propylhepanoate, 2-(octanoyloxy)phenyl 2-propylhepanoate, 2-(nonanoyloxy)phenyl 2-propylhepanoate, 2-((2-propylhepanoate)oxy)phenyl decanoate, 2-((2-propylhepanoate)oxy)phenyl undecanoate, 1,2-phenylene bis(2-propylhepanoate), 2-acetoxyphenyl 2-propyldecanoate, 2-(propionyloxy)phenyl 2-propyldecanoate, 2-(butyryloxy)phenyl 2-propyldecanoate, 2-(pentanoyloxy)phenyl 2-propyldecanoate, 2-(hexanoyloxy)phenyl 2-propyldecanoate, 2-(heptanoyloxy)phenyl 2-propyldecanoate, 2-(octanoyloxy)phenyl 2-propyldecanoate, 2-(nonanoyloxy)phenyl 2-propyldecanoate, 2-(decanoyloxy)phenyl 2-propyldecanoate, 1,2-phenylene bis(2-propyldecanoate), 2-acetoxyphenyl 2,3-dimethylbutanoate, 2-(propionyloxy)phenyl 2,3-dimethylbutanoate, 2-(butyryloxy)phenyl 2,3-dimethylbutanoate, 2-(2,3-dimethylbutanoyloxy)phenyl pentanoate, 2-(2,3-dimethylbutanoyloxy)phenyl hexanoate, 2-(2,3-dimethylbutanoyloxy)phenyl heptanoate, 2-(2,3-dimethylbutanoyloxy)phenyl octanoate, 2-(2,3-dimethylbutanoyloxy)phenyl nonanoate, 2-(2,3-dimethylbutanoyloxy)phenyl decanoate, 2-(2,3-dimethylbutanoyloxy)phenyl undecanoate, 1,2-phenylene bis(2,3-dimethylbutanoate), 1,2-phenylene diisopropanoate, 1,2-phenylene diisobutanoate, 1,2-phenylene di t-butanoate, 1,2-phenylene diisopentanoate, 1,2-phenylene dicyclopropyloate, 1,2-phenylene dicyclobutyloate, 1,2-phenylene dicyclopentyloate, 1,2-phenylene dicyclohexyloate, 1,2-phenylene dicycloheptyloate, 1,2-phenylene dicyclooctyloate, 1,2-phenylene bis(4-methylpentanoate), 1,2-phenylene bis(5-methylhexanoate), 1,2-phenylene bis(6-methylheptanoate), 1,2-phenylene bis(7-methyloctanoate), 1,2-phenylene bis(8-methylnonanoate), 1,2-phenylene bis(9-methyldecanoate), 1,2-phenylene bis(10-methylundecanoate), 1,2-phenylene bis(6,6-dimethylheptanoate), 2-acetoxyphenyl propaonate, 2-acetoxyphenyl butyrate, 2-acetoxyphenyl pentanoate, 2-acetoxyphenyl heptanoate, 2-acetoxyphenyl octanoate, 2-acetoxyphenyl nonanoate, 2-acetoxyphenyl decanoate, 2-acetoxyphenyl undecanoate, 2-(isobutyryloxy)phenyl acetate, 2-(isobutyryloxy)phenyl propionate, 2-(isobutyryloxy)phenyl benzoate, 2-(isobutyryloxy)phenyl isopropionate, 2-(isobutyryloxy)phenyl isobutyrate, 2-(isobutyryloxy)phenyl isopentanoate, 2-(isobutyryloxy)phenyl isohexanoate, 2-(isobutyryloxy)phenyl isoheptanoate, 2-(isobutyryloxy)phenyl isooctanoate, 2-(isobutyryloxy)phenyl isononanoate, 2-(isobutyryloxy)phenyl isodecanoate, 2-(isobutyryloxy)phenyl isoundecanoate, 2-acetoxyphenyl 4-methylpentanoate, 2-(propionyloxy)phenyl 4-methylpentanoate, 2-(butyryloxy)phenyl 4-methylpentanoate, 2-(pentanoyloxy)phenyl 4-methylpentanoate, 2-(4-methylpentanoyloxy)phenyl hexanoate, 2-(4-methylpentanoyloxy)phenyl heptanoate, 2-(4-methylpentanoyloxy)phenyl octanoate, 2-(4-methylpentanoyloxy)phenyl nonanoate, 2-(4-methylpentanoyloxy)phenyl decanoate, 2-(4-methylpentanoyloxy)phenyl undecanoate, 2-acetoxyphenyl 5-methylhexanoate, 2-(propionyloxy)phenyl 5-methylhexanoate, 2-(butyryloxy)phenyl 5-methylhexanoate, 2-(pentanoyloxy)phenyl 5-methylhexanoate, 2-(hexanoyloxy)phenyl 5-methylhexanoate, 2-(5-methylhexanoyloxy)phenyl heptanoate, 2-(5-methylhexanoyloxy)phenyl octanoate, 2-(5-methylhexanoyloxy)phenyl nonanoate, 2-(5-methylhexanoyloxy)phenyl decanoate, 2-(5-methylhexanoyloxy)phenyl undecanoate, 2-acetoxyphenyl 6-methylheptanoate, 2-(propionyloxy)phenyl 6-methylheptanoate, 2-(butyryloxy)phenyl 6-methylheptanoate, 2-(pentanoyloxy)phenyl 6-methylheptanoate, 2-(hexanoyloxy)phenyl 6-methylheptanoate, 2-(heptanoyloxy)phenyl 6-methylheptanoate, 2-(6-methylheptanoyloxy)phenyl octanoate, 2-(6-methylheptanoyloxy)phenyl nonanoate, 2-(6-methylheptanoyloxy)phenyl decanoate, 2-(6-methylheptanoyloxy)phenyl undecanoate, 2-acetoxyphenyl 9-ethylundecanoate, 2-(propionyloxy)phenyl 9-ethylundecanoate, 2-(butyryloxy)phenyl 9-ethylundecanoate, 2-(pentanoyloxy)phenyl 9-ethylundecanoate, 2-(hexanoyloxy)phenyl 9-ethylundecanoate, 2-(heptanoyloxy)phenyl 9-ethylundecanoate, 2-(octanoyloxy)phenyl 9-ethylundecanoate, 2-(nonanoyloxy)phenyl 9-ethylundecanoate, 2-(decanoyloxy)phenyl 9-ethylundecanoate, 4-chloro-1,2-phenylene diacetate, 4-bromo-1,2-phenylene diacetate, 4-fluro-1,2-phenylene diacetate, 4-iodo-1,2-phenylene diacetate, 4-methyl-1,2-phenylene diacetate, 4-ethyl-1,2-phenylene diacetate, 4-butyl-1,2-phenylene diacetate, 4-isobutyl-1,2-phenylene diacetate, 4-tert-butyl-1,2-phenylene diacetate, 4-isopropyl-1,2-phenylene diacetate, 4-pentyl-1,2-phenylene diacetate, 4-isopentyl-1,2-phenylene diacetate, 4-hexyl-1,2-phenylene diacetate, 4-heptyl-1,2-phenylene diacetate, 4-octyl-1,2-phenylene diacetate, 4-nonyl-1,2-phenylene diacetate, 4-decyl-1,2-phenylene diacetate, 4-dodecyl-1,2-phenylene diacetate, 4-methoxy-1,2-phenylene diacetate, 4-ethoxy-1,2-phenylene diacetate, 4-propoxy-1,2-phenylene diacetate, 4-isopropoxy-1,2-phenylene diacetate, 4-butoxy-1,2-phenylene diacetate, 4-isobutoxy-1,2-phenylene diacetate, 4-tert-butoxy-1,2-phenylene diacetate, 4-pentoxy-1,2-phenylene diacetate, 4-hexoxy-1,2-phenylene diacetate, 4-heptoxy-1,2-phenylene diacetate, 4-octoxy-1,2-phenylene diacetate, 4-nonoxy-1,2-phenylene diacetate, 4-decoxy-1,2-phenylene diacetate, 4-phenoxy-1,2-phenylene diacetate, 4-chloro-1,2-phenylene diisopropanoate, 4-bromo-1,2-phenylene diisopropanoate, 4-fluro-1,2-phenylene diisopropanoate, 4-iodo-1,2-phenylene diisopropanoate, 4-methyl-1,2-phenylene diisopropanoate, 4-ethyl-1,2-phenylene diisopropanoate, 4-butyl-1,2-phenylene diisopropanoate, 4-isobutyl-1,2-phenylene diisopropanoate, 4-tert-butyl-1,2-phenylene diisopropanoate, 4-isopropyl-1,2-phenylene diisopropanoate, 4-pentyl-1,2-phenylene diisopropanoate, 4-isopentyl-1,2-phenylene diisopropanoate 4-hexyl-1,2-phenylene diisopropanoate, 4-heptyl-1,2-phenylene diisopropanoate, 4-octyl-1,2-phenylene diisopropanoate, 4-nonyl-1,2-phenylene diisopropanoate, 4-decyl-1,2-phenylene diisopropanoate, 4-dodecyl-1,2-phenylene diisopropanoate, 4-methoxy-1,2-phenylene diisopropanoate 4-ethoxy-1,2-phenylene diisopropanoate, 4-propoxy-1,2-phenylene diisopropanoate, 4-isopropoxy-1,2-phenylene diisopropanoate, 4-butoxy-1,2-phenylene diisopropanoate, 4-isobutoxy-1,2-phenylene diisopropanoate, 4-tert-butoxy-1,2-phenylene dipropaonate, 4-pentoxy-1,2-phenylene diisopropanoate, 4-hexoxy-1,2-phenylene diisopropanoate, 4-heptoxy-1,2-phenylene diisopropanoate, 4-octoxy-1,2-phenylene diisopropanoate, 4-nonoxy-1,2-phenylene diisopropanoate, 4-decoxy-1,2-phenylene diisopropanoate, 4-phenoxy-1,2-phenylene diisopropanoate, 4-chloro-1,2-phenylene diisopropanoate, 4-bromo-1,2-phenylene diisopropanoate, 4-fluro-1,2-phenylene diisopropanoate, 4-iodo-1,2-phenylene diisopropanoate, 4-methyl-1,2-phenylene diisopropanoate, 4-ethyl-1,2-phenylene diisopropanoate, 4-butyl-1,2-phenylene diisopropanoate, 4-isobutyl-1,2-phenylene diisopropanoate, 4-tert-butyl-1,2-phenylene diisopropanoate, 4-isopropyl-1,2-phenylene diisopropanoate, 4-pentyl-1,2-phenylene diisopropanoate, 4-isopentyl-1,2-phenylene diisopropanoate, 4-hexyl-1,2-phenylene diisopropanoate, 4-heptyl-1,2-phenylene diisopropanoate, 4-octyl-1,2-phenylene diisopropanoate, 4-nonyl-1,2-phenylene diisopropanoate, 4-decyl-1,2-phenylene diisopropanoate, 4-dodecyl-1,2-phenylene diisopropanoate, 4-methoxy-1,2-phenylene diisopropanoate, 4-ethoxy-1,2-phenylene diisopropanoate, 4-propoxy-1,2-phenylene diisopropanoate, 4-isopropoxy-1,2-phenylene diisopropanoate, 4-butoxy-1,2-phenylene diisopropanoate, 4-isobutoxy-1,2-phenylene diisopropanoate, 4-tert-butoxy-1,2-phenylene diisopropanoate, 4-pentoxy-1,2-phenylene diisopropanoate, 4-hexoxy-1,2-phenylene diisopropanoate, 4-heptoxy-1,2-phenylene diisopropanoate, 4-octoxy-1,2-phenylene diisopropanoate, 4-nonoxy-1,2-phenylene diisopropanoate, 4-decoxy-1,2-phenylene diisopropanoate, 4-phenoxy-1,2-phenylene diisopropanoate, 4-chloro-1,2-phenylene dibutanoate, 4-bromo-1,2-phenylene dibutanoate, 4-fluro-1,2-phenylene dibutanoate, 4-iodo-1,2-phenylene dibutanoate, 4-methyl-1,2-phenylene dibutanoate, 4-ethyl-1,2-phenylene dibutanoate, 4-butyl-1,2-phenylene dibutanoate, 4-isobutyl-1,2-phenylene dibutanoate, 4-tert-butyl-1,2-phenylene dibutanoate, 4-isopropyl-1,2-phenylene dibutanoate, 4-pentyl-1,2-phenylene dibutanoate, 4-isopentyl-1,2-phenylene dibutanoate, 4-hexyl-1,2-phenylene dibutanoate, 4-heptyl-1,2-phenylene dibutanoate, 4-octyl-1,2-phenylene dibutanoate, 4-nonyl-1,2-phenylene dibutanoate, 4-decyl-1,2-phenylene dibutanoate, 4-dodecyl-1,2-phenylene dibutanoate, 4-methoxy-1,2-phenylene dibutanoate, 4-ethoxy-1,2-phenylene dibutanoate, 4-propoxy-1,2-phenylene dibutanoate, 4-isopropoxy-1,2-phenylene dibutanoate, 4-butoxy-1,2-phenylene dibutanoate, 4-isobutoxy-1,2-phenylene dibutanoate, 4-tert-butoxy-1,2-phenylene dibutanoate, 4-pentoxy-1,2-phenylene dibutanoate, 4-hexoxy-1,2-phenylene dibutanoate, 4-heptoxy-1,2-phenylene dibutanoate, 4-octoxy-1,2-phenylene dibutanoate, 4-nonoxy-1,2-phenylene dibutanoate, 4-decoxy-1,2-phenylene dibutanoate, 4-phenoxy-1,2-phenylene dibutanoate, 4-chloro-1,2-phenylene diisobutanoate, 4-bromo-1,2-phenylene diisobutanoate, 4-fluro-1,2-phenylene diisobutanoate, 4-iodo-1,2-phenylene diisobutanoate, 4-methyl-1,2-phenylene diisobutanoate, 4-ethyl-1,2-phenylene diisobutanoate, 4-butyl-1,2-phenylene diisobutanoate, 4-isobutyl-1,2-phenylene diisobutanoate, 4-tert-butyl-1,2-phenylene diisobutanoate, 4-isopropyl-1,2-phenylene diisobutanoate, 4-pentyl-1,2-phenylene diisobutanoate, 4-isopentyl-1,2-phenylene diisobutanoate, 4-hexyl-1,2-phenylene diisobutanoate, 4-heptyl-1,2-phenylene diisobutanoate, 4-octyl-1,2-phenylene diisobutanoate, 4-nonyl-1,2-phenylene diisobutanoate, 4-decyl-1,2-phenylene diisobutanoate, 4-dodecyl-1,2-phenylene diisobutanoate, 4-methoxy-1,2-phenylene diisobutanoate, 4-ethoxy-1,2-phenylene diisobutanoate, 4-propoxy-1,2-phenylene diisobutanoate, 4-isopropoxy-1,2-phenylene diisobutanoate, 4-butoxy-1,2-phenylene diisobutanoate, 4-isobutoxy-1,2-phenylene diisobutanoate, 4-tert-butoxy-1,2-phenylene diisobutanoate, 4-pentoxy-1,2-phenylene diisobutanoate, 4-hexoxy-1,2-phenylene diisobutanoate, 4-heptoxy-1,2-phenylene diisobutanoate, 4-octoxy-1,2-phenylene diisobutanoate, 4-nonoxy-1,2-phenylene diisobutanoate, 4-decoxy-1,2-phenylene diisobutanoate, 4-phenoxy-1,2-phenylene diisobutanoate, 4-chloro-1,2-phenylene di-tert-butanoate, 4-bromo-1,2-phenylene di-tert-butanoate, 4-fluro-1,2-phenylene di-tert-butanoate, 4-iodo-1,2-phenylene di-tert-butanoate, 4-methyl-1,2-phenylene di-tert-butanoate, 4-ethyl-1,2-phenylene di-tert-butanoate, 4-butyl-1,2-phenylene di-tert-butanoate, 4-isobutyl-1,2-phenylene di-tert-butanoate, 4-tert-butyl-1,2-phenylene di-tert-butanoate, 4-isopropyl-1,2-phenylene di-tert-butanoate, 4-pentyl-1,2-phenylene di-tert-butanoate, 4-isopentyl-1,2-phenylene di-tert-butanoate, 4-hexyl-1,2-phenylene di-tert-butanoate, 4-heptyl-1,2-phenylene di-tert-butanoate, 4-octyl-1,2-phenylene di-tert-butanoate, 4-nonyl-1,2-phenylene di-tert-butanoate, 4-decyl-1,2-phenylene di-tert-butanoate, 4-dodecyl-1,2-phenylene di-tert-butanoate, 4-methoxy-1,2-phenylene di-tert-butanoate, 4-ethoxy-1,2-phenylene di-tert-butanoate, 4-propoxy-1,2-phenylene di-tert-butanoate, 4-isopropoxy-1,2-phenylene di-tert-butanoate, 4-butoxy-1,2-phenylene di-tert-butanoate, 4-isobutoxy-1,2-phenylene di-tert-butanoate, 4-t-butoxy-1,2-phenylene di-tert-butanoate, 4-pentoxy-1,2-phenylene di-tert-butanoate, 4-hexoxy-1,2-phenylene di-tert-butanoate, 4-heptoxy-1,2-phenylene di-tert-butanoate, 4-octoxy-1,2-phenylene di-tert-butanoate, 4-nonoxy-1,2-phenylene di-tert-butanoate, 4-decoxy-1,2-phenylene di-tert-butanoate, 4-phenoxy-1,2-phenylene di-tert-butanoate, 4-chloro-1,2-phenylene dipentanoate, 4-bromo-1,2-phenylene dipentanoate, 4-fluro-1,2-phenylene dipentanoate, 4-iodo-1,2-phenylene dipentanoate, 4-methyl-1,2-phenylene dipentanoate, 4-ethyl-1,2-phenylene dipentanoate, 4-butyl-1,2-phenylene dipentanoate, 4-isobutyl-1,2-phenylene dipentanoate, 4-tert-butyl-1,2-phenylene dipentanoate, 4-isopropyl-1,2-phenylene dipentanoate, 4-pentyl-1,2-phenylene dipentanoate, 4-isopentyl-1,2-phenylene dipentanoate, 4-hexyl-1,2-phenylene dipentanoate, 4-heptyl-1,2-phenylene dipentanoate, 4-octyl-1,2-phenylene dipentanoate, 4-nonyl-1,2-phenylene dipentanoate, 4-decyl-1,2-phenylene dipentanoate, 4-dodecyl-1,2-phenylene dipentanoate, 4-methoxy-1,2-phenylene dipentanoate, 4-ethoxy-1,2-phenylene dipentanoate, 4-propoxy-1,2-phenylene dipentanoate, 4-isopropoxy-1,2-phenylene dipentanoate, 4-butoxy-1,2-phenylene dipentanoate, 4-isobutoxy-1,2-phenylene dipentanoate, 4-tert-butoxy-1,2-phenylene dipentanoate, 4-pentoxy-1,2-phenylene dipentanoate, 4-hexoxy-1,2-phenylene dipentanoate, 4-heptoxy-1,2-phenylene dipentanoate, 4-octoxy-1,2-phenylene dipentanoate, 4-nonoxy-1,2-phenylene dipentanoate, 4-decoxy-1,2-phenylene dipentanoate, 4-phenoxy-1,2-phenylene dipentanoate, 4-chloro-1,2-phenylene disoipentanoate, 4-bromo-1,2-phenylene disoipentanoate, 4-fluro-1,2-phenylene disoipentanoate, 4-iodo-1,2-phenylene disoipentanoate, 4-methyl-1,2-phenylene disoipentanoate, 4-ethyl-1,2-phenylene disoipentanoate, 4-butyl-1,2-phenylene disoipentanoate, 4-isobutyl-1,2-phenylene disoipentanoate, 4-tert-butyl-1,2-phenylene disoipentanoate, 4-isopropyl-1,2-phenylene disoipentanoate, 4-pentyl-1,2-phenylene disoipentanoate, 4-isopentyl-1,2-phenylene disoipentanoate, 4-hexyl-1,2-phenylene disoipentanoate, 4-heptyl-1,2-phenylene disoipentanoate, 4-octyl-1,2-phenylene disoipentanoate, 4-nonyl-1,2-phenylene disoipentanoate, 4-decyl-1,2-phenylene disoipentanoate, 4-dodecyl-1,2-phenylene disoipentanoate, 4-methoxy-1,2-phenylene diisopentanoate, 4-ethoxy-1,2-phenylene disoipentanoate, 4-propoxy-1,2-phenylene disoipentanoate, 4-isopropoxy-1,2-phenylene disoipentanoate, 4-butoxy-1,2-phenylene disoipentanoate, 4-isobutoxy-1,2-phenylene disoipentanoate, 4-tert-butoxy-1,2-phenylene disoipentanoate, 4-pentoxy-1,2-phenylene disoipentanoate, 4-hexoxy-1,2-phenylene disoipentanoate, 4-heptoxy-1,2-phenylene disoipentanoate, 4-octoxy-1,2-phenylene disoipentanoate, 4-nonoxy-1,2-phenylene disoipentanoate, 4-decoxy-1,2-phenylene disoipentanoate, 4-phenoxy-1,2-phenylene disoipentanoate, 4-chloro-1,2-phenylene dihexanoate, 4-bromo-1,2-phenylene dihexanoate, 4-fluro-1,2-phenylene dihexanoate, 4-iodo-1,2-phenylene dihexanoate, 4-methyl-1,2-phenylene dihexanoate, 4-ethyl-1,2-phenylene dihexanoate, 4-butyl-1,2-phenylene dihexanoate, 4-isobutyl-1,2-phenylene dihexanoate, 4-tert-butyl-1,2-phenylene dihexanoate, 4-isopropyl-1,2-phenylene dihexanoate, 4-pentyl-1,2-phenylene dihexanoate, 4-isopentyl-1,2-phenylene dihexanoate, 4-hexyl-1,2-phenylene dihexanoate, 4-heptyl-1,2-phenylene dihexanoate, 4-octyl-1,2-phenylene dihexanoate, 4-nonyl-1,2-phenylene dihexanoate, 4-decyl-1,2-phenylene dihexanoate, 4-dodecyl-1,2-phenylene dihexanoate, 4-methoxy-1,2-phenylene dihexanoate, 4-ethoxy-1,2-phenylene dihexanoate, 4-propoxy-1,2-phenylene dihexanoate, 4-isopropoxy-1,2-phenylene dihexanoate, 4-butoxy-1,2-phenylene dihexanoate, 4-isobutoxy-1,2-phenylene dihexanoate, 4-tert-butoxy-1,2-phenylene dihexanoate, 4-pentoxy-1,2-phenylene dihexanoate, 4-hexoxy-1,2-phenylene dihexanoate, 4-heptoxy-1,2-phenylene dihexanoate, 4-octoxy-1,2-phenylene dihexanoate, 4-nonoxy-1,2-phenylene dihexanoate, 4-decoxy-1,2-phenylene dihexanoate, 4-phenoxy-1,2-phenylene dihexanoate, 4-chloro-1,2-phenylene diisohexanoate, 4-bromo-1,2-phenylene diisohexanoate, 4-fluro-1,2-phenylene diisohexanoate, 4-iodo-1,2-phenylene diisohexanoate, 4-methyl-1,2-phenylene diisohexanoate, 4-ethyl-1,2-phenylene diisohexanoate, 4-butyl-1,2-phenylene diisohexanoate, 4-isobutyl-1,2-phenylene diisohexanoate, 4-tert-butyl-1,2-phenylene diisohexanoate, 4-isopropyl-1,2-phenylene diisohexanoate, 4-pentyl-1,2-phenylene diisohexanoate, 4-isopentyl-1,2-phenylene diisohexanoate, 4-hexyl-1,2-phenylene diisohexanoate, 4-heptyl-1,2-phenylene diisohexanoate, 4-octyl-1,2-phenylene diisohexanoate, 4-nonyl-1,2-phenylene diisohexanoate, 4-decyl-1,2-phenylene diisohexanoate, 4-dodecyl-1,2-phenylene diisohexanoate, 4-methoxy-1,2-phenylene diisohexanoate, 4-ethoxy-1,2-phenylene diisohexanoate, 4-propoxy-1,2-phenylene diisohexanoate, 4-isopropoxy-1,2-phenylene diisohexanoate, 4-butoxy-1,2-phenylene diisohexanoate, 4-isobutoxy-1,2-phenylene diisohexanoate, 4-tert-butoxy-1,2-phenylene diisohexanoate, 4-pentoxy-1,2-phenylene diisohexanoate, 4-hexoxy-1,2-phenylene diisohexanoate, 4-heptoxy-1,2-phenylene diisohexanoate, 4-octoxy-1,2-phenylene diisohexanoate, 4-nonoxy-1,2-phenylene diisohexanoate, 4-decoxy-1,2-phenylene diisohexanoate, 4-phenoxy-1,2-phenylene diisohexanoate, 4-chloro-1,2-phenylene diheptanoate, 4-bromo-1,2-phenylene diheptanoate, 4-fluro-1,2-phenylene diheptanoate, 4-iodo-1,2-phenylene diheptanoate, 4-methyl-1,2-phenylene diheptanoate, 4-ethyl-1,2-phenylene diheptanoate, 4-butyl-1,2-phenylene diheptanoate, 4-isobutyl-1,2-phenylene diheptanoate, 4-tert-butyl-1,2-phenylene diheptanoate, 4-isopropyl-1,2-phenylene diheptanoate, 4-pentyl-1,2-phenylene diheptanoate, 4-isopentyl-1,2-phenylene diheptanoate, 4-hexyl-1,2-phenylene diheptanoate, 4-heptyl-1,2-phenylene diheptanoate, 4-octyl-1,2-phenylene diheptanoate, 4-nonyl-1,2-phenylene diheptanoate, 4-decyl-1,2-phenylene diheptanoate, 4-dodecyl-1,2-phenylene diheptanoate, 4-methoxy-1,2-phenylene diheptanoate, 4-ethoxy-1,2-phenylene diheptanoate, 4-propoxy-1,2-phenylene diheptanoate, 4-isopropoxy-1,2-phenylene diheptanoate, 4-butoxy-1,2-phenylene diheptanoate, 4-isobutoxy-1,2-phenylene diheptanoate, 4-tert-butoxy-1,2-phenylene diheptanoate, 4-pentoxy-1,2-phenylene diheptanoate, 4-hexoxy-1,2-phenylene diheptanoate, 4-heptoxy-1,2-phenylene diheptanoate, 4-octoxy-1,2-phenylene diheptanoate, 4-nonoxy-1,2-phenylene diheptanoate, 4-decoxy-1,2-phenylene diheptanoate, 4-phenoxy-1,2-phenylene diheptanoate, 4-chloro-1,2-phenylene diisoheptanoate, 4-bromo-1,2-phenylene diisoheptanoate, 4-fluro-1,2-phenylene diisoheptanoate, 4-iodo-1,2-phenylene diisoheptanoate, 4-methyl-1,2-phenylene diisoheptanoate, 4-ethyl-1,2-phenylene diisoheptanoate, 4-butyl-1,2-phenylene diisoheptanoate, 4-isobutyl-1,2-phenylene diisoheptanoate, 4-tert-butyl-1,2-phenylene diisoheptanoate, 4-isopropyl-1,2-phenylene diisoheptanoate, 4-pentyl-1,2-phenylene diisoheptanoate, 4-isopentyl-1,2-phenylene diisoheptanoate, 4-hexyl-1,2-phenylene diisoheptanoate, 4-heptyl-1,2-phenylene diisoheptanoate, 4-octyl-1,2-phenylene diisoheptanoate, 4-nonyl-1,2-phenylene diisoheptanoate, 4-decyl-1,2-phenylene diisoheptanoate, 4-dodecyl-1,2-phenylene diisoheptanoate, 4-methoxy-1,2-phenylene diisoheptanoate, 4-ethoxy-1,2-phenylene diisoheptanoate, 4-propoxy-1,2-phenylene diisoheptanoate, 4-isopropoxy-1,2-phenylene diisoheptanoate, 4-butoxy-1,2-phenylene diisoheptanoate, 4-isobutoxy-1,2-phenylene diisoheptanoate, 4-tert-butoxy-1,2-phenylene diisoheptanoate, 4-pentoxy-1,2-phenylene diisoheptanoate, 4-hexoxy-1,2-phenylene diisoheptanoate, 4-heptoxy-1,2-phenylene diisoheptanoate, 4-octoxy-1,2-phenylene diisoheptanoate, 4-nonoxy-1,2-phenylene diisoheptanoate, 4-decoxy-1,2-phenylene diisoheptanoate, 4-phenoxy-1,2-phenylene diisoheptanoate, 4-chloro-1,2-phenylene dioctanoate, 4-bromo-1,2-phenylene dioctanoate, 4-fluro-1,2-phenylene dioctanoate, 4-iodo-1,2-phenylene dioctanoate, 4-methyl-1,2-phenylene dioctanoate, 4-ethyl-1,2-phenylene dioctanoate, 4-butyl-1,2-phenylene dioctanoate, 4-isobutyl-1,2-phenylene dioctanoate, 4-tert-butyl-1,2-phenylene dioctanoate, 4-isopropyl-1,2-phenylene dioctanoate, 4-pentyl-1,2-phenylene dioctanoate, 4-isopentyl-1,2-phenylene dioctanoate, 4-hexyl-1,2-phenylene dioctanoate, 4-heptyl-1,2-phenylene dioctanoate, 4-octyl-1,2-phenylene dioctanoate, 4-nonyl-1,2-phenylene dioctanoate, 4-decyl-1,2-phenylene dioctanoate, 4-dodecyl-1,2-phenylene dioctanoate, 4-methoxy-1,2-phenylene dioctanoate, 4-ethoxy-1,2-phenylene dioctanoate, 4-propoxy-1,2-phenylene dioctanoate, 4-isopropoxy-1,2-phenylene dioctanoate, 4-butoxy-1,2-phenylene dioctanoate, 4-isobutoxy-1,2-phenylene dioctanoate, 4-tert-butoxy-1,2-phenylene dioctanoate, 4-pentoxy-1,2-phenylene dioctanoate, 4-hexoxy-1,2-phenylene dioctanoate, 4-heptoxy-1,2-phenylene dioctanoate, 4-octoxy-1,2-phenylene dioctanoate, 4-nonoxy-1,2-phenylene dioctanoate, 4-decoxy-1,2-phenylene dioctanoate, 4-phenoxy-1,2-phenylene dioctanoate, 4-chloro-1,2-phenylene diisooctanoate, 4-bromo-1,2-phenylene diisooctanoate, 4-fluro-1,2-phenylene diisooctanoate, 4-iodo-1,2-phenylene diisooctanoate, 4-methyl-1,2-phenylene diisooctanoate, 4-ethyl-1,2-phenylene diisooctanoate, 4-butyl-1,2-phenylene diisooctanoate, 4-isobutyl-1,2-phenylene diisooctanoate, 4-tert-butyl-1,2-phenylene diisooctanoate, 4-isopropyl-1,2-phenylene diisooctanoate, 4-pentyl-1,2-phenylene diisooctanoate, 4-isopentyl-1,2-phenylene diisooctanoate, 4-hexyl-1,2-phenylene diisooctanoate, 4-heptyl-1,2-phenylene diisooctanoate, 4-octyl-1,2-phenylene diisooctanoate, 4-nonyl-1,2-phenylene diisooctanoate, 4-decyl-1,2-phenylene diisooctanoate, 4-dodecyl-1,2-phenylene diisooctanoate, 4-methoxy-1,2-phenylene diisooctanoate, 4-ethoxy-1,2-phenylene diisooctanoate, 4-propoxy-1,2-phenylene diisooctanoate, 4-isopropoxy-1,2-phenylene diisooctanoate, 4-butoxy-1,2-phenylene diisooctanoate, 4-isobutoxy-1,2-phenylene diisooctanoate, 4-tert-butoxy-1,2-phenylene diisooctanoate, 4-pentoxy-1,2-phenylene diisooctanoate, 4-hexoxy-1,2-phenylene diisooctanoate, 4-heptoxy-1,2-phenylene diisooctanoate, 4-octoxy-1,2-phenylene diisooctanoate, 4-nonoxy-1,2-phenylene diisooctanoate, 4-decoxy-1,2-phenylene diisooctanoate, 4-phenoxy-1,2-phenylene diisooctanoate, 4-chloro-1,2-phenylene dinonanoate, 4-bromo-1,2-phenylene dinonanoate, 4-fluro-1,2-phenylene dinonanoate, 4-iodo-1,2-phenylene dinonanoate, 4-methyl-1,2-phenylene dinonanoate, 4-ethyl-1,2-phenylene dinonanoate, 4-butyl-1,2-phenylene dinonanoate, 4-isobutyl-1,2-phenylene dinonanoate, 4-tert-butyl-1,2-phenylene dinonanoate, 4-isopropyl-1,2-phenylene dinonanoate, 4-pentyl-1,2-phenylene dinonanoate, 4-isopentyl-1,2-phenylene dinonanoate, 4-hexyl-1,2-phenylene dinonanoate, 4-heptyl-1,2-phenylene dinonanoate, 4-octyl-1,2-phenylene dinonanoate, 4-nonyl-1,2-phenylene dinonanoate, 4-decyl-1,2-phenylene dinonanoate, 4-dodecyl-1,2-phenylene dinonanoate, 4-methoxy-1,2-phenylene dinonanoate, 4-ethoxy-1,2-phenylene dinonanoate, 4-propoxy-1,2-phenylene dinonanoate, 4-isopropoxy-1,2-phenylene dinonanoate, 4-butoxy-1,2-phenylene dinonanoate, 4-isobutoxy-1,2-phenylene dinonanoate, 4-tert-butoxy-1,2-phenylene dinonanoate, 4-pentoxy-1,2-phenylene dinonanoate, 4-hexoxy-1,2-phenylene dinonanoate, 4-heptoxy-1,2-phenylene dinonanoate, 4-octoxy-1,2-phenylene dinonanoate, 4-nonoxy-1,2-phenylene dinonanoate, 4-decoxy-1,2-phenylene dinonanoate, 4-phenoxy-1,2-phenylene dinonanoate, 4-chloro-1,2-phenylene didecanoate, 4-bromo-1,2-phenylene didecanoate, 4-fluro-1,2-phenylene didecanoate, 4-iodo-1,2-phenylene didecanoate, 4-methyl-1,2-phenylene didecanoate, 4-ethyl-1,2-phenylene didecanoate, 4-butyl-1,2-phenylene didecanoate, 4-isobutyl-1,2-phenylene didecanoate, 4-tert-butyl-1,2-phenylene didecanoate, 4-isopropyl-1,2-phenylene didecanoate, 4-pentyl-1,2-phenylene didecanoate, 4-isopentyl-1,2-phenylene didecanoate, 4-hexyl-1,2-phenylene didecanoate, 4-heptyl-1,2-phenylene didecanoate, 4-octyl-1,2-phenylene didecanoate, 4-nonyl-1,2-phenylene didecanoate, 4-decyl-1,2-phenylene didecanoate, 4-dodecyl-1,2-phenylene didecanoate, 4-methoxy-1,2-phenylene didecanoate, 4-ethoxy-1,2-phenylene didecanoate, 4-propoxy-1,2-phenylene didecanoate, 4-isopropoxy-1,2-phenylene didecanoate, 4-butoxy-1,2-phenylene didecanoate, 4-isobutoxy-1,2-phenylene didecanoate, 4-tert-butoxy-1,2-phenylene didecanoate, 4-pentoxy-1,2-phenylene didecanoate, 4-hexoxy-1,2-phenylene didecanoate, 4-heptoxy-1,2-phenylene didecanoate, 4-octoxy-1,2-phenylene didecanoate, 4-nonoxy-1,2-phenylene didecanoate, 4-decoxy-1,2-phenylene didecanoate, 4-phenoxy-1,2-phenylene didecanoate, 3-chloro-1,2-phenylene diacetate, 3-bromo-1,2-phenylene diacetate, 3-fluro-1,2-phenylene diacetate, 3-iodo-1,2-phenylene diacetate, 3-methyl-1,2-phenylene diacetate, 3-ethyl-1,2-phenylene diacetate, 3-butyl-1,2-phenylene diacetate, 3-isobutyl-1,2-phenylene diacetate, 3-tert-butyl-1,2-phenylene diacetate, 3-isopropyl-1,2-phenylene diacetate, 3-pentyl-1,2-phenylene diacetate, 3-isopentyl-1,2-phenylene diacetate, 3-hexyl-1,2-phenylene diacetate, 3-heptyl-1,2-phenylene diacetate, 3-octyl-1,2-phenylene diacetate, 3-nonyl-1,2-phenylene diacetate, 3-decyl-1,2-phenylene diacetate, 3-dodecyl-1,2-phenylene diacetate, 3-methoxy-1,2-phenylene diacetate, 3-ethoxy-1,2-phenylene diacetate, 3-propoxy-1,2-phenylene diacetate, 3-isopropoxy-1,2-phenylene diacetate, 3-butoxy-1,2-phenylene diacetate, 3-isobutoxy-1,2-phenylene diacetate, 3-tert-butoxy-1,2-phenylene diacetate, 3-pentoxy-1,2-phenylene diacetate, 3-hexoxy-1,2-phenylene diacetate, 3-heptoxy-1,2-phenylene diacetate, 3-octoxy-1,2-phenylene diacetate, 3-nonoxy-1,2-phenylene diacetate, 3-decoxy-1,2-phenylene diacetate, 3-phenoxy-1,2-phenylene diacetate, 3-chloro-1,2-phenylene diisopropanoate, 3-bromo-1,2-phenylene diisopropanoate, 3-fluro-1,2-phenylene diisopropanoate, 3-iodo-1,2-phenylene diisopropanoate, 3-methyl-1,2-phenylene diisopropanoate, 3-ethyl-1,2-phenylene diisopropanoate, 3-butyl-1,2-phenylene diisopropanoate, 3-isobutyl-1,2-phenylene diisopropanoate, 3-tert-butyl-1,2-phenylene diisopropanoate, 3-isopropyl-1,2-phenylene diisopropanoate, 3-pentyl-1,2-phenylene diisopropanoate, 3-isopentyl-1,2-phenylene diisopropanoate 3-hexyl-1,2-phenylene diisopropanoate, 3-heptyl-1,2-phenylene diisopropanoate, 3-octyl-1,2-phenylene diisopropanoate, 3-nonyl-1,2-phenylene diisopropanoate, 3-decyl-1,2-phenylene diisopropanoate, 3-dodecyl-1,2-phenylene diisopropanoate, 3-methoxy-1,2-phenylene diisopropanoate 3-ethoxy-1,2-phenylene diisopropanoate, 3-propoxy-1,2-phenylene diisopropanoate, 3-isopropoxy-1,2-phenylene diisopropanoate, 3-butoxy-1,2-phenylene diisopropanoate, 3-isobutoxy-1,2-phenylene diisopropanoate, 3-tert-butoxy-1,2-phenylene dipropaonate, 3-pentoxy-1,2-phenylene diisopropanoate, 3-hexoxy-1,2-phenylene diisopropanoate, 3-heptoxy-1,2-phenylene diisopropanoate, 3-octoxy-1,2-phenylene diisopropanoate, 3-nonoxy-1,2-phenylene diisopropanoate, 3-decoxy-1,2-phenylene diisopropanoate, 3-phenoxy-1,2-phenylene diisopropanoate, 3-chloro-1,2-phenylene diisopropanoate, 3-bromo-1,2-phenylene diisopropanoate, 3-fluro-1,2-phenylene diisopropanoate, 3-iodo-1,2-phenylene diisopropanoate, 3-methyl-1,2-phenylene diisopropanoate, 3-ethyl-1,2-phenylene diisopropanoate, 3-butyl-1,2-phenylene diisopropanoate, 3-isobutyl-1,2-phenylene diisopropanoate, 3-tert-butyl-1,2-phenylene diisopropanoate, 3-isopropyl-1,2-phenylene diisopropanoate, 3-pentyl-1,2-phenylene diisopropanoate, 3-isopentyl-1,2-phenylene diisopropanoate, 3-hexyl-1,2-phenylene diisopropanoate, 3-heptyl-1,2-phenylene diisopropanoate, 3-octyl-1,2-phenylene diisopropanoate, 3-nonyl-1,2-phenylene diisopropanoate, 3-decyl-1,2-phenylene diisopropanoate, 3-dodecyl-1,2-phenylene diisopropanoate, 3-methoxy-1,2-phenylene diisopropanoate, 3-ethoxy-1,2-phenylene diisopropanoate, 3-propoxy-1,2-phenylene diisopropanoate, 3-isopropoxy-1,2-phenylene diisopropanoate, 3-butoxy-1,2-phenylene diisopropanoate, 3-isobutoxy-1,2-phenylene diisopropanoate, 3-tert-butoxy-1,2-phenylene diisopropanoate, 3-pentoxy-1,2-phenylene diisopropanoate, 3-hexoxy-1,2-phenylene diisopropanoate, 3-heptoxy-1,2-phenylene diisopropanoate, 3-octoxy-1,2-phenylene diisopropanoate, 3-nonoxy-1,2-phenylene diisopropanoate, 3-decoxy-1,2-phenylene diisopropanoate, 3-phenoxy-1,2-phenylene diisopropanoate, 3-chloro-1,2-phenylene dibutanoate, 3-bromo-1,2-phenylene dibutanoate, 3-fluro-1,2-phenylene dibutanoate, 3-iodo-1,2-phenylene dibutanoate, 3-methyl-1,2-phenylene dibutanoate, 3-ethyl-1,2-phenylene dibutanoate, 3-butyl-1,2-phenylene dibutanoate, 3-isobutyl-1,2-phenylene dibutanoate, 3-tert-butyl-1,2-phenylene dibutanoate, 3-isopropyl-1,2-phenylene dibutanoate, 3-pentyl-1,2-phenylene dibutanoate, 3-isopentyl-1,2-phenylene dibutanoate, 3-hexyl-1,2-phenylene dibutanoate, 3-heptyl-1,2-phenylene dibutanoate, 3-octyl-1,2-phenylene dibutanoate, 3-nonyl-1,2-phenylene dibutanoate, 3-decyl-1,2-phenylene dibutanoate, 3-dodecyl-1,2-phenylene dibutanoate, 3-methoxy-1,2-phenylene dibutanoate, 3-ethoxy-1,2-phenylene dibutanoate, 3-propoxy-1,2-phenylene dibutanoate, 3-isopropoxy-1,2-phenylene dibutanoate, 3-butoxy-1,2-phenylene dibutanoate, 3-isobutoxy-1,2-phenylene dibutanoate, 3-tert-butoxy-1,2-phenylene dibutanoate, 3-pentoxy-1,2-phenylene dibutanoate, 3-hexoxy-1,2-phenylene dibutanoate, 3-heptoxy-1,2-phenylene dibutanoate, 3-octoxy-1,2-phenylene dibutanoate, 3-nonoxy-1,2-phenylene dibutanoate, 3-decoxy-1,2-phenylene dibutanoate, 3-phenoxy-1,2-phenylene dibutanoate, 3-chloro-1,2-phenylene diisobutanoate, 3-bromo-1,2-phenylene diisobutanoate, 3-fluro-1,2-phenylene diisobutanoate, 3-iodo-1,2-phenylene diisobutanoate, 3-methyl-1,2-phenylene diisobutanoate, 3-ethyl-1,2-phenylene diisobutanoate, 3-butyl-1,2-phenylene diisobutanoate, 3-isobutyl-1,2-phenylene diisobutanoate, 3-tert-butyl-1,2-phenylene diisobutanoate, 3-isopropyl-1,2-phenylene diisobutanoate, 3-pentyl-1,2-phenylene diisobutanoate, 3-isopentyl-1,2-phenylene diisobutanoate, 3-hexyl-1,2-phenylene diisobutanoate, 3-heptyl-1,2-phenylene diisobutanoate, 3-octyl-1,2-phenylene diisobutanoate, 3-nonyl-1,2-phenylene diisobutanoate, 3-decyl-1,2-phenylene diisobutanoate, 3-dodecyl-1,2-phenylene diisobutanoate, 3-methoxy-1,2-phenylene diisobutanoate, 3-ethoxy-1,2-phenylene diisobutanoate, 3-propoxy-1,2-phenylene diisobutanoate, 3-isopropoxy-1,2-phenylene diisobutanoate, 3-butoxy-1,2-phenylene diisobutanoate, 3-isobutoxy-1,2-phenylene diisobutanoate, 3-tert-butoxy-1,2-phenylene diisobutanoate, 3-pentoxy-1,2-phenylene diisobutanoate, 3-hexoxy-1,2-phenylene diisobutanoate, 3-heptoxy-1,2-phenylene diisobutanoate, 3-octoxy-1,2-phenylene diisobutanoate, 3-nonoxy-1,2-phenylene diisobutanoate, 3-decoxy-1,2-phenylene diisobutanoate, 3-phenoxy-1,2-phenylene diisobutanoate, 3-chloro-1,2-phenylene di-tert-butanoate, 3-bromo-1,2-phenylene di-tert-butanoate, 3-fluro-1,2-phenylene di-tert-butanoate, 3-iodo-1,2-phenylene di-tert-butanoate, 3-methyl-1,2-phenylene di-tert-butanoate, 3-ethyl-1,2-phenylene di-tert-butanoate, 3-butyl-1,2-phenylene di-tert-butanoate, 3-isobutyl-1,2-phenylene di-tert-butanoate, 3-tert-butyl-1,2-phenylene di-tert-butanoate, 3-isopropyl-1,2-phenylene di-tert-butanoate, 3-pentyl-1,2-phenylene di-tert-butanoate, 3-isopentyl-1,2-phenylene di-tert-butanoate, 3-hexyl-1,2-phenylene di-tert-butanoate, 3-heptyl-1,2-phenylene di-tert-butanoate, 3-octyl-1,2-phenylene di-tert-butanoate, 3-nonyl-1,2-phenylene di-tert-butanoate, 3-decyl-1,2-phenylene di-tert-butanoate, 3-dodecyl-1,2-phenylene di-tert-butanoate, 3-methoxy-1,2-phenylene di-tert-butanoate, 3-ethoxy-1,2-phenylene di-tert-butanoate, 3-propoxy-1,2-phenylene di-tert-butanoate, 3-isopropoxy-1,2-phenylene di-tert-butanoate, 3-butoxy-1,2-phenylene di-tert-butanoate, 3-isobutoxy-1,2-phenylene di-tert-butanoate, 3-t-butoxy-1,2-phenylene di-tert-butanoate, 3-pentoxy-1,2-phenylene di-tert-butanoate, 3-hexoxy-1,2-phenylene di-tert-butanoate, 3-heptoxy-1,2-phenylene di-tert-butanoate, 3-octoxy-1,2-phenylene di-tert-butanoate, 3-nonoxy-1,2-phenylene di-tert-butanoate, 3-decoxy-1,2-phenylene di-tert-butanoate, 3-phenoxy-1,2-phenylene di-tert-butanoate, 3-chloro-1,2-phenylene dipentanoate, 3-bromo-1,2-phenylene dipentanoate, 3-fluro-1,2-phenylene dipentanoate, 3-iodo-1,2-phenylene dipentanoate, 3-methyl-1,2-phenylene dipentanoate, 3-ethyl-1,2-phenylene dipentanoate, 3-butyl-1,2-phenylene dipentanoate, 3-isobutyl-1,2-phenylene dipentanoate, 3-tert-butyl-1,2-phenylene dipentanoate, 3-isopropyl-1,2-phenylene dipentanoate, 3-pentyl-1,2-phenylene dipentanoate, 3-isopentyl-1,2-phenylene dipentanoate, 3-hexyl-1,2-phenylene dipentanoate, 3-heptyl-1,2-phenylene dipentanoate, 3-octyl-1,2-phenylene dipentanoate, 3-nonyl-1,2-phenylene dipentanoate, 3-decyl-1,2-phenylene dipentanoate, 3-dodecyl-1,2-phenylene dipentanoate, 3-methoxy-1,2-phenylene dipentanoate, 3-ethoxy-1,2-phenylene dipentanoate, 3-propoxy-1,2-phenylene dipentanoate, 3-isopropoxy-1,2-phenylene dipentanoate, 3-butoxy-1,2-phenylene dipentanoate, 3-isobutoxy-1,2-phenylene dipentanoate, 3-tert-butoxy-1,2-phenylene dipentanoate, 3-pentoxy-1,2-phenylene dipentanoate, 3-hexoxy-1,2-phenylene dipentanoate, 3-heptoxy-1,2-phenylene dipentanoate, 3-octoxy-1,2-phenylene dipentanoate, 3-nonoxy-1,2-phenylene dipentanoate, 3-decoxy-1,2-phenylene dipentanoate, 3-phenoxy-1,2-phenylene dipentanoate, 3-chloro-1,2-phenylene diisopentanoate, 3-bromo-1,2-phenylene diisopentanoate, 3-fluro-1,2-phenylene diisopentanoate, 3-iodo-1,2-phenylene diisopentanoate, 3-methyl-1,2-phenylene diisopentanoate, 3-ethyl-1,2-phenylene diisopentanoate, 3-butyl-1,2-phenylene diisopentanoate, 3-isobutyl-1,2-phenylene diisopentanoate, 3-tert-butyl-1,2-phenylene diisopentanoate, 3-isopropyl-1,2-phenylene diisopentanoate, 3-pentyl-1,2-phenylene diisopentanoate, 3-isopentyl-1,2-phenylene diisopentanoate, 3-hexyl-1,2-phenylene diisopentanoate, 3-heptyl-1,2-phenylene diisopentanoate, 3-octyl-1,2-phenylene diisopentanoate, 3-nonyl-1,2-phenylene diisopentanoate, 3-decyl-1,2-phenylene diisopentanoate, 3-dodecyl-1,2-phenylene diisopentanoate, 3-methoxy-1,2-phenylene diisopentanoate, 3-ethoxy-1,2-phenylene diisopentanoate, 3-propoxy-1,2-phenylene diisopentanoate, 3-isopropoxy-1,2-phenylene diisopentanoate, 3-butoxy-1,2-phenylene diisopentanoate, 3-isobutoxy-1,2-phenylene diisopentanoate, 3-tert-butoxy-1,2-phenylene diisopentanoate, 3-pentoxy-1,2-phenylene diisopentanoate, 3-hexoxy-1,2-phenylene diisopentanoate, 3-heptoxy-1,2-phenylene diisopentanoate, 3-octoxy-1,2-phenylene diisopentanoate, 3-nonoxy-1,2-phenylene diisopentanoate, 3-decoxy-1,2-phenylene diisopentanoate, 3-phenoxy-1,2-phenylene diisopentanoate, 3-chloro-1,2-phenylene dihexanoate, 3-bromo-1,2-phenylene dihexanoate, 3-fluro-1,2-phenylene dihexanoate, 3-iodo-1,2-phenylene dihexanoate, 3-methyl-1,2-phenylene dihexanoate, 3-ethyl-1,2-phenylene dihexanoate, 3-butyl-1,2-phenylene dihexanoate, 3-isobutyl-1,2-phenylene dihexanoate, 3-tert-butyl-1,2-phenylene dihexanoate, 3-isopropyl-1,2-phenylene dihexanoate, 3-pentyl-1,2-phenylene dihexanoate, 3-isopentyl-1,2-phenylene dihexanoate, 3-hexyl-1,2-phenylene dihexanoate, 3-heptyl-1,2-phenylene dihexanoate, 3-octyl-1,2-phenylene dihexanoate, 3-nonyl-1,2-phenylene dihexanoate, 3-decyl-1,2-phenylene dihexanoate, 3-dodecyl-1,2-phenylene dihexanoate, 3-methoxy-1,2-phenylene dihexanoate, 3-ethoxy-1,2-phenylene dihexanoate, 3-propoxy-1,2-phenylene dihexanoate, 3-isopropoxy-1,2-phenylene dihexanoate, 3-butoxy-1,2-phenylene dihexanoate, 3-isobutoxy-1,2-phenylene dihexanoate, 3-tert-butoxy-1,2-phenylene dihexanoate, 3-pentoxy-1,2-phenylene dihexanoate, 3-hexoxy-1,2-phenylene dihexanoate, 3-heptoxy-1,2-phenylene dihexanoate, 3-octoxy-1,2-phenylene dihexanoate, 3-nonoxy-1,2-phenylene dihexanoate, 3-decoxy-1,2-phenylene dihexanoate, 3-phenoxy-1,2-phenylene dihexanoate, 3-chloro-1,2-phenylene diisohexanoate, 3-bromo-1,2-phenylene diisohexanoate, 3-fluro-1,2-phenylene diisohexanoate, 3-iodo-1,2-phenylene diisohexanoate, 3-methyl-1,2-phenylene diisohexanoate, 3-ethyl-1,2-phenylene diisohexanoate, 3-butyl-1,2-phenylene diisohexanoate, 3-isobutyl-1,2-phenylene diisohexanoate, 3-tert-butyl-1,2-phenylene diisohexanoate, 3-isopropyl-1,2-phenylene diisohexanoate, 3-pentyl-1,2-phenylene diisohexanoate, 3-isopentyl-1,2-phenylene diisohexanoate, 3-hexyl-1,2-phenylene diisohexanoate, 3-heptyl-1,2-phenylene diisohexanoate, 3-octyl-1,2-phenylene diisohexanoate, 3-nonyl-1,2-phenylene diisohexanoate, 3-decyl-1,2-phenylene diisohexanoate, 3-dodecyl-1,2-phenylene diisohexanoate, 3-methoxy-1,2-phenylene diisohexanoate, 3-ethoxy-1,2-phenylene diisohexanoate, 3-propoxy-1,2-phenylene diisohexanoate, 3-isopropoxy-1,2-phenylene diisohexanoate, 3-butoxy-1,2-phenylene diisohexanoate, 3-isobutoxy-1,2-phenylene diisohexanoate, 3-tert-butoxy-1, 2-phenylene diisohexanoate, 3-pentoxy-1,2-phenylene diisohexanoate, 3-hexoxy-1,2-phenylene diisohexanoate, 3-heptoxy-1,2-phenylene diisohexanoate, 3-octoxy-1,2-phenylene diisohexanoate, 3-nonoxy-1,2-phenylene diisohexanoate, 3-decoxy-1,2-phenylene diisohexanoate, 3-phenoxy-1,2-phenylene diisohexanoate, 3-chloro-1,2-phenylene diheptanoate, 3-bromo-1,2-phenylene diheptanoate, 3-fluro-1,2-phenylene diheptanoate, 3-iodo-1,2-phenylene diheptanoate, 3-methyl-1,2-phenylene diheptanoate, 3-ethyl-1,2-phenylene diheptanoate, 3-butyl-1,2-phenylene diheptanoate, 3-isobutyl-1,2-phenylene diheptanoate, 3-tert-butyl-1,2-phenylene diheptanoate, 3-isopropyl-1,2-phenylene diheptanoate, 3-pentyl-1,2-phenylene diheptanoate, 3-isopentyl-1,2-phenylene diheptanoate, 3-hexyl-1,2-phenylene diheptanoate, 3-heptyl-1,2-phenylene diheptanoate, 3-octyl-1,2-phenylene diheptanoate, 3-nonyl-1,2-phenylene diheptanoate, 3-decyl-1,2-phenylene diheptanoate, 3-dodecyl-1,2-phenylene diheptanoate, 3-methoxy-1,2-phenylene diheptanoate, 3-ethoxy-1,2-phenylene diheptanoate, 3-propoxy-1,2-phenylene diheptanoate, 3-isopropoxy-1,2-phenylene diheptanoate, 3-butoxy-1,2-phenylene diheptanoate, 3-isobutoxy-1,2-phenylene diheptanoate, 3-tert-butoxy-1,2-phenylene diheptanoate, 3-pentoxy-1,2-phenylene diheptanoate, 3-hexoxy-1,2-phenylene diheptanoate, 3-heptoxy-1,2-phenylene diheptanoate, 3-octoxy-1,2-phenylene diheptanoate, 3-nonoxy-1,2-phenylene diheptanoate, 3-decoxy-1,2-phenylene diheptanoate, 3-phenoxy-1,2-phenylene diheptanoate, 3-chloro-1,2-phenylene diisoheptanoate, 3-bromo-1,2-phenylene diisoheptanoate, 3-fluro-1,2-phenylene diisoheptanoate, 3-iodo-1,2-phenylene diisoheptanoate, 3-methyl-1,2-phenylene diisoheptanoate, 3-ethyl-1,2-phenylene diisoheptanoate, 3-butyl-1,2-phenylene diisoheptanoate, 3-isobutyl-1,2-phenylene diisoheptanoate, 3-tert-butyl-1,2-phenylene diisoheptanoate, 3-isopropyl-1,2-phenylene diisoheptanoate, 3-pentyl-1,2-phenylene diisoheptanoate, 3-isopentyl-1,2-phenylene diisoheptanoate, 3-hexyl-1,2-phenylene diisoheptanoate, 3-heptyl-1,2-phenylene diisoheptanoate, 3-octyl-1,2-phenylene diisoheptanoate, 3-nonyl-1,2-phenylene diisoheptanoate, 3-decyl-1,2-phenylene diisoheptanoate, 3-dodecyl-1,2-phenylene diisoheptanoate, 3-methoxy-1,2-phenylene diisoheptanoate, 3-ethoxy-1,2-phenylene diisoheptanoate, 3-propoxy-1,2-phenylene diisoheptanoate, 3-isopropoxy-1,2-phenylene diisoheptanoate, 3-butoxy-1,2-phenylene diisoheptanoate, 3-isobutoxy-1,2-phenylene diisoheptanoate, 3-tert-butoxy-1,2-phenylene diisoheptanoate, 3-pentoxy-1,2-phenylene diisoheptanoate, 3-hexoxy-1,2-phenylene diisoheptanoate, 3-heptoxy-1,2-phenylene diisoheptanoate, 3-octoxy-1,2-phenylene diisoheptanoate, 3-nonoxy-1,2-phenylene diisoheptanoate, 3-decoxy-1,2-phenylene diisoheptanoate, 3-phenoxy-1,2-phenylene diisoheptanoate, 3-chloro-1,2-phenylene dioctanoate, 3-bromo-1,2-phenylene dioctanoate, 3-fluro-1,2-phenylene dioctanoate, 3-iodo-1,2-phenylene dioctanoate, 3-methyl-1,2-phenylene dioctanoate, 3-ethyl-1,2-phenylene dioctanoate, 3-butyl-1,2-phenylene dioctanoate, 3-isobutyl-1,2-phenylene dioctanoate, 3-tert-butyl-1,2-phenylene dioctanoate, 3-isopropyl-1,2-phenylene dioctanoate, 3-pentyl-1,2-phenylene dioctanoate, 3-isopentyl-1,2-phenylene dioctanoate, 3-hexyl-1,2-phenylene dioctanoate, 3-heptyl-1,2-phenylene dioctanoate, 3-octyl-1,2-phenylene dioctanoate, 3-nonyl-1,2-phenylene dioctanoate, 3-decyl-1,2-phenylene dioctanoate, 3-dodecyl-1,2-phenylene dioctanoate, 3-methoxy-1,2-phenylene dioctanoate, 3-ethoxy-1,2-phenylene dioctanoate, 3-propoxy-1,2-phenylene dioctanoate, 3-isopropoxy-1,2-phenylene dioctanoate, 3-butoxy-1,2-phenylene dioctanoate, 3-isobutoxy-1,2-phenylene dioctanoate, 3-tert-butoxy-1,2-phenylene dioctanoate, 3-pentoxy-1,2-phenylene dioctanoate, 3-hexoxy-1,2-phenylene dioctanoate, 3-heptoxy-1,2-phenylene dioctanoate, 3-octoxy-1,2-phenylene dioctanoate, 3-nonoxy-1,2-phenylene dioctanoate, 3-decoxy-1,2-phenylene dioctanoate, 3-phenoxy-1,2-phenylene dioctanoate, 3-chloro-1,2-phenylene diisooctanoate, 3-bromo-1,2-phenylene diisooctanoate, 3-fluro-1,2-phenylene diisooctanoate, 3-iodo-1,2-phenylene diisooctanoate, 3-methyl-1,2-phenylene diisooctanoate, 3-ethyl-1,2-phenylene diisooctanoate, 3-butyl-1,2-phenylene diisooctanoate, 3-isobutyl-1,2-phenylene diisooctanoate, 3-tert-butyl-1,2-phenylene diisooctanoate, 3-isopropyl-1,2-phenylene diisooctanoate, 3-pentyl-1,2-phenylene diisooctanoate, 3-isopentyl-1,2-phenylene diisooctanoate, 3-hexyl-1,2-phenylene diisooctanoate, 3-heptyl-1,2-phenylene diisooctanoate, 3-octyl-1,2-phenylene diisooctanoate, 3-nonyl-1,2-phenylene diisooctanoate, 3-decyl-1,2-phenylene diisooctanoate, 3-dodecyl-1,2-phenylene diisooctanoate, 3-methoxy-1,2-phenylene diisooctanoate, 3-ethoxy-1,2-phenylene diisooctanoate, 3-propoxy-1,2-phenylene diisooctanoate, 3-isopropoxy-1,2-phenylene diisooctanoate, 3-butoxy-1,2-phenylene diisooctanoate, 3-isobutoxy-1,2-phenylene diisooctanoate, 3-tert-butoxy-1,2-phenylene diisooctanoate, 3-pentoxy-1,2-phenylene diisooctanoate, 3-hexoxy-1,2-phenylene diisooctanoate, 3-heptoxy-1,2-phenylene diisooctanoate, 3-octoxy-1,2-phenylene diisooctanoate, 3-nonoxy-1,2-phenylene diisooctanoate, 3-decoxy-1,2-phenylene diisooctanoate, 3-phenoxy-1,2-phenylene diisooctanoate, 3-chloro-1,2-phenylene dinonanoate, 3-bromo-1,2-phenylene dinonanoate, 3-fluro-1,2-phenylene dinonanoate, 3-iodo-1,2-phenylene dinonanoate, 3-methyl-1,2-phenylene dinonanoate, 3-ethyl-1,2-phenylene dinonanoate, 3-butyl-1,2-phenylene dinonanoate, 3-isobutyl-1,2-phenylene dinonanoate, 3-tert-butyl-1,2-phenylene dinonanoate, 3-isopropyl-1,2-phenylene dinonanoate, 3-pentyl-1,2-phenylene dinonanoate, 3-isopentyl-1,2-phenylene dinonanoate, 3-hexyl-1,2-phenylene dinonanoate, 3-heptyl-1,2-phenylene dinonanoate, 3-octyl-1,2-phenylene dinonanoate, 3-nonyl-1,2-phenylene dinonanoate, 3-decyl-1,2-phenylene dinonanoate, 3-dodecyl-1,2-phenylene dinonanoate, 3-methoxy-1,2-phenylene dinonanoate, 3-ethoxy-1,2-phenylene dinonanoate, 3-propoxy-1,2-phenylene dinonanoate, 3-isopropoxy-1,2-phenylene dinonanoate, 3-butoxy-1,2-phenylene dinonanoate, 3-isobutoxy-1,2-phenylene dinonanoate, 3-tert-butoxy-1,2-phenylene dinonanoate, 3-pentoxy-1,2-phenylene dinonanoate, 3-hexoxy-1,2-phenylene dinonanoate, 3-heptoxy-1,2-phenylene dinonanoate, 3-octoxy-1,2-phenylene dinonanoate, 3-nonoxy-1,2-phenylene dinonanoate, 3-decoxy-1,2-phenylene dinonanoate, 3-phenoxy-1,2-phenylene dinonanoate, 3-chloro-1,2-phenylene didecanoate, 3-bromo-1,2-phenylene didecanoate, 3-fluro-1,2-phenylene didecanoate, 3-iodo-1,2-phenylene didecanoate, 3-methyl-1,2-phenylene didecanoate, 3-ethyl-1,2-phenylene didecanoate, 3-butyl-1,2-phenylene didecanoate, 3-isobutyl-1,2-phenylene didecanoate, 3-tert-butyl-1,2-phenylene didecanoate, 3-isopropyl-1,2-phenylene didecanoate, 3-pentyl-1,2-phenylene didecanoate, 3-isopentyl-1,2-phenylene didecanoate, 3-hexyl-1,2-phenylene didecanoate, 3-heptyl-1,2-phenylene didecanoate, 3-octyl-1,2-phenylene didecanoate, 3-nonyl-1,2-phenylene didecanoate, 3-decyl-1,2-phenylene didecanoate, 3-dodecyl-1,2-phenylene didecanoate, 3-methoxy-1,2-phenylene didecanoate, 3-ethoxy-1,2-phenylene didecanoate, 3-propoxy-1,2-phenylene didecanoate, 3-isopropoxy-1,2-phenylene didecanoate, 3-butoxy-1,2-phenylene didecanoate, 3-isobutoxy-1,2-phenylene didecanoate, 3-tert-butoxy-1,2-phenylene didecanoate, 3-pentoxy-1,2-phenylene didecanoate, 3-hexoxy-1,2-phenylene didecanoate, 3-heptoxy-1,2-phenylene didecanoate, 3-octoxy-1,2-phenylene didecanoate, 3-nonoxy-1,2-phenylene didecanoate, 3-decoxy-1,2-phenylene didecanoate and 3-phenoxy-1,2-phenylene didecanoate.

In a first embodiment, $R_1$-$R_6$ groups are equal or different and are selected from hydrogen, $C_1$-$C_{20}$ linear or branched alkyl group which can be linked with cyclic rings, $C_6$-$C_{14}$ aryl groups, $C_3$-$C_{15}$ cycloalkyl groups, $C_1$-$C_{20}$ alkoxy group, a heteroatom, arylalkyl or alkylaryl groups and combinations thereof.

More particularly, $R_3$ to $R_6$ in structure (A) are hydrogen and $R_1$ and $R_2$ are same and are selected from $C_1$-$C_{20}$ linear or branched alkyl group which may be linked with cyclic ring, $C_3$-$C_{15}$ cycloalkyl groups, and a heteroatom.

The non limiting examples in accordance with the first embodiment can be: 1,2-phenylene diacetate or 1,2-phenylene diethanoate, 1,2-phenylene dipropanoate, 1,2-phenylene diisopropanoate, 1,2-phenylene dibutanoate, 1,2-phenylene diisobutanoate, 1,2-phenylene di tert-butanoate, 1,2-phenylene dipentanoate, 1,2-phenylene diisopentanoate, 1,2-phenylene dihexanoate, 1,2-phenylene diheptanoate, 1,2-phenylene dioctanoate, 1,2-phenylene dinonanoate, 1,2-phenylene didecanoate, 1,2-phenylene diundecanoate, 1,2-phenylene dicyclopropyloate, 1,2-phenylene dicyclobutyloate, 1,2-phenylene dicyclopentoate, 1,2-phenylene dicyclohexyloate, 1,2-phenylene dicycloheptyloate, 1,2-phenylene dicyclooctyloate, 1,2-phenylene bis(3-methylbutanoate), 1,2-phenylene bis(4-methylpentanoate), 1,2-phenylene bis(5-methylhexanoate), 1,2-phenylene bis(6-methylheptanoate), 1,2-phenylene bis(7-methyloctanoate), 1,2-phenylene bis(8-methylnonanoate), 1,2-phenylene bis(9-methyldecanoate), 1,2-phenylene bis(10-methylundecanoate), 1,2-phenylene dipivalate, 1,2-phenylene bis(3,3-dimethylbutanoate), 1,2-phenylene bis(4,4-dimethylpentanoate), 1,2-phenylene bis(5,5-dimethylhexanoate), 1,2-phenylene bis(6,6-dimethylheptanoate), 1,2-phenylene bis(2-methylbutanoate), 1,2-phenylene bis(2-methylpentanoate), 1,2-phenylene bis(2-methyl hexanoate), 1,2-phenylene bis(2-methyl heptanoate), 1,2-phenylene bis(2-methyloctanoate), 1,2-phenylene bis(2-methylnonanoate), 1,2-phenylene bis(2-methyldecanoate), 1,2-phenylene bis(2-propylpentanoate), 1,2-phenylene bis(2-propylhexanoate), 1,2-phenylene bis(2-propylheptanoate), 1,2-phenylene bis(2-propyloctanoate), 1,2-phenylene bis(2-propylnonanoate), 1,2-phenylene bis(2-propyldecanoate).

Preferred compounds in accordance with the first embodiment are 1,2-phenylene diacetate, 1,2-phenylene diisopropanoate, 1,2-phenylene diisobutanoate and 1,2-phenylene di-tert-butanoate.

In a second embodiment, $R_1$-$R_6$ groups are equal or different from each other. Each of $R_1$-$R_6$ are selected from hydrogen, halogen, $C_1$-$C_{20}$ linear or branched alkyl group which can be linked with cyclic rings, $C_6$-$C_{14}$ aryl groups, $C_3$-$C_{15}$ cycloalkyl groups, $C_1$-$C_{20}$ alkoxy group, a heteroatom, arylalkyl or alkylaryl groups and combinations thereof.

Particularly, the structure (A) includes at least one of $R_3$-$R_6$ selected from hydrogen, and $R_1$-$R_2$ are different. More particularly, at least one of $R_1$-$R_2$ selected from $C_1$-$C_{20}$ linear or branched alkyl group which may be linked with cyclic ring, $C_3$-$C_{15}$ cycloalkyl groups, a heteroatom, arylalkyl or alkylaryl, alkylalkoxy or alkoxyalkyl, arylalkoxy or alkoxyaryl, alkylcycloalkyl or cycloalkylalkyl groups and combinations thereof.

The non limiting examples in accordance with the second embodiment can be: 2-acetoxyphenyl propanoate, 2-acetoxyphenyl butyrate, 2-acetoxyphenyl pentanoate, 2-acetoxyphenyl heptanoate, 2-acetoxyphenyl octanoate, 2-acetoxyphenyl nonanoate, 2-acetoxyphenyl decanoate, 2-acetoxyphenyl undecanoate, 2-(propionyloxy)phenyl butyrate, 2-(propionyloxy)phenyl pentanoate, 2-(propionyloxy)phenyl hexanoate, 2-(propionyloxy)phenyl heptanoate, 2-(propionyloxy)phenyl octanoate, 2-(propionyloxy)phenyl nonanoate, 2-(propionyloxy)phenyl decanoate, 2-(propionyloxy)phenyl undecanoate, 2-(butyryloxy)phenyl pentanoate, 2-(butyryloxy)phenyl hexanoate, 2-(butyryloxy)phenyl heptanoate, 2-(butyryloxy)phenyl octanoate, 2-(butyryloxy)phenyl nonanoate, 2-(butyryloxy)phenyl decanoate, 2-(butyryloxy)phenyl undecanoate, 2-(pentanoyloxy)phenyl hexanoate, 2-(pentanoyloxy)phenyl heptanoate, 2-(pentanoyloxy)phenyl octanoate, 2-(pentanoyloxy)phenyl nonanoate, 2-(pentanoyloxy)phenyl decanoate, 2-(pentanoyloxy)phenyl undecanoate, 2-(hexanoyloxy)phenyl heptanoate, 2-(hexanoyloxy)phenyl octanoate, 2-(hexanoyloxy)phenyl nonanoate, 2-(hexanoyloxy)phenyl decanoate, 2-(hexanoyloxy)phenyl undecanoate, 2-(heptanoyloxy)phenyl octanoate, 2-(heptanoyloxy)phenyl nonanoate, 2-(heptanoyloxy)phenyl decanoate, 2-(heptanoyloxy)phenyl undecanoate, 2-(octanoyloxy)phenyl nonanoate, 2-(octanoyloxy)phenyl decanoate, 2-(octanoyloxy)phenyl undecanoate, 2-(nonanoyloxy)phenyl decanoate, 2-(nonanoyloxy)phenyl undecanoate, 2-(decanoyloxy)phenyl undecanoate, 2-(isobutyryloxy)phenyl acetate, 2-(isobutyryloxy)phenyl propionate, 2-(isobutyryloxy)phenyl butyrate, 2-(isobutyryloxy)phenyl pentanoate, 2-(isobutyryloxy)phenyl hexanoate, 2-(isobutyryloxy)phenyl heptanoate, 2-(isobutyryloxy)phenyl octanoate, 2-(isobutyryloxy)phenyl nonanoate, 2-(isobutyryloxy)phenyl decanoate, 2-(isobutyryloxy)phenyl undecanoate, 2-(isobutyryloxy)phenyl benzoate, 2-(isobutyryloxy)phenyl isopropionate, 2-(isobutyryloxy)phenyl isobutyrate, 2-(isobutyryloxy)phenyl isopentanoate, 2-(isobutyryloxy)phenyl isohexanoate, 2-(isobutyryloxy)phenyl isoheptanoate, 2-(isobutyryloxy)phenyl isooctanoate, 2-(isobutyryloxy)phenyl isononanoate, 2-(isobutyryloxy)phenyl isodecanoate, 2-(isobutyryloxy)phenyl isoundecanoate, 2-acetoxyphenyl 3-methylbutanoate, 2-(propionyloxy)phenyl 3-methylbutanoate, 2-(butyryloxy)phenyl 3-methylbutanoate, 2-(3-methylbutanoyloxy)phenyl pentanoate, 2-(3-methylbutanoyloxy)phenyl hexanoate, 2-(3-methylbutanoyloxy)phenyl heptanoate, 2-(3-methylbutanoyloxy)phenyl octanoate, 2-(3-methylbutanoyloxy)phenyl nonanoate, 2-(3-methylbutanoyloxy)phenyl decanoate, 2-(3-methylbutanoyloxy)phenyl undecanoate, 2-acetoxyphenyl 4-methylpentanoate, 2-(propionyloxy)phenyl 4-methylpentanoate, 2-(butyryloxy)phenyl 4-methylpentanoate, 2-(pentanoyloxy)phenyl 4-methylpentanoate, 2-(4-methylpentanoyloxy)phenyl hexanoate, 2-(4-methylpentanoyloxy)phenyl heptanoate, 2-(4-methylpentanoyloxy)phenyl octanoate, 2-(4-methylpentanoyloxy)phenyl nonanoate, 2-(4-methylpentanoyloxy)phenyl decanoate, 2-(4-methylpentanoyloxy)phenyl undecanoate, 2-acetoxyphenyl 5-methyl hexanoate, 2-(propionyloxy)phenyl 5-methyl hexanoate, 2-(butyryloxy)phenyl 5-methyl hexanoate, 2-(pentanoyloxy)phenyl 5-methyl hexanoate, 2-(hexanoyloxy)phenyl 5-methyl hexanoate, 2-(5-methylhexanoyloxy)phenyl heptanoate, 2-(5-methylhexanoyloxy)phenyl octanoate, 2-(5-methylhexanoyloxy)phenyl nonanoate, 2-(5-methylhexanoyloxy)phenyl decanoate, 2-(5-methylhexanoyloxy)phenyl undecanoate, 2-acetoxyphenyl 6-methylheptanoate, 2-(propionyloxy)phenyl 6-methylheptanoate, 2-(butyryloxy)phenyl 6-methylheptanoate, 2-(pentanoyloxy)phenyl 6-methylheptanoate, 2-(hexanoyloxy)phenyl 6-methylheptanoate, 2-(heptanoyloxy)phenyl 6-methylheptanoate, 2-(6-methylheptanoyloxy)phenyl octanoate, 2-(6-methylheptanoyloxy)phenyl nonanoate, 2-(6-methylheptanoyloxy)phenyl decanoate, 2-(6-methylheptanoyloxy)phenyl undecanoate, 2-acetoxyphenyl 7-methyloctanoate, 2-(propionyloxy)phenyl 7-methyloctanoate, 2-(butyryloxy)phenyl 7-methyloctanoate, 2-(pentanoyloxy)phenyl 7-methyloctanoate, 2-(hexanoyloxy)phenyl 7-methyloctanoate, 2-(heptanoyloxy)phenyl 7-methyloctanoate, 2-(octanoyloxy)phenyl 7-methyloctanoate, 2-(7-methyloctanoyloxy)phenyl nonanoate, 2-(7-methyloctanoyloxy)phenyl decanoate, 2-(7-methyloctanoyloxy)phenyl undecanoate, 2-acetoxyphenyl 8-methylnonanoate, 2-(propionyloxy)phenyl 8-methylnonanoate, 2-(butyryloxy)phenyl 8-methylnonanoate, 2-(pentanoyloxy)phenyl 8-methylnonanoate, 2-(hexanoyloxy)phenyl 8-methylnonanoate, 2-(heptanoyloxy)phenyl 8-methylnonanoate, 2-(octanoyloxy)phenyl 8-methylnonanoate, 2-(nonanoyloxy)phenyl 8-methylnonanoate, 2-(8-methylnonanoyloxy)phenyl decanoate, 2-(8-methylnonanoyloxy)phenyl undecanoate, 2-acetoxyphenyl 9-methyldecanoate, 2-(propionyloxy)phenyl 9-methyldecanoate, 2-(butyryloxy)phenyl 9-methyldecanoate, 2-(pentanoyloxy)phenyl 9-methyldecanoate, 2-(hexanoyloxy)phenyl 9-methyldecanoate, 2-(heptanoyloxy)phenyl 9-methyldecanoate, 2-(octanoyloxy)phenyl 9-methyldecanoate, 2-(nonanoyloxy)phenyl 9-methyldecanoate, 2-(decanoyloxy)phenyl 9-methyldecanoate, 2-(9-methyldecanoyloxy)phenyl undecanoate, 2-acetoxyphenyl 10-methylundecanoate, 2-(propionyloxy)phenyl 10-methylundecanoate, 2-(butyryloxy)phenyl 10-methylundecanoate, 2-(pentanoyloxy)phenyl 10-methylundecanoate, 2-(hexanoyloxy)phenyl 10-methylundecanoate, 2-(heptanoyloxy)phenyl 10-methylundecanoate, 2-(octanoyloxy)phenyl 10-methylundecanoate, 2-(nonanoyloxy)phenyl 10-methylundecanoate, 2-(decanoyloxy)phenyl 10-methylundecanoate, 2-(undecanoyloxy)phenyl 10-methylundecanoate, 2-acetoxyphenyl pivalate, 2-(propionyloxy)phenyl pivalate, 2-(pivaloyloxy)phenyl butyrate, 2-(pivaloyloxy)phenyl pentanoate, 2-(pivaloyloxy)phenyl hexanoate, 2-(pivaloyloxy)phenyl heptanoate, 2-(pivaloyloxy)phenyl octanoate, 2-(pivaloyloxy)phenyl nonanoate, 2-(pivaloyloxy)phenyl decanoate, 2-(pivaloyloxy)phenyl undecanoate, 2-acetoxyphenyl 3,3-dimethylbutanoate, 2-(propionyloxy)phenyl 3,3-dimethylbutanoate, 2-(butyryloxy)phenyl 3,3-dimethylbutanoate, 2-(3,3-dimethylbutanoyloxy)phenyl pentanoate, 2-(3,3-dimethylbutanoyloxy)phenyl hexanoate, 2-(3,3-dimethylbutanoyloxy)phenyl heptanoate, 2-(3,3-dimethylbutanoyloxy)phenyl octanoate, 2-(3,3-dimethylbutanoyloxy)phenyl nonanoate, 2-(3,3-dimethylbutanoyloxy)phenyl decanoate, 2-(3,3-dimethylbutanoyloxy)phenyl undecanoate, 2-acetoxyphenyl 5,5-dimethyl hexanoate, 2-(propionyloxy)phenyl 5,5-dimethylhexanoate, 2-(butyryloxy)phenyl 5,5-dimethyl hexanoate, 2-(pentanoyloxy)phenyl 5,5-dimethyl hexanoate, 2-(hexanoyloxy)phenyl 5,5-dimethyl hexanoate, 2-(5,5-dimethylhexanoyloxy)phenyl heptanoate, 2-(5,5-dimethylhexanoyloxy)phenyl octanoate, 2-(5,5-dimethylhexanoyloxy)phenyl nonanoate, 2-(5,5-dimethylhexanoyloxy)phenyl decanoate, 2-(5,5-dimethylhexanoyloxy)phenyl undecanoate, 2-acetoxyphenyl 4,4-dimethylpentanoate, 2-(propionyloxy)phenyl 4,4-dimethylpentanoate, 2-(butyryloxy)phenyl 4,4-dimethylpentanoate, 2-(pentanoyloxy)phenyl 4,4-dimethylpentanoate, 2-(4,4-dimethylpentanoyloxy)phenyl hexanoate, 2-(4,4-dimethylpentanoyloxy)phenyl heptanoate, 2-(4,4-dimethylpentanoyloxy)phenyl octanoate, 2-(4,4-dimethylpentanoyloxy)phenyl nonanoate, 2-(4,4-dimethylpentanoyloxy)phenyl decanoate, 2-(4,4-dimethylpentanoyloxy)phenyl undecanoate, 2-acetoxyphenyl 8-ethyldecanoate, 2-(propionyloxy)phenyl 8-ethyldecanoate, 2-(butyryloxy)phenyl 8-ethyldecanoate, 2-(pentanoyloxy)phenyl 8-ethyldecanoate, 2-(hexanoyloxy)phenyl 8-ethyldecanoate, 2-(heptanoyloxy)phenyl 8-ethyldecanoate, 2-(octanoyloxy)phenyl 8-ethyldecanoate, 2-(nonanoyloxy)phenyl 8-ethyldecanoate, 2-(decanoyloxy)phenyl 8-ethyldecanoate, 2-(8-ethyldecanoyloxy)phenyl undecanoate, 2-acetoxyphenyl 9-ethylundecanoate, 2-(propionyloxy)phenyl 9-ethylundecanoate, 2-(butyryloxy)phenyl 9-ethylundecanoate, 2-(pentanoyloxy)phenyl 9-ethylundecanoate, 2-(hexanoyloxy)phenyl 9-ethylundecanoate, 2-(heptanoyloxy)phenyl 9-ethylundecanoate, 2-(octanoyloxy)phenyl 9-ethylundecanoate, 2-(nonanoyloxy)phenyl 9-ethylundecanoate, 2-(decanoyloxy)phenyl 9-ethylundecanoate, 2-acetoxyphenyl 2-methylbutanoate, 2-(propionyloxy)phenyl 2-methylbutanoate, 2-(butyryloxy)phenyl 2-methylbutanoate, 2-(2-methylbutanoyloxy)phenyl pentanoate, 2-(2-methylbutanoyloxy)phenyl hexanoate, 2-(2-methylbutanoyloxy)phenyl heptanoate, 2-(2-methylbutanoyloxy)phenyl octanoate, 2-(2-methylbutanoyloxy)phenyl nonanoate, 2-(2-methylbutanoyloxy)phenyl decanoate, 2-(2-methylbutanoyloxy)phenyl undecanoate, 2-acetoxyphenyl 2-methylpentanoate, 2-(propionyloxy)phenyl 2-methylpentanoate, 2-(butyryloxy)phenyl 2-methylpentanoate, 2-(pentanoyloxy)phenyl 2-methylpentanoate, 2-(2-methylpentanoyloxy)phenyl hexanoate, 2-(2-methylpentanoyloxy)phenyl heptanoate, 2-(2-methylpentanoyloxy)phenyl octanoate, 2-(2-methylpentanoyloxy)phenyl nonanoate, 2-(2-methylpentanoyloxy)phenyl decanoate, 2-acetoxyphenyl 2-methylhexanoate, 2-(propionyloxy)phenyl 2-methylhexanoate, 2-(butyryloxy)phenyl 2-methylhexanoate, 2-(pentanoyloxy)phenyl 2-methylhexanoate, 2-(hexanoyloxy)phenyl 2-methylhexanoate, 2-(2-methylhexanoyloxy)phenyl heptanoate, 2-(2-methylhexanoyloxy)phenyl octanoate, 2-(2-methylhexanoyloxy)phenyl nonanoate, 2-(2-methylhexanoyloxy)phenyl decanoate, 2-(2-methylhexanoyloxy)phenyl undecanoate, 2-acetoxyphenyl 2-methylheptanoate, 2-(propionyloxy)phenyl 2-methylheptanoate, 2-(butyryloxy)phenyl 2-methylheptanoate, 2-(pentanoyloxy)phenyl 2-methylheptanoate, 2-(hexanoyloxy)phenyl 2-methylheptanoate, 2-(heptanoyloxy)phenyl 2-methylheptanoate, 2-(2-methylheptanoyloxy)phenyl octanoate, 2-(2-methylheptanoyloxy)phenyl nonanoate, 2-(2-methylheptanoyloxy)phenyl decanoate, 2-(2-methylheptanoyloxy)phenyl undecanoate, 2-acetoxyphenyl 2-methyloctanoate, 2-(propionyloxy)phenyl 2-methyloctanoate, 2-(butyryloxy)phenyl 2-methyloctanoate, 2-(pentanoyloxy)phenyl 2-methyloctanoate, 2-(hexanoyloxy)phenyl 2-methyloctanoate, 2-(heptanoyloxy)phenyl 2-methyloctanoate, 2-(octanoyloxy)phenyl 2-methyloctanoate, 2-(2-methyloctanoyloxy)phenyl nonanoate, 2-(2-methyloctanoyloxy)phenyl decanoate, 2-(2-methyloctanoyloxy)phenyl undecanoate, 2-acetoxyphenyl 2-methyl nonanoate, 2-(propionyloxy)phenyl 2-methylnonanoate, 2-(butyryloxy)phenyl 2-methylnonanoate, 2-(pentanoyloxy(phenyl 2-methylnonanoate, 2(hexanoyloxy)phenyl 2-methylnonanoate, 2-(heptanoyloxy)phenyl 2-methylnonanoate, 2-(octanoyloxy)phenyl 2-methylnonanoate, 2-(nonanoyloxy)phenyl 2-methylnonanoate, 2-(2-methylnonanoyloxy)phenyl decanoate, 2-(2-methylnonanoyloxy)phenyl undecanoate, 2-acetoxyphenyl 2-methyldecanoate, 2-(propionyloxy)phenyl 2-methyldecanoate, 2-(butyryloxy)phenyl 2-methyldecanoate, 2-(pentanoyloxy)phenyl 2-methyldecanoate, 2-(hexanoyloxy)phenyl 2-methyldecanoate, 2-(heptanoyloxy)phenyl 2-methyldecanoate, 2-(octanoyloxy)phenyl 2-methyldecanoate, 2-(nonanoyloxy)phenyl 2-methyldecanoate, 2-(decanoyloxy)phenyl 2-methyldecanoate, 2-(2-methyldecanoyloxy)phenyl undecanoate, 2-acetoxyphenyl 2-propylpentanoate, 2-(propionyloxy)phenyl 2-propylpentanoate, 2-(butyryloxy)phenyl 2-propylpentanoate, 2-(pentanoyloxy)phenyl 2-propylpentanoate, 2-(2-propylpentanoyloxy)phenyl hexanoate, 2-(2-propylpentanoyloxy)phenyl heptanoate, 2-(2-propylpentanoyloxy)phenyl octanoate, 2-(2-propylpentanoyloxy)phenyl nonanoate, 2-(2-propylpentanoyloxy)phenyl decanoate, 2-(2-propylpentanoyloxy)phenyl undecanoate, 2-acetoxyphenyl 2-propylhexanoate, 2-(propionyloxy)phenyl 2-propylhexanoate, 2-(butyryloxy)phenyl 2-propyl hexanoate, 2-(pentanoyloxy)phenyl 2-propyl hexanoate, 2-(hexanoyloxy)phenyl 2-propyl hexanoate, 2-(2-propylhexanoyloxy)phenyl heptanoate, 2-(2-propylhexanoyloxy)phenyl octanoate, 2-(2-propylhexanoyloxy)phenyl nonanoate, 2-(2-propylhexanoyloxy)phenyl decanoate, 2-(2-propylhexanoyloxy)phenyl undecanoate, 2-acetoxyphenyl 2-propylheptanoate, 2-(propionyloxy)phenyl 2-propylheptanoate, 2-(butyryloxy)phenyl 2-propylhepanoate, 2-(pentanoyloxy)phenyl 2-propylheptanoate, 2-(hexanoyloxy)phenyl 2-propylheptanoate, 2-(heptanoyloxy)phenyl 2-propylheptanoate, 2-(2-propylheptanoyloxy)phenyl octanoate, 2-(2-propylheptanoyloxy)phenyl nonanoate, 2-(2-propylheptanoyloxy)phenyl decanoate, 2-(2-propylheptanoyloxy)phenyl undecanoate, 2-acetoxyphenyl 2-propyloctanoate, 2-(propionyloxy)phenyl 2-propyloctanoate, 2-(butyryloxy)phenyl 2-propyloctanoate, 2-(pentanoyloxy)phenyl 2-propyloctanoate, 2-(hexanoyloxy)phenyl 2-propyloctanoate, 2-(heptanoyloxy)phenyl 2-propyloctanoate, 2-(octanoyloxy)phenyl 2-propyloctanoate, 2-(2-propyloctanoyloxy)phenyl nonanoate, 2-(2-propyloctanoyloxy)phenyl decanoate and 2-(2-propyloctanoyloxy)phenyl undecanoate.

Preferred compounds in accordance with the second embodiment are 2-(isobutyryloxy)phenyl acetate, 2-(isobutyryloxy)phenyl propanoate, 2-(isobutyryloxy)phenyl butyrate and 2-(isobutyryloxy)phenyl benzoate.

In a third embodiment, $R_1$-$R_6$ groups are equal or different from each other. Each of $R_1$-$R_6$ are selected from hydrogen, halogen, $C_1$-$C_{20}$ linear or branched alkyl group which can be linked with cyclic rings, $C_6$-$C_{14}$ aryl groups, $C_3$-$C_{15}$ cycloalkyl groups, $C_1$-$C_{20}$ alkoxy group, a heteroatom, arylalkyl or alkylaryl groups and combinations thereof.

Particularly, the structure (A) includes at least one of $R_3$-$R_6$ i.e $R_5$ is selected from hydrogen, halogen, $C_1$-$C_{20}$ linear or branched alkyl group which may be linked with cyclic ring, $C_6$-$C_{14}$ aryl groups, $C_3$-$C_{15}$ cycloalkyl groups, $C_1$-$C_{20}$ alkoxy group, a heteroatom, arylalkyl or alkylaryl groups and combinations thereof. Also, the structure (A) includes at least one of $R_1$-$R_2$ selected from $C_1$-$C_{20}$ linear or branched alkyl group which may be linked with cyclic ring, $C_3$-$C_{15}$ cycloalkyl groups, a heteroatom, arylalkyl or alkylaryl, alkylalkoxy or alkoxyalkyl, arylalkoxy or alkoxyaryl, alkylcycloalkyl or cycloalkylalkyl groups and combinations thereof, wherein $R_1$-$R_2$ is same.

The non limiting examples in accordance with the third embodiment can be: 4-chloro-1,2-phenylene diacetate, 4-bromo-1,2-phenylene diacetate, 4-fluro-1,2-phenylene diacetate, 4-iodo-1,2-phenylene diacetate, 4-methyl-1,2-phenylene diacetate, 4-ethyl-1,2-phenylene diacetate, 4-butyl-1,2-phenylene diacetate, 4-isobutyl-1,2-phenylene diacetate, 4-tert-butyl-1,2-phenylene diacetate, 4-isopropyl-1,2-phenylene diacetate, 4-pentyl-1,2-phenylene diacetate, 4-isopentyl-1,2-phenylene diacetate, 4-hexyl-1,2-phenylene diacetate, 4-heptyl-1,2-phenylene diacetate, 4-octyl-1,2-phenylene diacetate, 4-nonyl-1,2-phenylene diacetate, 4-decyl-1,2-phenylene diacetate, 4-dodecyl-1,2-phenylene diacetate, 4-methoxy-1,2-phenylene diacetate, 4-ethoxy-1,2-phenylene diacetate, 4-propoxy-1,2-phenylene diacetate, 4-isopropoxy-1,2-phenylene diacetate, 4-butoxy-1,2-phenylene diacetate, 4-isobutoxy-1,2-phenylene diacetate, 4-tert-butoxy-1,2-phenylene diacetate, 4-pentoxy-1,2-phenylene diacetate, 4-hexoxy-1,2-phenylene diacetate, 4-heptoxy-1,2-phenylene diacetate, 4-octoxy-1,2-phenylene diacetate, 4-nonoxy-1,2-phenylene diacetate, 4-decoxy-1,2-phenylene diacetate, 4-phenoxy-1,2-phenylene diacetate, 4-chloro-1,2-phenylene diisopropanoate, 4-bromo-1,2-phenylene diisopropanoate, 4-fluro-1,2-phenylene diisopropanoate, 4-iodo-1,2-phenylene diisopropanoate, 4-methyl-1,2-phenylene diisopropanoate, 4-ethyl-1,2-phenylene diisopropanoate, 4-butyl-1,2-phenylene diisopropanoate, 4-isobutyl-1,2-phenylene diisopropanoate, 4-tert-butyl-1,2-phenylene diisopropanoate, 4-isopropyl-1,2-phenylene diisopropanoate, 4-pentyl-1,2-phenylene diisopropanoate, 4-isopentyl-1,2-phenylene diisopropanoate 4-hexyl-1,2-phenylene diisopropanoate, 4-heptyl-1,2-phenylene diisopropanoate, 4-octyl-1,2-phenylene diisopropanoate, 4-nonyl-1,2-phenylene diisopropanoate, 4-decyl-1,2-phenylene diisopropanoate, 4-dodecyl-1,2-phenylene diisopropanoate, 4-methoxy-1,2-phenylene diisopropanoate 4-ethoxy-1,2-phenylene diisopropanoate, 4-propoxy-1,2-phenylene diisopropanoate, 4-isopropoxy-1,2-phenylene diisopropanoate, 4-butoxy-1,2-phenylene diisopropanoate, 4-isobutoxy-1,2-phenylene diisopropanoate, 4-tert-butoxy-1,2-phenylene dipropaonate, 4-pentoxy-1,2-phenylene diisopropanoate, 4-hexoxy-1,2-phenylene diisopropanoate, 4-heptoxy-1,2-phenylene diisopropanoate, 4-octoxy-1,2-phenylene diisopropanoate, 4-nonoxy-1,2-phenylene diisopropanoate, 4-decoxy-1,2-phenylene diisopropanoate, 4-phenoxy-1,2-phenylene diisopropanoate, 4-chloro-1,2-phenylene diisopropanoate, 4-bromo-1,2-phenylene diisopropanoate, 4-fluro-1,2-phenylene diisopropanoate, 4-iodo-1,2-phenylene diisopropanoate, 4-methyl-1,2-phenylene diisopropanoate, 4-ethyl-1,2-phenylene diisopropanoate, 4-butyl-1,2-phenylene diisopropanoate, 4-isobutyl-1,2-phenylene diisopropanoate, 4-tert-butyl-1,2-phenylene diisopropanoate, 4-isopropyl-1,2-phenylene diisopropanoate, 4-pentyl-1,2-phenylene diisopropanoate, 4-isopentyl-1,2-phenylene diisopropanoate, 4-hexyl-1,2-phenylene diisopropanoate, 4-heptyl-1,2-phenylene diisopropanoate, 4-octyl-1,2-phenylene diisopropanoate, 4-nonyl-1,2-phenylene diisopropanoate, 4-decyl-1,2-phenylene diisopropanoate, 4-dodecyl-1,2-phenylene diisopropanoate, 4-methoxy-1,2-phenylene diisopropanoate, 4-ethoxy-1,2-phenylene diisopropanoate, 4-propoxy-1,2-phenylene diisopropanoate, 4-isopropoxy-1,2-phenylene diisopropanoate, 4-butoxy-1,2-phenylene diisopropanoate, 4-isobutoxy-1,2-phenylene diisopropanoate, 4-tert-butoxy-1,2-phenylene diisopropanoate, 4-pentoxy-1,2-phenylene diisopropanoate, 4-hexoxy-1,2-phenylene diisopropanoate, 4-heptoxy-1,2-phenylene diisopropanoate, 4-octoxy-1,2-phenylene diisopropanoate, 4-nonoxy-1,2-phenylene diisopropanoate, 4-decoxy-1,2-phenylene diisopropanoate, 4-phenoxy-1,2-phenylene diisopropanoate, 4-chloro-1,2-phenylene dibutanoate, 4-bromo-1,2-phenylene dibutanoate, 4-fluro-1,2-phenylene dibutanoate, 4-iodo-1,2-phenylene dibutanoate, 4-methyl-1,2-phenylene dibutanoate, 4-ethyl-1,2-phenylene dibutanoate, 4-butyl-1,2-phenylene dibutanoate, 4-isobutyl-1,2-phenylene dibutanoate, 4-tert-butyl-1,2-phenylene dibutanoate, 4-isopropyl-1,2-phenylene dibutanoate, 4-pentyl-1,2-phenylene dibutanoate, 4-isopentyl-1,2-phenylene dibutanoate, 4-hexyl-1,2-phenylene dibutanoate, 4-heptyl-1,2-phenylene dibutanoate, 4-octyl-1,2-phenylene dibutanoate, 4-nonyl-1,2-phenylene dibutanoate, 4-decyl-1,2-phenylene dibutanoate, 4-dodecyl-1,2-phenylene dibutanoate, 4-methoxy-1,2-phenylene dibutanoate, 4-ethoxy-1,2-phenylene dibutanoate, 4-propoxy-1,2-phenylene dibutanoate, 4-isopropoxy-1,2-phenylene dibutanoate, 4-butoxy-1,2-phenylene dibutanoate, 4-isobutoxy-1,2-phenylene dibutanoate, 4-tert-butoxy-1,2-phenylene dibutanoate, 4-pentoxy-1,2-phenylene dibutanoate, 4-hexoxy-1,2-phenylene dibutanoate, 4-heptoxy-1,2-phenylene dibutanoate, 4-octoxy-1,2-phenylene dibutanoate, 4-nonoxy-1,2-phenylene dibutanoate, 4-decoxy-1,2-phenylene dibutanoate, 4-phenoxy-1,2-phenylene dibutanoate, 4-chloro-1,2-phenylene diisobutanoate, 4-bromo-1,2-phenylene diisobutanoate, 4-fluro-1,2-phenylene diisobutanoate, 4-iodo-1,2-phenylene diisobutanoate, 4-methyl-1,2-phenylene diisobutanoate, 4-ethyl-1,2-phenylene diisobutanoate, 4-butyl-1,2-phenylene diisobutanoate, 4-isobutyl-1,2-phenylene diisobutanoate, 4-tert-butyl-1,2-phenylene diisobutanoate, 4-isopropyl-1,2-phenylene diisobutanoate, 4-pentyl-1,2-phenylene diisobutanoate, 4-isopentyl-1,2-phenylene diisobutanoate, 4-hexyl-1,2-phenylene diisobutanoate, 4-heptyl-1,2-phenylene diisobutanoate, 4-octyl-1,2-phenylene diisobutanoate, 4-nonyl-1,2-phenylene diisobutanoate, 4-decyl-1,2-phenylene diisobutanoate, 4-dodecyl-1,2-phenylene diisobutanoate, 4-methoxy-1,2-phenylene diisobutanoate, 4-ethoxy-1,2-phenylene diisobutanoate, 4-propoxy-1,2-phenylene diisobutanoate, 4-isopropoxy-1,2-phenylene diisobutanoate, 4-butoxy-1,2-phenylene diisobutanoate, 4-isobutoxy-1,2-phenylene diisobutanoate, 4-tert-butoxy-1,2-phenylene diisobutanoate, 4-pentoxy-1,2-phenylene diisobutanoate, 4-hexoxy-1,2-phenylene diisobutanoate, 4-heptoxy-1,2-phenylene diisobutanoate, 4-octoxy-1,2-phenylene diisobutanoate, 4-nonoxy-1,2-phenylene diisobutanoate, 4-decoxy-1,2-phenylene diisobutanoate, 4-phenoxy-1,2-phenylene diisobutanoate, 4-chloro-1,2-phenylene di-tert-butanoate, 4-bromo-1,2-phenylene di-tert-butanoate, 4-fluro-1,2-phenylene di-tert-butanoate, 4-iodo-1,2-phenylene di-tert-butanoate, 4-methyl-1,2-phenylene di-tert-butanoate, 4-ethyl-1,2-phenylene di-tert-butanoate, 4-butyl-1,2-phenylene di-tert-butanoate, 4-isobutyl-1,2-phenylene di-tert-butanoate, 4-tert-butyl-1,2-phenylene di-tert-butanoate, 4-isopropyl-1,2-phenylene di-tert-butanoate, 4-pentyl-1,2-phenylene di-tert-butanoate, 4-isopentyl-1,2-phenylene di-tert-butanoate, 4-hexyl-1,2-phenylene di-tert-butanoate, 4-heptyl-1,2-phenylene di-tert-butanoate, 4-octyl-1,2-phenylene di-tert-butanoate, 4-nonyl-1,2-phenylene di-tert-butanoate, 4-decyl-1,2-phenylene di-tert-butanoate, 4-dodecyl-1,2-phenylene di-tert-butanoate, 4-methoxy-1,2-phenylene di-tert-butanoate, 4-ethoxy-1,2-phenylene di-tert-butanoate, 4-propoxy-1,2-phenylene di-tert-butanoate, 4-isopropoxy-1,2-phenylene di-tert-butanoate, 4-butoxy-1,2-phenylene di-tert-butanoate, 4-isobutoxy-1,2-phenylene di-tert-butanoate, 4-t-butoxy-1,2-phenylene di-tert-butanoate, 4-pentoxy-1,2-phenylene di-tert-butanoate, 4-hexoxy-1,2-phenylene di-tert-butanoate, 4-heptoxy-1,2-phenylene di-tert-butanoate, 4-octoxy-1,2-phenylene di-tert-butanoate, 4-nonoxy-1,2-phenylene di-tert-butanoate, 4-decoxy-1,2-phenylene di-tert-butanoate, 4-phenoxy-1,2-phenylene di-tert-butanoate, 4-chloro-1,2-phenylene dipentanoate, 4-bromo-1,2-phenylene dipentanoate, 4-fluro-1,2-phenylene dipentanoate, 4-iodo-1,2-phenylene dipentanoate, 4-methyl-1,2-phenylene dipentanoate, 4-ethyl-1,2-phenylene dipentanoate, 4-butyl-1,2-phenylene dipentanoate, 4-isobutyl-1,2-phenylene dipentanoate, 4-tert-butyl-1,2-phenylene dipentanoate, 4-isopropyl-1,2-phenylene dipentanoate, 4-pentyl-1,2-phenylene dipentanoate, 4-isopentyl-1,2-phenylene dipentanoate, 4-hexyl-1,2-phenylene dipentanoate, 4-heptyl-1,2-phenylene dipentanoate, 4-octyl-1,2-phenylene dipentanoate, 4-nonyl-1,2-phenylene dipentanoate, 4-decyl-1,2-phenylene dipentanoate, 4-dodecyl-1,2-phenylene dipentanoate, 4-methoxy-1,2-phenylene dipentanoate, 4-ethoxy-1,2-phenylene dipentanoate, 4-propoxy-1,2-phenylene dipentanoate, 4-isopropoxy-1,2-phenylene dipentanoate, 4-butoxy-1,2-phenylene dipentanoate, 4-isobutoxy-1,2-phenylene dipentanoate, 4-tert-butoxy-1,2-phenylene dipentanoate, 4-pentoxy-1,2-phenylene dipentanoate, 4-hexoxy-1,2-phenylene dipentanoate, 4-heptoxy-1,2-phenylene dipentanoate, 4-octoxy-1,2-phenylene dipentanoate, 4-nonoxy-1,2-phenylene dipentanoate, 4-decoxy-1,2-phenylene dipentanoate, 4-phenoxy-1,2-phenylene dipentanoate, 4-chloro-1,2-phenylene disoipentanoate, 4-bromo-1,2-phenylene disoipentanoate, 4-fluro-1,2-phenylene disoipentanoate, 4-iodo-1,2-phenylene disoipentanoate, 4-methyl-1,2-phenylene disoipentanoate, 4-ethyl-1,2-phenylene disoipentanoate, 4-butyl-1,2-phenylene disoipentanoate, 4-isobutyl-1,2-phenylene disoipentanoate, 4-tert-butyl-1,2-phenylene disoipentanoate, 4-isopropyl-1,2-phenylene disoipentanoate, 4-pentyl-1,2-phenylene disoipentanoate, 4-isopentyl-1,2-phenylene disoipentanoate, 4-hexyl-1,2-phenylene disoipentanoate, 4-heptyl-1,2-phenylene disoipentanoate, 4-octyl-1,2-phenylene disoipentanoate, 4-nonyl-1,2-phenylene disoipentanoate, 4-decyl-1,2-phenylene disoipentanoate, 4-dodecyl-1,2-phenylene disoipentanoate, 4-methoxy-1,2-phenylene diisopentanoate, 4-ethoxy-1,2-phenylene disoipentanoate, 4-propoxy-1,2-phenylene disoipentanoate, 4-isopropoxy-1,2-phenylene disoipentanoate, 4-butoxy-1,2-phenylene disoipentanoate, 4-isobutoxy-1,2-phenylene disoipentanoate, 4-tert-butoxy-1,2-phenylene disoipentanoate, 4-pentoxy-1,2-phenylene disoipentanoate, 4-hexoxy-1,2-phenylene disoipentanoate, 4-heptoxy-1,2-phenylene disoipentanoate, 4-octoxy-1,2-phenylene disoipentanoate, 4-nonoxy-1,2-phenylene disoipentanoate, 4-decoxy-1,2-phenylene disoipentanoate, 4-phenoxy-1,2-phenylene disoipentanoate, 4-chloro-1,2-phenylene dihexanoate, 4-bromo-1,2-phenylene dihexanoate, 4-fluro-1,2-phenylene dihexanoate, 4-iodo-1,2-phenylene dihexanoate, 4-methyl-1,2-phenylene dihexanoate, 4-ethyl-1,2-phenylene dihexanoate, 4-butyl-1,2-phenylene dihexanoate, 4-isobutyl-1,2-phenylene dihexanoate, 4-tert-butyl-1,2-phenylene dihexanoate, 4-isopropyl-1,2-phenylene dihexanoate, 4-pentyl-1,2-phenylene dihexanoate, 4-isopentyl-1,2-phenylene dihexanoate, 4-hexyl-1,2-phenylene dihexanoate, 4-heptyl-1,2-phenylene dihexanoate, 4-octyl-1,2-phenylene dihexanoate, 4-nonyl-1,2-phenylene dihexanoate, 4-decyl-1,2-phenylene dihexanoate, 4-dodecyl-1,2-phenylene dihexanoate, 4-methoxy-1,2-phenylene dihexanoate, 4-ethoxy-1,2-phenylene dihexanoate, 4-propoxy-1,2-phenylene dihexanoate, 4-isopropoxy-1,2-phenylene dihexanoate, 4-butoxy-1,2-phenylene dihexanoate, 4-isobutoxy-1,2-phenylene dihexanoate, 4-tert-butoxy-1,2-phenylene dihexanoate, 4-pentoxy-1,2-phenylene dihexanoate, 4-hexoxy-1,2-phenylene dihexanoate, 4-heptoxy-1,2-phenylene dihexanoate, 4-octoxy-1,2-phenylene dihexanoate, 4-nonoxy-1,2-phenylene dihexanoate, 4-decoxy-1,2-phenylene dihexanoate, 4-phenoxy-1,2-phenylene dihexanoate, 4-chloro-1,2-phenylene diisohexanoate, 4-bromo-1,2-phenylene diisohexanoate, 4-fluro-1,2-phenylene diisohexanoate, 4-iodo-1,2-phenylene diisohexanoate, 4-methyl-1,2-phenylene diisohexanoate, 4-ethyl-1,2-phenylene diisohexanoate, 4-butyl-1,2-phenylene diisohexanoate, 4-isobutyl-1,2-phenylene diisohexanoate, 4-tert-butyl-1,2-phenylene diisohexanoate, 4-isopropyl-1,2-phenylene diisohexanoate, 4-pentyl-1,2- phenylene diisohexanoate, 4-isopentyl-1,2-phenylene diisohexanoate, 4-hexyl-1,2-phenylene diisohexanoate, 4-heptyl-1,2-phenylene diisohexanoate, 4-octyl-1,2-phenylene diisohexanoate, 4-nonyl-1,2-phenylene diisohexanoate, 4-decyl-1,2-phenylene diisohexanoate, 4-dodecyl-1,2-phenylene diisohexanoate, 4-methoxy-1,2-phenylene diisohexanoate, 4-ethoxy-1,2-phenylene diisohexanoate, 4-propoxy-1,2-phenylene diisohexanoate, 4-isopropoxy-1,2-phenylene diisohexanoate, 4-butoxy-1,2-phenylene diisohexanoate, 4-isobutoxy-1,2-phenylene diisohexanoate, 4-tert-butoxy-1,2-phenylene diisohexanoate, 4-pentoxy-1,2-phenylene diisohexanoate, 4-hexoxy-1,2-phenylene diisohexanoate, 4-heptoxy-1,2-phenylene diisohexanoate, 4-octoxy-1,2-phenylene diisohexanoate, 4-nonoxy-1,2-phenylene diisohexanoate, 4-decoxy-1,2-phenylene diisohexanoate, 4-phenoxy-1,2-phenylene diisohexanoate, 4-chloro-1,2-phenylene diheptanoate, 4-bromo-1,2-phenylene diheptanoate, 4-fluro-1,2-phenylene diheptanoate, 4-iodo-1,2-phenylene diheptanoate, 4-methyl-1,2-phenylene diheptanoate, 4-ethyl-1,2-phenylene diheptanoate, 4-butyl-1,2-phenylene diheptanoate, 4-isobutyl-1,2-phenylene diheptanoate, 4-tert-butyl-1,2-phenylene diheptanoate, 4-isopropyl-1,2-phenylene diheptanoate, 4-pentyl-1,2-phenylene diheptanoate, 4-isopentyl-1,2-phenylene diheptanoate, 4-hexyl-1,2-phenylene diheptanoate, 4-heptyl-1,2-phenylene diheptanoate, 4-octyl-1,2-phenylene diheptanoate, 4-nonyl-1,2-phenylene diheptanoate, 4-decyl-1,2-phenylene diheptanoate, 4-dodecyl-1,2-phenylene diheptanoate, 4-methoxy-1,2-phenylene diheptanoate, 4-ethoxy-1,2-phenylene diheptanoate, 4-propoxy-1,2-phenylene diheptanoate, 4-isopropoxy-1,2-phenylene diheptanoate, 4-butoxy-1,2-phenylene diheptanoate, 4-isobutoxy-1,2-phenylene diheptanoate, 4-tert-butoxy-1,2-phenylene diheptanoate, 4-pentoxy-1,2-phenylene diheptanoate, 4-hexoxy-1,2-phenylene diheptanoate, 4-heptoxy-1,2-phenylene diheptanoate, 4-octoxy-1,2-phenylene diheptanoate, 4-nonoxy-1,2-phenylene diheptanoate, 4-decoxy-1,2-phenylene diheptanoate, 4-phenoxy-1,2-phenylene diheptanoate, 4-chloro-1,2-phenylene diisoheptanoate, 4-bromo-1,2-phenylene diisoheptanoate, 4-fluro-1,2-phenylene diisoheptanoate, 4-iodo-1,2-phenylene diisoheptanoate, 4-methyl-1,2-phenylene diisoheptanoate, 4-ethyl-1,2-phenylene diisoheptanoate, 4-butyl-1,2-phenylene diisoheptanoate, 4-isobutyl-1,2-phenylene diisoheptanoate, 4-tert-butyl-1,2-phenylene diisoheptanoate, 4-isopropyl-1,2-phenylene diisoheptanoate, 4-pentyl-1,2-phenylene diisoheptanoate, 4-isopentyl-1,2-phenylene diisoheptanoate, 4-hexyl-1,2-phenylene diisoheptanoate, 4-heptyl-1,2-phenylene diisoheptanoate, 4-octyl-1,2-phenylene diisoheptanoate, 4-nonyl-1,2-phenylene diisoheptanoate, 4-decyl-1,2-phenylene diisoheptanoate, 4-dodecyl-1,2-phenylene diisoheptanoate, 4-methoxy-1,2-phenylene diisoheptanoate, 4-ethoxy-1,2-phenylene diisoheptanoate, 4-propoxy-1,2-phenylene diisoheptanoate, 4-isopropoxy-1,2-phenylene diisoheptanoate, 4-butoxy-1,2-phenylene diisoheptanoate, 4-isobutoxy-1,2-phenylene diisoheptanoate, 4-tert-butoxy-1,2-phenylene diisoheptanoate, 4-pentoxy-1,2-phenylene diisoheptanoate, 4-hexoxy-1,2-phenylene diisoheptanoate, 4-heptoxy-1,2-phenylene diisoheptanoate, 4-octoxy-1,2-phenylene diisoheptanoate, 4-nonoxy-1,2-phenylene diisoheptanoate, 4-decoxy-1,2-phenylene diisoheptanoate, 4-phenoxy-1,2-phenylene diisoheptanoate, 4-chloro-1,2-phenylene dioctanoate, 4-bromo-1,2-phenylene dioctanoate, 4-fluro-1,2-phenylene dioctanoate, 4-iodo-1,2-phenylene dioctanoate, 4-methyl-1,2-phenylene dioctanoate, 4-ethyl-1,2-phenylene dioctanoate, 4-butyl-1,2-phenylene dioctanoate, 4-isobutyl-1,2-phenylene dioctanoate, 4-tert-butyl-1,2-phenylene dioctanoate, 4-isopropyl-1,2-phenylene dioctanoate, 4-pentyl-1,2-phenylene dioctanoate, 4-isopentyl-1,2-phenylene dioctanoate, 4-hexyl-1,2-phenylene dioctanoate, 4-heptyl-1,2-phenylene dioctanoate, 4-octyl-1,2-phenylene dioctanoate, 4-nonyl-1,2-phenylene dioctanoate, 4-decyl-1,2-phenylene dioctanoate, 4-dodecyl-1,2-phenylene dioctanoate, 4-methoxy-1,2-phenylene dioctanoate, 4-ethoxy-1,2-phenylene dioctanoate, 4-propoxy-1,2-phenylene dioctanoate, 4-isopropoxy-1,2-phenylene dioctanoate, 4-butoxy-1,2-phenylene dioctanoate, 4-isobutoxy-1,2-phenylene dioctanoate, 4-tert-butoxy-1,2-phenylene dioctanoate, 4-pentoxy-1,2-phenylene dioctanoate, 4-hexoxy-1,2-phenylene dioctanoate, 4-heptoxy-1,2-phenylene dioctanoate, 4-octoxy-1,2-phenylene dioctanoate, 4-nonoxy-1,2-phenylene dioctanoate, 4-decoxy-1,2-phenylene dioctanoate, 4-phenoxy-1,2-phenylene dioctanoate, 4-chloro-1,2-phenylene diisooctanoate, 4-bromo-1,2-phenylene diisooctanoate, 4-fluro-1,2-phenylene diisooctanoate, 4-iodo-1,2-phenylene diisooctanoate, 4-methyl-1,2-phenylene diisooctanoate, 4-ethyl-1,2-phenylene diisooctanoate, 4-butyl-1,2-phenylene diisooctanoate, 4-isobutyl-1,2-phenylene diisooctanoate, 4-tert-butyl-1,2-phenylene diisooctanoate, 4-isopropyl-1,2-phenylene diisooctanoate, 4-pentyl-1,2-phenylene diisooctanoate, 4-isopentyl-1,2-phenylene diisooctanoate, 4-hexyl-1,2-phenylene diisooctanoate, 4-heptyl-1,2-phenylene diisooctanoate, 4-octyl-1,2-phenylene diisooctanoate, 4-nonyl-1,2-phenylene diisooctanoate, 4-decyl-1,2-phenylene diisooctanoate, 4-dodecyl-1,2-phenylene diisooctanoate, 4-methoxy-1,2-phenylene diisooctanoate, 4-ethoxy-1,2-phenylene diisooctanoate, 4-propoxy-1,2-phenylene diisooctanoate, 4-isopropoxy-1,2-phenylene diisooctanoate, 4-butoxy-1,2-phenylene diisooctanoate, 4-isobutoxy-1,2-phenylene diisooctanoate, 4-tert-butoxy-1,2-phenylene diisooctanoate, 4-pentoxy-1,2-phenylene diisooctanoate, 4-hexoxy-1,2-phenylene diisooctanoate, 4-heptoxy-1,2-phenylene diisooctanoate, 4-octoxy-1,2-phenylene diisooctanoate, 4-nonoxy-1,2-phenylene diisooctanoate, 4-decoxy-1,2-phenylene diisooctanoate, 4-phenoxy-1,2-phenylene diisooctanoate, 4-chloro-1,2-phenylene dinonanoate, 4-bromo-1,2-phenylene dinonanoate, 4-fluro-1,2-phenylene dinonanoate, 4-iodo-1,2-phenylene dinonanoate, 4-methyl-1,2-phenylene dinonanoate, 4-ethyl-1,2-phenylene dinonanoate, 4-butyl-1,2-phenylene dinonanoate, 4-isobutyl-1,2-phenylene dinonanoate, 4-tert-butyl-1,2-phenylene dinonanoate, 4-isopropyl-1,2-phenylene dinonanoate, 4-pentyl-1,2-phenylene dinonanoate, 4-isopentyl-1,2-phenylene dinonanoate, 4-hexyl-1,2-phenylene dinonanoate, 4-heptyl-1,2-phenylene dinonanoate, 4-octyl-1,2-phenylene dinonanoate, 4-nonyl-1,2-phenylene dinonanoate, 4-decyl-1,2-phenylene dinonanoate, 4-dodecyl-1,2-phenylene dinonanoate, 4-methoxy-1,2-phenylene dinonanoate, 4-ethoxy-1,2-phenylene dinonanoate, 4-propoxy-1,2-phenylene dinonanoate, 4-isopropoxy-1,2-phenylene dinonanoate, 4-butoxy-1,2-phenylene dinonanoate, 4-isobutoxy-1,2-phenylene dinonanoate, 4-tert-butoxy-1,2-phenylene dinonanoate, 4-pentoxy-1,2-phenylene dinonanoate, 4-hexoxy-1,2-phenylene dinonanoate, 4-heptoxy-1,2-phenylene dinonanoate, 4-octoxy-1,2-phenylene dinonanoate, 4-nonoxy-1,2-phenylene dinonanoate, 4-decoxy-1,2-phenylene dinonanoate, 4-phenoxy-1,2-phenylene dinonanoate, 4-chloro-1,2-phenylene didecanoate, 4-bromo-1,2-phenylene didecanoate, 4-fluro-1,2-phenylene didecanoate, 4-iodo-1,2-phenylene didecanoate, 4-methyl-1,2-phenylene didecanoate, 4-ethyl-1,2-phenylene didecanoate, 4-butyl-1,2-phenylene didecanoate, 4-isobutyl-1,2-phenylene didecanoate, 4-tert-butyl-1,2-phenylene didecanoate, 4-isopropyl-1,2-phenylene didecanoate, 4-pentyl-1,2-phenylene didecanoate, 4-isopentyl-1,2-phenylene didecanoate, 4-hexyl-1,2-phenylene didecanoate, 4-heptyl-1,2-phenylene didecanoate, 4-octyl-1,2-phenylene didecanoate, 4-nonyl-1,2-phenylene didecanoate, 4-decyl-1,2-phenylene didecanoate, 4-dodecyl-1,2-phenylene didecanoate, 4-methoxy-1,2-phenylene didecanoate, 4-ethoxy-1,2-phenylene didecanoate, 4-propoxy-1,2-phenylene didecanoate, 4-isopropoxy-1,2-phenylene didecanoate, 4-butoxy-1,2-phenylene didecanoate, 4-isobutoxy-1,2-phenylene didecanoate, 4-tert-butoxy-1,2-phenylene didecanoate, 4-pentoxy-1,2-phenylene didecanoate, 4-hexoxy-1,2-phenylene didecanoate, 4-heptoxy-1,2-phenylene didecanoate, 4-octoxy-1,2-phenylene didecanoate, 4-nonoxy-1,2-phenylene didecanoate, 4-decoxy-1,2-phenylene didecanoate, 4-phenoxy-1,2-phenylene didecanoate, Preferred compounds in accordance with the third embodiment are 4-chloro-1,2-phenylene diacetate, 4-tert-butyl-1,2-phenylene diacetate and 4-methyl-1,2-phenylene diacetate.

In a fourth embodiment, $R_1$-$R_6$ groups are equal or different from each other. Each of $R_1$-$R_6$ are selected from hydrogen, halogen, $C_1$-$C_{20}$ linear or branched alkyl group which can be linked with cyclic rings, $C_6$-$C_{14}$ aryl groups, $C_3$-$C_{15}$ cycloalkyl groups, $C_1$-$C_{20}$ alkoxy group, a heteroatom, arylalkyl or alkylaryl groups and combinations thereof.

Particularly, the structure (A) includes at least one of $R_3$-$R_6$ i.e $R_6$ is selected from hydrogen, halogen, $C_1$-$C_{20}$ linear or branched alkyl group which may be linked with cyclic ring, $C_6$-$C_{14}$ aryl groups, $C_3$-$C_{15}$ cycloalkyl groups, $C_1$-$C_{20}$ alkoxy group, a heteroatom, arylalkyl or alkylaryl groups and combinations thereof. Also, the structure (A) includes at least one of $R_1$-$R_2$ selected from $C_1$-$C_{20}$ linear or branched alkyl group which may be linked with cyclic ring, $C_3$-$C_{15}$ cycloalkyl groups, a heteroatom, arylalkyl or alkylaryl, alkylalkoxy or alkoxyalkyl, arylalkoxy or alkoxyaryl, alkylcycloalkyl or cycloalkylalkyl groups and combinations thereof, wherein $R_1$-$R_2$ is same.

The non limiting examples in accordance with the forth embodiment can be: 3-chloro-1,2-phenylene diacetate, 3-bromo-1,2-phenylene diacetate, 3-fluro-1,2-phenylene diacetate, 3-iodo-1,2-phenylene diacetate, 3-methyl-1,2-phenylene diacetate, 3-ethyl-1,2-phenylene diacetate, 3-butyl-1,2-phenylene diacetate, 3-isobutyl-1,2-phenylene diacetate, 3-tert-butyl-1,2-phenylene diacetate, 3-isopropyl-1,2-phenylene diacetate, 3-pentyl-1,2-phenylene diacetate, 3-isopentyl-1,2-phenylene diacetate, 3-hexyl-1,2-phenylene diacetate, 3-heptyl-1,2-phenylene diacetate, 3-octyl-1,2-phenylene diacetate, 3-nonyl-1,2-phenylene diacetate, 3-decyl-1,2-phenylene diacetate, 3-dodecyl-1,2-phenylene diacetate, 3-methoxy-1,2-phenylene diacetate, 3-ethoxy-1,2-phenylene diacetate, 3-propoxy-1,2-phenylene diacetate, 3-isopropoxy-1,2-phenylene diacetate, 3-butoxy-1,2-phenylene diacetate, 3-isobutoxy-1,2-phenylene diacetate, 3-tert-butoxy-1,2-phenylene diacetate, 3-pentoxy-1,2-phenylene diacetate, 3-hexoxy-1,2-phenylene diacetate, 3-heptoxy-1,2-phenylene diacetate, 3-octoxy-1,2-phenylene diacetate, 3-nonoxy-1,2-phenylene diacetate, 3-decoxy-1,2-phenylene diacetate, 3-phenoxy-1,2-phenylene diacetate, 3-chloro-1,2-phenylene diisopropanoate, 3-bromo-1,2-phenylene diisopropanoate, 3-fluro-1,2-phenylene diisopropanoate, 3-iodo-1,2-phenylene diisopropanoate, 3-methyl-1,2-phenylene diisopropanoate, 3-ethyl-1,2-phenylene diisopropanoate, 3-butyl-1,2-phenylene diisopropanoate, 3-isobutyl-1,2-phenylene diisopropanoate, 3-tert-butyl-1,2-phenylene diisopropanoate, 3-isopropyl-1,2-phenylene diisopropanoate, 3-pentyl-1,2-phenylene diisopropanoate, 3-isopentyl-1,2-phenylene diisopropanoate 3-hexyl-1,2-phenylene diisopropanoate, 3-heptyl-1,2-phenylene diisopropanoate, 3-octyl-1,2-phenylene diisopropanoate, 3-nonyl-1,2-phenylene diisopropanoate, 3-decyl-1,2-phenylene diisopropanoate, 3-dodecyl-1,2-phenylene diisopropanoate, 3-methoxy-1,2-phenylene diisopropanoate 3-ethoxy-1,2-phenylene diisopropanoate, 3-propoxy-1,2-phenylene diisopropanoate, 3-isopropoxy-1,2-phenylene diisopropanoate, 3-butoxy-1,2-phenylene diisopropanoate, 3-isobutoxy-1,2-phenylene diisopropanoate, 3-tert-butoxy-1,2-phenylene dipropaonate, 3-pentoxy-1,2-phenylene diisopropanoate, 3-hexoxy-1,2-phenylene diisopropanoate, 3-heptoxy-1,2-phenylene diisopropanoate, 3-octoxy-1,2-phenylene diisopropanoate, 3-nonoxy-1,2-phenylene diisopropanoate, 3-decoxy-1,2-phenylene diisopropanoate, 3-phenoxy-1,2-phenylene diisopropanoate, 3-chloro-1,2-phenylene diisopropanoate, 3-bromo-1,2-phenylene diisopropanoate, 3-fluro-1,2-phenylene diisopropanoate, 3-iodo-1,2-phenylene diisopropanoate, 3-methyl-1,2-phenylene diisopropanoate, 3-ethyl-1,2-phenylene diisopropanoate, 3-butyl-1,2-phenylene diisopropanoate, 3-isobutyl-1,2-phenylene diisopropanoate, 3-tert-butyl-1,2-phenylene diisopropanoate, 3-isopropyl-1,2-phenylene diisopropanoate, 3-pentyl-1,2-phenylene diisopropanoate, 3-isopentyl-1,2-phenylene diisopropanoate, 3-hexyl-1,2-phenylene diisopropanoate, 3-heptyl-1,2-phenylene diisopropanoate, 3-octyl-1,2-phenylene diisopropanoate, 3-nonyl-1,2-phenylene diisopropanoate, 3-decyl-1,2-phenylene diisopropanoate, 3-dodecyl-1,2-phenylene diisopropanoate, 3-methoxy-1,2-phenylene diisopropanoate, 3-ethoxy-1,2-phenylene diisopropanoate, 3-propoxy-1,2-phenylene diisopropanoate, 3-isopropoxy-1,2-phenylene diisopropanoate, 3-butoxy-1,2-phenylene diisopropanoate, 3-isobutoxy-1,2-phenylene diisopropanoate, 3-tert-butoxy-1,2-phenylene diisopropanoate, 3-pentoxy-1,2-phenylene diisopropanoate, 3-hexoxy-1,2-phenylene diisopropanoate, 3-heptoxy-1,2-phenylene diisopropanoate, 3-octoxy-1,2-phenylene diisopropanoate, 3-nonoxy-1,2-phenylene diisopropanoate, 3-decoxy-1,2-phenylene diisopropanoate, 3-phenoxy-1,2-phenylene diisopropanoate, 3-chloro-1,2-phenylene dibutanoate, 3-bromo-1,2-phenylene dibutanoate, 3-fluro-1,2-phenylene dibutanoate, 3-iodo-1,2-phenylene dibutanoate, 3-methyl-1,2-phenylene dibutanoate, 3-ethyl-1,2-phenylene dibutanoate, 3-butyl-1,2-phenylene dibutanoate, 3-isobutyl-1,2-phenylene dibutanoate, 3-tert-butyl-1,2-phenylene dibutanoate, 3-isopropyl-1,2-phenylene dibutanoate, 3-pentyl-1,2-phenylene dibutanoate, 3-isopentyl-1,2-phenylene dibutanoate, 3-hexyl-1,2-phenylene dibutanoate, 3-heptyl-1,2-phenylene dibutanoate, 3-octyl-1,2-phenylene dibutanoate, 3-nonyl-1,2-phenylene dibutanoate, 3-decyl-1,2-phenylene dibutanoate, 3-dodecyl-1,2-phenylene dibutanoate, 3-methoxy-1,2-phenylene dibutanoate, 3-ethoxy-1,2-phenylene dibutanoate, 3-propoxy-1,2-phenylene dibutanoate, 3-isopropoxy-1,2-phenylene dibutanoate, 3-butoxy-1,2-phenylene dibutanoate, 3-isobutoxy-1,2-phenylene dibutanoate, 3-tert-butoxy-1,2-phenylene dibutanoate, 3-pentoxy-1,2-phenylene dibutanoate, 3-hexoxy-1,2-phenylene dibutanoate, 3-heptoxy-1,2-phenylene dibutanoate, 3-octoxy-1,2-phenylene dibutanoate, 3-nonoxy-1,2-phenylene dibutanoate, 3-decoxy-1,2-phenylene dibutanoate, 3-phenoxy-1,2-phenylene dibutanoate, 3-chloro-1,2-phenylene diisobutanoate, 3-bromo-1,2-phenylene diisobutanoate, 3-fluro-1,2-phenylene diisobutanoate, 3-iodo-1,2-phenylene diisobutanoate, 3-methyl-1,2-phenylene diisobutanoate, 3-ethyl-1,2-phenylene diisobutanoate, 3-butyl-1,2-phenylene diisobutanoate, 3-isobutyl-1,2-phenylene diisobutanoate, 3-tert-butyl-1,2-phenylene diisobutanoate, 3-isopropyl-1,2-phenylene diisobutanoate, 3-pentyl-1,2-phenylene diisobutanoate, 3-isopentyl-1,2-phenylene diisobutanoate, 3-hexyl-1,2-phenylene diisobutanoate, 3-heptyl-1,2-phenylene diisobutanoate, 3-octyl-1,2-phenylene diisobutanoate, 3-nonyl-1,2-phenylene diisobutanoate, 3-decyl-1,2-phenylene diisobutanoate, 3-dodecyl-1,2-phenylene diisobutanoate, 3-methoxy-1,2-phenylene diisobutanoate, 3-ethoxy-1,2-phenylene diisobutanoate, 3-propoxy-1,2-phenylene diisobutanoate, 3-isopropoxy-1,2-phenylene diisobutanoate, 3-butoxy-1,2-phenylene diisobutanoate, 3-isobutoxy-1,2-phenylene diisobutanoate, 3-tert-butoxy-1,2-phenylene diisobutanoate, 3-pentoxy-1,2-phenylene diisobutanoate, 3-hexoxy-1,2-phenylene diisobutanoate, 3-heptoxy-1,2-phenylene diisobutanoate, 3-octoxy-1,2-phenylene diisobutanoate, 3-nonoxy-1,2-phenylene diisobutanoate, 3-decoxy-1,2-phenylene diisobutanoate, 3-phenoxy-1,2-phenylene diisobutanoate, 3-chloro-1,2-phenylene di-tert-butanoate, 3-bromo-1,2-phenylene di-tert-butanoate, 3-fluro-1,2-phenylene di-tert-butanoate, 3-iodo-1,2-phenylene di-tert-butanoate, 3-methyl-1,2-phenylene di-tert-butanoate, 3-ethyl-1,2-phenylene di-tert-butanoate, 3-butyl-1,2-phenylene di-tert-butanoate, 3-isobutyl-1,2-phenylene di-tert-butanoate, 3-tert-butyl-1,2-phenylene di-tert-butanoate, 3-isopropyl-1,2-phenylene di-tert-butanoate, 3-pentyl-1,2-phenylene di-tert-butanoate, 3-isopentyl-1,2-phenylene di-tert-butanoate, 3-hexyl-1,2-phenylene di-tert-butanoate, 3-heptyl-1,2-phenylene di-tert-butanoate, 3-octyl-1,2-phenylene di-tert-butanoate, 3-nonyl-1,2-phenylene di-tert-butanoate, 3-decyl-1,2-phenylene di-tert-butanoate, 3-dodecyl-1,2-phenylene di-tert-butanoate, 3-methoxy-1,2-phenylene di-tert-butanoate, 3-ethoxy-1,2-phenylene di-tert-butanoate, 3-propoxy-1,2-phenylene di-tert-butanoate, 3-isopropoxy-1,2-phenylene di-tert-butanoate, 3-butoxy-1,2-phenylene di-tert-butanoate, 3-isobutoxy-1,2-phenylene di-tert-butanoate, 3-t-butoxy-1,2-phenylene di-tert-butanoate, 3-pentoxy-1,2-phenylene di-tert-butanoate, 3-hexoxy-1,2-phenylene di-tert-butanoate, 3-heptoxy-1,2-phenylene di-tert-butanoate, 3-octoxy-1,2-phenylene di-tert-butanoate, 3-nonoxy-1,2-phenylene di-tert-butanoate, 3-decoxy-1,2-phenylene di-tert-butanoate, 3-phenoxy-1,2-phenylene di-tert-butanoate, 3-chloro-1,2-phenylene dipentanoate, 3-bromo-1,2-phenylene dipentanoate, 3-fluro-1,2-phenylene dipentanoate, 3-iodo-1,2-phenylene dipentanoate, 3-methyl-1,2-phenylene dipentanoate, 3-ethyl-1,2-phenylene dipentanoate, 3-butyl-1,2-phenylene dipentanoate, 3-isobutyl-1,2-phenylene dipentanoate, 3-tert-butyl-1,2-phenylene dipentanoate, 3-isopropyl-1,2-phenylene dipentanoate, 3-pentyl-1,2-phenylene dipentanoate, 3-isopentyl-1,2-phenylene dipentanoate, 3-hexyl-1,2-phenylene dipentanoate, 3-heptyl-1,2-phenylene dipentanoate, 3-octyl-1,2-phenylene dipentanoate, 3-nonyl-1,2-phenylene dipentanoate, 3-decyl-1,2-phenylene dipentanoate, 3-dodecyl-1,2-phenylene dipentanoate, 3-methoxy-1,2-phenylene dipentanoate, 3-ethoxy-1,2-phenylene dipentanoate, 3-propoxy-1,2-phenylene dipentanoate, 3-isopropoxy-1,2-phenylene dipentanoate, 3-butoxy-1,2-phenylene dipentanoate, 3-isobutoxy-1,2-phenylene dipentanoate, 3-tert-butoxy-1,2-phenylene dipentanoate, 3-pentoxy-1,2-phenylene dipentanoate, 3-hexoxy-1,2-phenylene dipentanoate, 3-heptoxy-1,2-phenylene dipentanoate, 3-octoxy-1,2-phenylene dipentanoate, 3-nonoxy-1,2-phenylene dipentanoate, 3-decoxy-1,2-phenylene dipentanoate, 3-phenoxy-1,2-phenylene dipentanoate, 3-chloro-1,2-phenylene diisopentanoate, 3-bromo-1,2-phenylene diisopentanoate, 3-fluro-1,2-phenylene diisopentanoate, 3-iodo-1,2-phenylene diisopentanoate, 3-methyl-1,2-phenylene diisopentanoate, 3-ethyl-1,2-phenylene diisopentanoate, 3-butyl-1,2-phenylene diisoipentanoate, 3-isobutyl-1,2-phenylene diisoipentanoate, 3-tert-butyl-1,2-phenylene diisoipentanoate, 3-isopropyl-1,2-phenylene diisoipentanoate, 3-pentyl-1,2-phenylene diisoipentanoate, 3-isopentyl-1,2-phenylene diisoipentanoate, 3-hexyl-1,2-phenylene diisoipentanoate, 3-heptyl-1,2-phenylene diisoipentanoate, 3-octyl-1,2-phenylene diisoipentanoate, 3-nonyl-1,2-phenylene diisoipentanoate, 3-decyl-1,2-phenylene diisoipentanoate, 3-dodecyl-1,2-phenylene diisoipentanoate, 3-methoxy-1,2-phenylene diisoipentanoate, 3-ethoxy-1,2-phenylene diisoipentanoate, 3-propoxy-1,2-phenylene diisoipentanoate, 3-isopropoxy-1,2-phenylene diisoipentanoate, 3-butoxy-1,2-phenylene diisoipentanoate, 3-isobutoxy-1,2-phenylene diisoipentanoate, 3-tert-butoxy-1,2-phenylene diisoipentanoate, 3-pentoxy-1,2-phenylene diisoipentanoate, 3-hexoxy-1,2-phenylene diisoipentanoate, 3-heptoxy-1,2-phenylene diisoipentanoate, 3-octoxy-1,2-phenylene diisoipentanoate, 3-nonoxy-1,2-phenylene diisoipentanoate, 3-decoxy-1,2-phenylene diisoipentanoate, 3-phenoxy-1,2-phenylene diisoipentanoate, 3-chloro-1,2-phenylene dihexanoate, 3-bromo-1,2-phenylene dihexanoate, 3-fluro-1,2-phenylene dihexanoate, 3-iodo-1,2-phenylene dihexanoate, 3-methyl-1,2-phenylene dihexanoate, 3-ethyl-1,2-phenylene dihexanoate, 3-butyl-1,2-phenylene dihexanoate, 3-isobutyl-1,2-phenylene dihexanoate, 3-tert-butyl-1,2-phenylene dihexanoate, 3-isopropyl-1,2-phenylene dihexanoate, 3-pentyl-1,2-phenylene dihexanoate, 3-isopentyl-1,2-phenylene dihexanoate, 3-hexyl-1,2-phenylene dihexanoate, 3-heptyl-1,2-phenylene dihexanoate, 3-octyl-1,2-phenylene dihexanoate, 3-nonyl-1,2-phenylene dihexanoate, 3-decyl-1,2-phenylene dihexanoate, 3-dodecyl-1,2-phenylene dihexanoate, 3-methoxy-1,2-phenylene dihexanoate, 3-ethoxy-1,2-phenylene dihexanoate, 3-propoxy-1,2-phenylene dihexanoate, 3-isopropoxy-1,2-phenylene dihexanoate, 3-butoxy-1,2-phenylene dihexanoate, 3-isobutoxy-1,2-phenylene dihexanoate, 3-tert-butoxy-1,2-phenylene dihexanoate, 3-pentoxy-1,2-phenylene dihexanoate, 3-hexoxy-1,2-phenylene dihexanoate, 3-heptoxy-1,2-phenylene dihexanoate, 3-octoxy-1,2-phenylene dihexanoate, 3-nonoxy-1,2-phenylene dihexanoate, 3-decoxy-1,2-phenylene dihexanoate, 3-phenoxy-1,2-phenylene dihexanoate, 3-chloro-1,2-phenylene diisohexanoate, 3-bromo-1,2-phenylene diisohexanoate, 3-fluro-1,2-phenylene diisohexanoate, 3-iodo-1,2-phenylene diisohexanoate, 3-methyl-1,2-phenylene diisohexanoate, 3-ethyl-1,2-phenylene diisohexanoate, 3-butyl-1,2-phenylene diisohexanoate, 3-isobutyl-1,2-phenylene diisohexanoate, 3-tert-butyl-1,2-phenylene diisohexanoate, 3-isopropyl-1,2-phenylene diisohexanoate, 3-pentyl-1,2-phenylene diisohexanoate, 3-isopentyl-1,2-phenylene diisohexanoate, 3-hexyl-1,2-phenylene diisohexanoate, 3-heptyl-1,2-phenylene diisohexanoate, 3-octyl-1,2-phenylene diisohexanoate, 3-nonyl-1,2-phenylene diisohexanoate, 3-decyl-1,2-phenylene diisohexanoate, 3-dodecyl-1,2-phenylene diisohexanoate, 3-methoxy-1,2-phenylene diisohexanoate, 3-ethoxy-1,2-phenylene diisohexanoate, 3-propoxy-1,2-phenylene diisohexanoate, 3-isopropoxy-1,2-phenylene diisohexanoate, 3-butoxy-1,2-phenylene diisohexanoate, 3-isobutoxy-1,2-phenylene diisohexanoate, 3-tert-butoxy-1,2-phenylene diisohexanoate, 3-pentoxy-1,2-phenylene diisohexanoate, 3-hexoxy-1,2-phenylene diisohexanoate, 3-heptoxy-1,2-phenylene diisohexanoate, 3-octoxy-1,2-phenylene diisohexanoate, 3-nonoxy-1,2-phenylene diisohexanoate, 3-decoxy-1,2-phenylene diisohexanoate, 3-phenoxy-1,2-phenylene diisohexanoate, 3-chloro-1,2-phenylene diheptanoate, 3-bromo-1,2-phenylene diheptanoate, 3-fluro-1,2-phenylene diheptanoate, 3-iodo-1, 2-phenylene diheptanoate, 3-methyl-1,2-phenylene diheptanoate, 3-ethyl-1,2-phenylene diheptanoate, 3-butyl-1,2-phenylene diheptanoate, 3-isobutyl-1,2-phenylene diheptanoate, 3-tert-butyl-1,2-phenylene diheptanoate, 3-isopropyl-1,2-phenylene diheptanoate, 3-pentyl-1,2-phenylene diheptanoate, 3-isopentyl-1,2-phenylene diheptanoate, 3-hexyl-1,2-phenylene diheptanoate, 3-heptyl-1,2-phenylene diheptanoate, 3-octyl-1,2-phenylene diheptanoate, 3-nonyl-1,2-phenylene diheptanoate, 3-decyl-1,2-phenylene diheptanoate, 3-dodecyl-1,2-phenylene diheptanoate, 3-methoxy-1,2-phenylene diheptanoate, 3-ethoxy-1,2-phenylene diheptanoate, 3-propoxy-1,2-phenylene diheptanoate, 3-isopropoxy-1,2-phenylene diheptanoate, 3-butoxy-1,2-phenylene diheptanoate, 3-isobutoxy-1,2-phenylene diheptanoate, 3-tert-butoxy-1,2-phenylene diheptanoate, 3-pentoxy-1,2-phenylene diheptanoate, 3-hexoxy-1,2-phenylene diheptanoate, 3-heptoxy-1,2-phenylene diheptanoate, 3-octoxy-1,2-phenylene diheptanoate, 3-nonoxy-1,2-phenylene diheptanoate, 3-decoxy-1,2-phenylene diheptanoate, 3-phenoxy-1,2-phenylene diheptanoate, 3-chloro-1,2-phenylene diisoheptanoate, 3-bromo-1,2-phenylene diisoheptanoate, 3-fluro-1,2-phenylene diisoheptanoate, 3-iodo-1,2-phenylene diisoheptanoate, 3-methyl-1,2-phenylene diisoheptanoate, 3-ethyl-1,2-phenylene diisoheptanoate, 3-butyl-1,2-phenylene diisoheptanoate, 3-isobutyl-1,2-phenylene diisoheptanoate, 3-tert-butyl-1,2-phenylene diisoheptanoate, 3-isopropyl-1,2-phenylene diisoheptanoate, 3-pentyl-1,2-phenylene diisoheptanoate, 3-isopentyl-1,2-phenylene diisoheptanoate, 3-hexyl-1,2-phenylene diisoheptanoate, 3-heptyl-1,2-phenylene diisoheptanoate, 3-octyl-1,2-phenylene diisoheptanoate, 3-nonyl-1,2-phenylene diisoheptanoate, 3-decyl-1,2-phenylene diisoheptanoate, 3-dodecyl-1,2-phenylene diisoheptanoate, 3-methoxy-1,2-phenylene diisoheptanoate, 3-ethoxy-1,2-phenylene diisoheptanoate, 3-propoxy-1,2-phenylene diisoheptanoate, 3-isopropoxy-1,2-phenylene diisoheptanoate, 3-butoxy-1,2-phenylene diisoheptanoate, 3-isobutoxy-1,2-phenylene diisoheptanoate, 3-tert-butoxy-1,2-phenylene diisoheptanoate, 3-pentoxy-1,2-phenylene diisoheptanoate, 3-hexoxy-1,2-phenylene diisoheptanoate, 3-heptoxy-1,2-phenylene diisoheptanoate, 3-octoxy-1,2-phenylene diisoheptanoate, 3-nonoxy-1,2-phenylene diisoheptanoate, 3-decoxy-1,2-phenylene diisoheptanoate, 3-phenoxy-1,2-phenylene diisoheptanoate, 3-chloro-1,2-phenylene dioctanoate, 3-bromo-1,2-phenylene dioctanoate, 3-fluro-1,2-phenylene dioctanoate, 3-iodo-1,2-phenylene dioctanoate, 3-methyl-1,2-phenylene dioctanoate, 3-ethyl-1,2-phenylene dioctanoate, 3-butyl-1,2-phenylene dioctanoate, 3-isobutyl-1,2-phenylene dioctanoate, 3-tert-butyl-1,2-phenylene dioctanoate, 3-isopropyl-1,2-phenylene dioctanoate, 3-pentyl-1,2-phenylene dioctanoate, 3-isopentyl-1,2-phenylene dioctanoate, 3-hexyl-1,2-phenylene dioctanoate, 3-heptyl-1,2-phenylene dioctanoate, 3-octyl-1,2-phenylene dioctanoate, 3-nonyl-1,2-phenylene dioctanoate, 3-decyl-1,2-phenylene dioctanoate, 3-dodecyl-1,2-phenylene dioctanoate, 3-methoxy-1,2-phenylene dioctanoate, 3-ethoxy-1,2-phenylene dioctanoate, 3-propoxy-1,2-phenylene dioctanoate, 3-isopropoxy-1,2-phenylene dioctanoate, 3-butoxy-1,2-phenylene dioctanoate, 3-isobutoxy-1,2-phenylene dioctanoate, 3-tert-butoxy-1,2-phenylene dioctanoate, 3-pentoxy-1,2-phenylene dioctanoate, 3-hexoxy-1,2-phenylene dioctanoate, 3-heptoxy-1,2-phenylene dioctanoate, 3-octoxy-1,2-phenylene dioctanoate, 3-nonoxy-1,2-phenylene dioctanoate, 3-decoxy-1,2-phenylene dioctanoate, 3-phenoxy-1,2-phenylene dioctanoate, 3-chloro-1,2-phenylene diisooctanoate, 3-bromo-1,2-phenylene diisooctanoate, 3-fluro-1,2-phenylene diisooctanoate, 3-iodo-1,2-phenylene diisooctanoate, 3-methyl-1,2-phenylene diisooctanoate, 3-ethyl-1,2-phenylene diisooctanoate, 3-butyl-1,2-phenylene diisooctanoate, 3-isobutyl-1,2-phenylene diisooctanoate, 3-tert-butyl-1,2-phenylene diisooctanoate, 3-isopropyl-1,2-phenylene diisooctanoate, 3-pentyl-1,2-phenylene diisooctanoate, 3-isopentyl-1,2-phenylene diisooctanoate, 3-hexyl-1,2-phenylene diisooctanoate, 3-heptyl-1,2-phenylene diisooctanoate, 3-octyl-1,2-phenylene diisooctanoate, 3-nonyl-1,2-phenylene diisooctanoate, 3-decyl-1,2-phenylene diisooctanoate, 3-dodecyl-1,2-phenylene diisooctanoate, 3-methoxy-1,2-phenylene diisooctanoate, 3-ethoxy-1,2-phenylene diisooctanoate, 3-propoxy-1,2-phenylene diisooctanoate, 3-isopropoxy-1,2-phenylene diisooctanoate, 3-butoxy-1,2-phenylene diisooctanoate, 3-isobutoxy-1,2-phenylene diisooctanoate, 3-tert-butoxy-1,2-phenylene diisooctanoate, 3-pentoxy-1,2-phenylene diisooctanoate, 3-hexoxy-1,2-phenylene diisooctanoate, 3-heptoxy-1,2-phenylene diisooctanoate, 3-octoxy-1,2-phenylene diisooctanoate, 3-nonoxy-1,2-phenylene diisooctanoate, 3-decoxy-1,2-phenylene diisooctanoate, 3-phenoxy-1,2-phenylene diisooctanoate, 3-chloro-1,2-phenylene dinonanoate, 3-bromo-1,2-phenylene dinonanoate, 3-fluro-1,2-phenylene dinonanoate, 3-iodo-1,2-phenylene dinonanoate, 3-methyl-1,2-phenylene dinonanoate, 3-ethyl-1,2-phenylene dinonanoate, 3-butyl-1,2-phenylene dinonanoate, 3-isobutyl-1,2-phenylene dinonanoate, 3-tert-butyl-1,2-phenylene dinonanoate, 3-isopropyl-1,2-phenylene dinonanoate, 3-pentyl-1,2-phenylene dinonanoate, 3-isopentyl-1,2-phenylene dinonanoate, 3-hexyl-1,2-phenylene dinonanoate, 3-heptyl-1,2-phenylene dinonanoate, 3-octyl-1,2-phenylene dinonanoate, 3-nonyl-1,2-phenylene dinonanoate, 3-decyl-1,2-phenylene dinonanoate, 3-dodecyl-1,2-phenylene dinonanoate, 3-methoxy-1,2-phenylene dinonanoate, 3-ethoxy-1,2-phenylene dinonanoate, 3-propoxy-1,2-phenylene dinonanoate, 3-isopropoxy-1,2-phenylene dinonanoate, 3-butoxy-1,2-phenylene dinonanoate, 3-isobutoxy-1,2-phenylene dinonanoate, 3-tert-butoxy-1,2-phenylene dinonanoate, 3-pentoxy-1,2-phenylene dinonanoate, 3-hexoxy-1,2-phenylene dinonanoate, 3-heptoxy-1,2-phenylene dinonanoate, 3-octoxy-1,2-phenylene dinonanoate, 3-nonoxy-1,2-phenylene dinonanoate, 3-decoxy-1,2-phenylene dinonanoate, 3-phenoxy-1,2-phenylene dinonanoate, 3-chloro-1,2-phenylene didecanoate, 3-bromo-1,2-phenylene didecanoate, 3-fluro-1,2-phenylene didecanoate, 3-iodo-1,2-phenylene didecanoate, 3-methyl-1,2-phenylene didecanoate, 3-ethyl-1,2-phenylene didecanoate, 3-butyl-1,2-phenylene didecanoate, 3-isobutyl-1,2-phenylene didecanoate, 3-tert-butyl-1,2-phenylene didecanoate, 3-isopropyl-1,2-phenylene didecanoate, 3-pentyl-1,2-phenylene didecanoate, 3-isopentyl-1,2-phenylene didecanoate, 3-hexyl-1,2-phenylene didecanoate, 3-heptyl-1,2-phenylene didecanoate, 3-octyl-1,2-phenylene didecanoate, 3-nonyl-1,2-phenylene didecanoate, 3-decyl-1,2-phenylene didecanoate, 3-dodecyl-1,2-phenylene didecanoate, 3-methoxy-1,2-phenylene didecanoate, 3-ethoxy-1,2-phenylene didecanoate, 3-propoxy-1,2-phenylene didecanoate, 3-isopropoxy-1,2-phenylene didecanoate, 3-butoxy-1,2-phenylene didecanoate, 3-isobutoxy-1,2-phenylene didecanoate, 3-tert-butoxy-1,2-phenylene didecanoate, 3-pentoxy-1,2-phenylene didecanoate, 3-hexoxy-1,2-phenylene didecanoate, 3-heptoxy-1,2-phenylene didecanoate, 3-octoxy-1,2-phenylene didecanoate, 3-nonoxy-1,2-phenylene didecanoate, 3-decoxy-1,2-phenylene didecanoate and 3-phenoxy-1,2-phenylene didecanoate.

Preferred compounds in accordance with the fourth embodiment are 3-chloro-1,2-phenylene diacetate, 3-tertbutyl-1,2-phenylene diacetate, 3-methyl-1,2-phenylene diacetate, 3-fluro-1,2-phenylene diacetate.

In accordance with a more preferred aspect, the compounds are 1,2-phenylene diacetate, 1,2-phenylene diisopropanoate, 1,2-phenylene diisobutanoate, 1,2-phenylene di-tert-butanoate, 2-acetoxyphenyl pivalate, 2-(pivaloyloxy)phenyl benzoate, 4-chloro-1,2-phenylene diacetate, 3-fluro-1,2-phenylene diacetate, 4-tert-butyl-1,2-phenylene diacetate, 4-methyl-1,2-phenylene diacetate, 2-(isobutyryloxy)phenyl acetate, 2-(isobutyryloxy)phenyl propaonate, 2-(isobutyryloxy)phenyl butyrate, 2-(isobutyryloxy)phenyl benzoate, 3-chloro-1,2-phenylene diacetate, 3-tert-butyl-1,2-phenylene diacetate and 3-methyl-1,2-phenylene diacetate.

In accordance with a further more preferred aspect, the compounds are 1,2-phenylene diacetate, 1,2-phenylene diisopropanoate, 1,2-phenylene diisobutanoate, 1,2-phenylene di-tert-butanoate, 2-acetoxyphenyl pivalate, 2-(pivaloyloxy)phenyl benzoate, 4-chloro-1,2-phenylene diacetate, 3-fluro-1,2-phenylene diacetate, 4-tert-butyl-1,2-phenylene diacetate, 4-methyl-1,2-phenylene diacetate.

The present invention provides a catalyst composition having internal donor compound containing at least one 1,2-phenylenedioate compound but does not include other internal donors.

In accordance with another embodiment, the present invention provides another catalyst composition comprising magnesium moiety, titanium moiety and a mixed internal donor wherein the mixed internal donor comprises at least one 1,2-phenylenedioate and an electron donor component which is an organic compound.

In an embodiment, the catalyst composition includes other internal donors in addition to the internal donor having at least one 1,2-phenylenedioate compound. This means that during catalyst synthesis, other internal electron donor can be added in addition to the internal electron donor having at least one 1,2-phenylenedioate compound. The other internal donor includes phthalates, benzoates, diethers, succinates, malonates, carbonates, silyl esters, amide esters and combinations thereof. The solid catalyst composition includes other internal donors in addition to the internal donor having at least one 1,2-phenylenedioate compound which can be produced using the described methods.

The other internal electron donor component can be selected from phthalates, benzoates, diethers, succinates, malonates, carbonates, silyl esters, amide esters and combinations thereof. Specific examples include, but are not limited to di-n-butyl phthalate, di-i-butyl phthalate, di-2-ethylhexyl phthalate, methyl benzoate, ethyl benzoate, propyl benzoate, phenyl benzoate, cyclohexyl benzoate, methyl toluate, ethyl toluate, p-ethoxy ethyl benzoate, p-isopropoxy ethyl benzoate, diethyl succinate, di-propyl succinate, diisopropyl succinate, dibutyl succinate, diisobutyl succinate, diethyl malonate, diethyl ethylmalonate, diethyl propyl malonate, diethyl isopropylmalonate, diethyl butylmalonate, diethyl 1,2-cyclohexanedicarboxylate, di-2-ethylhexyl 1,2-cyclohexanedicarboxylate, di-2-isononyl 1,2-cyclohexanedicarboxylate, methyl anisate, ethyl anisate and diether compounds such as 9,9-bis(methoxymethyl)fluorine, 2-isopropyl-2-isopentyl-1,3-dimethoxypropane, 2,2-diisobutyl-1,3-dimethoxypropane, 2,2-diisopentyl-1,3-dimethoxypropane, 2-isopropyl-2-cyclohexyl-1,3-dimethoxypropane.

In a preferred embodiment, the catalyst composition includes from about 5.0 to 20 wt % of the internal donor having at least one 1,2-phenylenedioate compound, about 1.0 to 6.0 wt % of titanium moiety and about 15 to 20 wt % of magnesium moiety.

The preparation of the catalyst composition can be carried out according to several methods, some of which are described hereinafter by way of illustration.

According to the present invention, the catalyst composition is prepared by contacting magnesium moiety with a titanium moiety along with a source of the internal donor comprising at least one 1,2-phenylenedioate compound to get the catalyst composition. In an embodiment, magnesium and titanium moieties are brought to come in contact with the internal electron donor comprising at least one 1,2-phenylenedioate compound. In one embodiment, the catalyst component is made by contacting a magnesium compound and a titanium compound in the presence of an internal electron donor compound having at least one 1,2-phenylenedioate compound. In still another embodiment, the catalyst composition is made by forming a magnesium based catalyst support optionally with the titanium compound and optionally with the internal electron donor compound having at least one 1,2-phenylenedioate compound, and contacting the magnesium based catalyst support with the titanium compound and the internal electron donor compound having at least one 1,2-phenylenedioate compound. In one more embodiment, the catalyst composition is made by contacting a magnesium moiety and titanium moiety in presence of internal donor comprising at least one 1,2-phenylenedioate and a further internal electron donor component (in addition to the internal donor comprising at least one 1,2-phenylenedioate). In a preferred embodiment, the amount of magnesium moiety, the amount of the titanium moiety and the amount of the source of internal donor is such that the catalyst composition thus obtained includes from about 5.0 to 20 wt % of the internal donor having at least one 1,2-phenylenedioate compound, about 1.0 to 6.0 wt % of titanium moiety and about 15 to 20 wt % of magnesium moiety.

According to a method of the present invention, the catalyst composition can be prepared by reacting a magnesium moiety represented by $Mg(OR)_n$, where R can be $C_2$ to $C_{12}$, preferably, R is $C_2$, more preferably R is ethyl group and n=2 with a titanium moiety represented by $TiX_4$ where X can be a halogen, preferably chloride, more preferably $TiCl_4$ in presence of solvent which can be chlorinated or non chlorinated aromatic or aliphatic in nature examples not limiting to benzene, chlorobenzene, dichlorobenzene, toluene, o-chlorotoluene, xylene, dichloromethane, chloroform. The purpose of reacting the magnesium moiety with titanium moiety is to convert the magnesium alkoxide to active magnesium halide which should have disordered crystal lattice. The mere presence of internal donor having at least one 1,2-phenylenedioate compound during this reaction regulates the crystallite size of magnesium halide and decides the position of coordination of titanium onto the magnesium halide. They also enhance the activity of low active sites. For olefins having C>2, the internal donor having at least one 1,2-phenylenedioate compound in the catalyst composition provides stereoselectivity. The reaction temperature is between about 80 and 120° C. and the so obtained product is treated one or many times with excess $TiCl_4$ and solvent mixture followed by washing with hydrocarbon solvents to remove unreacted $TiCl_4$. The hydrocarbon solvents are such as an aliphatic hydrocarbon like isopentane, isooctane, hexane, pentane or isohexane. The addition of internal electron donor having at least one 1,2-phenylenedioate compound is done at temperature between 50 and 95° C. depending upon the nature of electron donor. The catalyst composition is dried and slurried in a hydrocarbon preferably heavy hydrocarbon such as mineral oil for storage or is separated, dried and slurred in a hydrocarbon preferably heavy hydrocarbon such as mineral oil for storage.

In an embodiment, the magnesium moiety can be anhydrous magnesium, halogen containing anhydrous magnesium compound, an alkylmagnesium halide compound, an alkoxy magnesium halide compound, an aryloxy magnesium halide compound, dialkoxymagnesium compound, an aryloxy magnesium compound, dialkylmagnesium compound, alcohol complexes of magnesium dihalide, and mixtures thereof.

a. Non limiting examples of halogen containing anhydrous magnesium compound being anhydrous magnesium chloride, anhydrous magnesium bromide, anhydrous magnesium fluoride and anhydrous magnesium iodide.
b. Non limiting examples of alkylmagnesium halide compound being methylmagnesium chloride, ethylmagnesium chloride, isopropylmagnesium chloride, isobutylmagnesium chloride, tert-butylmagnesium chloride, benzylmagnesium chloride, methylmagnesium bromide, ethylmagnesium bromide, isopropylmagnesium bromide, isobutylmagnesium bromide, tert-butylmagnesium bromide, hexylmagnesium bromide, benzylmagnesium bromide, methylmagnesium iodide, ethylmagnesium iodide, isopropylmagnesium iodide, isobutylmagnesium iodide, tert-butylmagnesium iodide and benzylmagnesium iodide.
c. Non limiting examples of alkoxy magnesium halide compound being methoxy magnesium chloride, ethoxy magnesium chloride, isopropoxy magnesium chloride, butoxy magnesium chloride and octoxy magnesium chloride.
d. Non limiting examples of aryloxy magnesium halide compound being phenoxy magnesium chloride and methyl phenoxy magnesium chloride.
e. Non limiting examples of dialkoxymagnesium compound being dimethoxymagnesium, diethoxymagnesium, dipropoxymagnesium, diisopropoxymagnesium, dibutoxymagnesium, and dioctoxymagnesium.
f. Non limiting examples of aryloxy magnesium compound being phenoxy magnesium and dimethylphenoxy magnesium.
g. Non limiting examples of dialkylmagnesium compound being dimethylmagnesium, diethylmagnesium, diisopropylmagnesium, dibutylmagnesium, dihexylmagnesium, dioctylmagnesium, ethylbutylmagnesium and butyloctylmagnesium.
h. Non limiting example of alcohol complex of magnesium dihalide being magnesium chloride.

In one embodiment, titanium moiety used in the making of catalyst composition may be titanium tetrahalide compound, alkoxytitanium trihalide compound, dialkoxy titanium dihalide compound, trialkoxytitanium monohalide compound, tetraalkoxytitanium compound, and mixtures thereof.

(a) Non limiting examples of titanium tetrahalide compound being titanium tetrachloride, titanium tetrabromide and titanium tetraiodide.
(b) Non limiting examples of alkoxytitanium trihalide compound being methoxytitanium trichloride, ethoxytitanium trichloride, butoxytitanium trichloride and phenoxytitanium trichloride.
(c) Non limiting example of dialkoxy titanium dihalide compound being diethoxy titanium dichloride.
(d) Non limiting example of trialkoxytitanium monohalide compound being triethoxy titanium chloride.
(e) Non limiting example of tetraalkoxytitanium compound being tetrabutoxy titanium and tetraethoxy titanium.

In particular, the titanium moiety is in the form of titanium in tetravalent state which is preferably titanium halide and titanium tetrachloride being the preferred.

In an embodiment, the catalyst composition includes magnesium moiety which is magnesium alkoxide preferably magnesium ethoxide. In an embodiment, the catalyst composition includes titanium component which is titanium halide preferably titanium tetrachloride. In an embodiment, the catalyst composition includes from about 5.0 wt % to 20 wt % of 1,2-phenylenedioates, titanium is from about 1.0 wt % to 6.0 wt % and magnesium is from about 15 wt % to 20 wt %.

According to another method of the present invention, the catalyst composition is made by reacting a titanium moiety represented by $TiX_4$ where X can be a halogen, preferably chloride, more preferably $TiCl_4$ with solid magnesium chloride adduct with alcohol represented by $MgCl_2.nROH$ where n=3 preferably and R is alkyl from $C_2$-$C_{18}$, preferably $C_2$. The formed adduct is treated with Ti moiety by suspending the adduct as such or after dealcohlation in cold $TiCl_4$ from where the mixture is then heated to temperature between 90-130° C., maintained for at least 0.5 h, may be up to 2 h. The addition of internal donor is done in desired ratios during the treatment with $TiCl_4$. The addition of $TiCl_4$ to the mixture can be done more than once, preferably three times for different intervals and finally washing the solid obtained after decantation with anhydrous hexane four times at 70° C. followed by drying under nitrogen flow.

In another embodiment, the catalyst composition includes magnesium chloride precursor onto which titanium tetrachloride and internal donor is incorporated.

In an embodiment, the internal donor of catalyst composition includes 1,2-phenylenedioates and has the following structure:

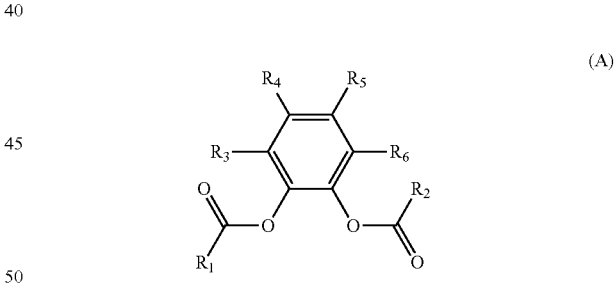

(A)

in which $R_1$-$R_6$ groups are equal or different from each other. Each of $R_1$-$R_6$ are selected from hydrogen, halogen, $C_1$-$C_{20}$ linear or branched alkyl group which can be linked with cyclic rings, $C_6$-$C_{14}$ aryl groups, $C_3$-$C_{15}$ cycloalkyl groups, $C_1$-$C_{20}$ alkoxy group, a heteroatom, arylalkyl or alkylaryl groups and combinations thereof.

The present invention further provides a catalyst system for polymerization of olefins represented by $CH_2$=CHR where R=hydrogen or $C_1$-$C_6$. The catalyst system includes the aforesaid catalyst composition, organoaluminum compounds and external electron donors. The ratio of titanium (from catalyst composition): aluminum (from organoaluminum compound): external donor can be from 1:5-1000:0-250, preferably in the range from 1:25-500:25-100.

In an embodiment, the organoaluminum compounds include alkylaluminums such as trialkylaluminum such as preferably triethylaluminum, triisopropylaluminum, triisobutylaluminum, tri-n-butylaluminum, tri-n-hexyl aluminum, tri-n-octylaluminum; trialkenylaluminums such as triisoprenyl aluminum; dialkylaluminum halides such as diethylaluminum chloride, dibutylaluminum chloride, diisobutylaluminum chloride and diethyl aluminum bromide; alkylaluminum sesquihalides such as ethylaluminum sesquichloride, butylaluminum sesquichloride and ethylaluminum sesquibromide; dialkylaluminum hydrides such as diethylaluminum hydride and dibutylaluminum hydride; partially hydrogenated alkylaluminum such as ethylaluminum dihydride and propylaluminum dihydride and aluminoxane such as methylaluminoxane, isobutylaluminoxane, tetraethylaluminoxane and tetraisobutylaluminoxane; diethylaluminum ethoxide.

In an embodiment, the mole ratio of aluminum to titanium is from about 5:1 to about 1000:1 or from about 10:1 to about 700:1, or from about 25:1 to about 500:1.

In an embodiment, the external electron donors are organosilicon compounds, diethers and alkoxy benzoates.

In an embodiment, the external electron donor for olefin polymerization when added to the catalytic system as a part of cocatalyst retains the stereospecificity of the active sites, convert non-stereospecific sites to stereospecific sites, poisons the non-stereospecific sites and also controls the molecular weight distributions while retaining high performance with respect to catalytic activity. The external electron donors which are generally organosilicon compounds includes but are not limited to trimethylmethoxysilane, trimethylethoxysilane, dimethyldimethoxysilane, dimethyldiethoxysilane, diisopropyldimethoxysilane, diisobutyldimethoxysilane, t-butylmethyldimethoxysilane, t-butylmethyldiethoxysilane, t-amylmethyldiethoxysilane, dicyclopentyldimethoxysilane, diphenyldimethoxysilane, phenylmethyldimethoxysilane, diphenyldiethoxysilane, bis-o-tolydimethoxysilane, bis-m-tolydimethoxysilane, bis-p-tolydimethoxysilane, bis-p-tolydiethoxysilane, bisethylphenyldimethoxysilane, dicyclohexyldimethoxysilane, cyclohexylmethyldimethoxysilane, cyclohexylmethyldiethoxysilane, ethyltrimethoxysilane, ethyltriethoxysilane, vinyltrimethoxysilane, methyltrimethoxysilane, n-propyltriethoxysilane, decyltrimethoxysilane, decyltriethoxysilane, phenyltrimethoxysilane, gamma-chloropropyltrimethoxysilane, methyltriethoxysilane, ethyltriethoxysilane, vinyltriethoxysilane, t-butyltriethoxysilane, n-butyltriethoxysilane, iso-butyltriethoxysilane, phenyltriethoxysilane, gamma-aminopropyltriethoxysilane, cholotriethoxysilane, ethyltriisopropoxysilane, vinyltirbutoxysilane, cyclohexyltrimethoxysilane, cyclohexyltriethoxysilane, 2-norbornanetrimethoxysilane, 2-norbornanetriethoxysilane, 2-norbornanemethyldimethoxysilane, ethyl silicate, butyl silicate, trimethylphenoxysilane, and methyltriallyloxysilane, cyclopropyltrimethoxysilane, cyclobutyltrimethoxysilane, cyclopentyltrimethoxysilane, 2-methyl cyclopentyltrimethoxysilane, 2,3-dimethylcyclopentyltrimethoxysilane, 2,5-dimethylcyclopentyltrimethoxysilane, cyclopentyltriethoxysilane, cyclopentenyltrimethoxysilane, 3-cyclopentenyltrimethoxysilane, 2,4-cyclopentadienyltrimethoxysilane, indenyltrimethoxysilane and fluorenyltrimethoxysilane; dialkoxysilanes such as dicyclopentyldimethoxysilane, bis (2-methylcyclopentyl)dimethoxysilane, bis(3-tertiary butylcyclopentyl)dimethoxysilane, bis(2,3-dimethylcyclopentyl) dimethoxysilane, bis(2,5-dimethylcyclopentyl) dimethoxysilane, dicyclopentyldiethoxysilane, dicyclobutyldiethoxysilane, dicyclopropylcyclobutyldiethoxysilane, dicyclopentenyldimethoxysilane, di(3-cyclopentenyl)dimethoxysilane, bis(2,5-dimethyl-3-cyclopentenyl)dimethoxy silane, di(2,4-cyclopentadienyl)dimethoxysilane, bis(2,5-dimethyl-2,4-cyclopentadienyl)dimethoxysilane, bis (1-methyl-1-cyclopentylethyl)dimethoxysilane, cyclopentylcyclopentenyldimethoxysilane, cyclopentylcyclopentadienyldimethoxysilane, diindenyldimethoxysilane, bis(1,3-dimethyl-2-indenyl)dimethoxysilane, cyclopentadienylindenyldimethoxysilane, difluorenyldimethoxysilane, cyclopentylfluorenyldimethoxysilane and indenylfluorenyldimethoxysilane; monoalkoxysilanes such as tricyclopentylmethoxysilane, tricyclopentenylmethoxysilane, tricyclopentadienylmethoxysilane, tricyclopentylethoxysilane, dicyclopentylmethylmethoxysilane, dicyclopentylethylmethoxysilane, dicyclopentylmethylethoxysilane, cyclopentyldimethylmethoxysilane, cyclopentyldiethylmethoxysilane, cyclopentyldimethylethoxysilane, bis(2,5-dimethylcyclopentyl)cyclopentylmethoxysilane, dicyclopentylcyclopentenylmethoxysilane, dicyclopentylcyclopentenadienylmethoxysilane, diindenylcyclopentylmethoxysilane and ethylenebis-cyclopentyldimethoxysilane; aminosilanes such as aminopropyltriethoxysilane, n-(3-triethoxysilylpropyl)amine, bis [(3-triethoxysilyl)propyl]amine, aminopropyltrimethoxysilane, aminopropylmethyldiethoxysilane, hexanediaminopropyltrimethoxysilane.

In an embodiment, the external electron donor, other than organosilicon compounds include, but not limited to amine, diether, esters, carboxylate, ketone, amide, phosphine, carbamate, phosphate, sulfonate, sulfone and/or sulphoxide. In an another embodiment, the external donor can also be the internal donor having at least one 1,2-phenylenedioates having the following structure:

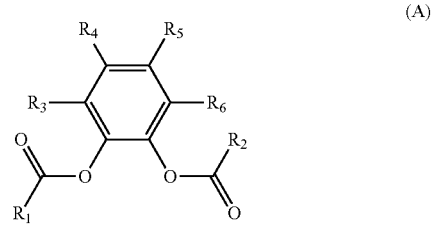

(A)

in which $R_1$-$R_6$ groups are equal or different from each other. Each of $R_1$-$R_6$ are selected from hydrogen, halogen, $C_1$-$C_{20}$ linear or branched alkyl group which can be linked with cyclic rings, $C_6$-$C_{14}$ aryl groups, $C_3$-$C_{15}$ cycloalkyl groups, $C_1$-$C_{20}$ alkoxy group, a heteroatom, arylalkyl or alkylaryl groups and combinations thereof.

The external electron donor is used in such an amount to give a molar ratio of organoaluminum compound to the said external donor from about 0.1 to 500, preferably from 1 to 300.

Further, the present invention provides a method of polymerizing and/or copolymerizing olefins where the catalyst system is contacted with olefin under polymerization conditions. The olefins includes from C2-C20.

According to the present invention, the polymerization of olefins is carried out in the presence of the catalyst system described above. The catalyst system is contacted with olefin under polymerization conditions to produce desired polymer products. The polymerization process can be carried out such as slurry polymerization using as diluent an inert hydrocarbon solvent, or bulk polymerization using the liquid monomer as a reaction medium and in gas-phase operating in one or more fluidized or mechanically agitated bed reactors. In an embodiment, polymerization is carried out as such. In another embodiment, the copolymerization is carried out using at least two polymerization zones.

The catalyst system of the present invention is used in the polymerization of the above-defined olefin $CH_2=CHR$, the examples of said olefin include ethylene, propylene, 1-butene, 4-methyl-1-pentene, 1-hexene, and 1-octene. In particular, said catalysts can be used to produce, such as, the following products: high-density polyethylene (HDPE, having a density higher than 0.940 g/cm3), which includes ethylene homopolymer and copolymer of ethylene and α-olefins having 3 to 12 carbon atoms; linear low-density polyethylene (LLDPE, having a density lower than 0.940 g/cm3), and very low density and ultra low density polyethylene (VLDPE and ULDPE, having a density lower than 0.920 g/cm3, and as low as 0.880 g/cm3), consisting of the copolymer of ethylene and one or more α-olefins having 3 to 12 carbon atoms, wherein the molar content of the unit derived from ethylene is higher than 80%; elastomeric copolymer of ethylene and propylene, and elastomeric terpolymers of ethylene and propylene as well as diolefins at a small ratio, wherein the weight content of the unit derived from ethylene is between about 30% and 70%; isotactic polypropylene and crystalline copolymer of propylene and ethylene and/or other α-olefins, wherein the content of the unit derived from propylene is higher than 85% by weight (random copolymer); impact propylene polymer, which are produced by sequential polymerization of propylene and the mixture of propylene and ethylene, with the content of ethylene being up to 40% by weight; copolymer of propylene and 1-butene, containing a great amount, such as from 10 to 40 percent by weight, of unit derived from 1-butene. It is especially significant that the propylene polymers produced by using the catalysts of the invention show very broad molecule weight distribution (MWD) and have very high isotactic index.

The polymerization is carried out at a temperature from 20 to 120° C., preferably from 40 to 80° C. When the polymerization is carried out in gas phase, operation pressure is usually in the range of from 5 to 100 bar preferably from 10 to 50 bar. The operation pressure in bulk polymerization is usually in the range of from 10 to 150 bar, preferably from 15 to 50 bar. The operation pressure in slurry polymerization is usually in the range of from 1 to 10 bar, preferably from 2 to 7 bar. Hydrogen can be used to control the molecular weight of polymers.

In the present invention, the polymerization of olefins is carried out in the presence of the catalyst system of the present invention. The catalyst system is directly added to the reactor for polymerization or can be prepolymerized i.e catalyst is subjected to a polymerization at lower conversion extent before being added to polymerization reactor. Prepolymerization can be performed with olefins preferably ethylene and/or propylene where the conversion is controlled in the range from 0.2 to 500 gram polymer per gram catalyst.

In the present invention, the polymerization of olefins in presence of the described catalyst system leads to the formation of polyolefins having xylene soluble (XS) from about 0.2% to about 15%. In another embodiment, polyolefins having xylene soluble (XS) from about 2% to about 10%. Here XS refers to the weight percent of polymer that get dissolves into hot xylene generally for measuring the tacticity index such as highly isotactic polymer will have low XS % value i.e. higher crystallinity, whereas low isotactic polymer will have high XS % value.

According to the present invention, the catalysts system when polymerizes olefins provides polyolefins having melt flow indexes (MFI) from about 0.1 to about 100 which is measured according to ASTM standard D1238. In an embodiment, polyolefins having MFI from about 5 to about 50 are produced.

According to the present invention, the catalysts system when polymerizes olefins provides polyolefins having bulk densities (BD) of at least about 0.3 cc/g.

Further, the present invention provides the catalyst composition which includes 1,2-phenylenedioates which exhibits improved activity and better hydrogen response for the polymerization of olefin based polymers. The catalyst composition also exhibits improved xylene solubles in resulting polymer.

The following non-limiting examples illustrate in details about the invention. However, they are, not intended to be limiting the scope of present invention in any way.

Example 1: Synthesis of 1,2-phenylene diacetate (ID1)

To a mixture of catechol (5.0 g, 0.045 mol) and acetic anhydride (18.54 g, 0.1816 mol), montmorillonite KSF (700 mg) was added. After being stirred at room temperature for 20 h, the catalyst was removed by filtration and washed with diethyl ether. The solvent was evaporated under reduced pressure. The residue was pure enough for general purposes and further purification was achieved by recrystallization from diethyl ether. The pure compound appeared as white crystalline powder (yield>99.0%).

Example 2: Synthesis of 1,2-phenylene diisopropanoate (ID2)

To a mixture of catechol (5.0 g, 0.045 mol) isovaleric anhydride (21.5 g, 0.113 mol) and Montmorillonite KSF (1.0 g) was added. After being stirred at room temperature for 24 h, the catalyst was removed by filtration and washed with diethyl ether. The solvent was evaporated under reduced pressure at 140° C. The residue was pure enough for general purposes and further purification was achieved by recrystallization from n-pentane. The pure compound appeared as color less liquid (yield>99.0%).

Example 3: Synthesis of 1,2-phenylene diisobutanoate (ID3)

To a mixture of catechol (5.0 g, 0.045 mol) Isobutyric anhydride (21.5 g, 0.135 mol) and Montmorillonite KSF (1.0 g) was added. After being stirred at 70° C. for 8 h, the catalyst was removed by filtration and washed with diethyl ether. The solvent was evaporated under reduced pressure at 120° C. The residue was pure enough for general purposes and further purification was achieved by distillation under vacuum. The pure compound appeared as color less liquid (yield>99.0%).

Example 4: Synthesis of 1,2-phenylene di-tert-butanoate (ID4)

To a mixture of catechol (5.0 g, 0.045 mol) trimethyl acetic anhydride (25.3 g, 0.136 mol) and Montmorillonite KSF (1.0 g) was added. After being stirred at 70° C. for 24 h, the catalyst was removed by filtration and washed with diethyl ether. The solvent was evaporated under reduced pressure at 120° C. The residue was pure enough for general purposes and further purification was achieved by distillation under vacuum. The pure compound appeared as color less liquid (yield>99.0%).

Example 5: Synthesis of 2-acetoxyphenyl pivalate (ID5)

To a mixture of catechol (20.0 g 0.1816 mol) pivalic anhydride (33.4, 0.1816 mol) and Montmorillonite KSF (4.0 g) was added. After being stirred at room temperature for 24 h, the catalyst was removed by filtration and washed with diethyl ether. The solvent was evaporated under reduced pressure. The pure compound appeared as color less liquid (yield 85.0%). To a mixture of 2-hydroxyphenyl pivalate (5.0 g, 0.025 mol) acetic anhydride (5.5 g, 0.0538 mol) and Montmorillonite KSF (1.0 g) was added. After being stirred at 70° C. for 6 h, the catalyst was removed by filtration and washed with diethyl ether. The final product was extracted from water and diethyl ether and solvent was evaporated under reduced pressure. The pure compound appeared as color less liquid (yield>95.0%).

Example 6: Synthesis of 2-(pivaloyloxy)phenyl benzoate (ID6)

To a mixture of 2-hydroxyphenyl pivalate (5.0 g, 0.025 mol) benzoyl chloride (3.6 g, 0.025 mol) and triethylamine (2.5 g, 0.0247 mol) was added. After being stirred at room temperature for 2 h, white precipitate formed. The crud reaction mixture was extracted with water and diethyl ether. The organic layer separated and solvent was evaporated under reduced pressure. The pure compound obtained as color less liquid (yield>90.0%).

Example 7: Synthesis of 4-chloro-1,2-phenylene diacetate (ID7)

To a mixture of 4-chlorocatechol (5.0 g, 0.045 mol) acetic anhydride (18.54 g, 0.1816 mol) and montmorillonite KSF (700 mg) was added. After being stirred at room temperature for 20 h, the catalyst was removed by filtration and washed with diethyl ether. The solvent was evaporated under reduced pressure. The residue was pure enough for general purposes and further purification was achieved by recrystallization from diethyl ether. The pure compound appeared as white crystalline powder (yield>99.0%).

Example 8: Synthesis of 3-fluoro-1,2-phenylene diacetate (ID8)

To a mixture of 3-fluorocatechol (5.0 g, 0.045 mol) acetic anhydride (18.54 g, 0.1816 mol) and montmorillonite KSF (700 mg) was added. After being stirred at room temperature for 20 h, the catalyst was removed by filtration and washed with diethyl ether. The solvent was evaporated under reduced pressure. The residue was pure enough for general purposes and further purification was achieved by recrystallization from diethyl ether. The pure compound appeared as white crystalline powder (yield>99.0%).

Example 9: Synthesis of 4-t-butyl-1,2-phenylene diacetate (ID9)

To a mixture of 4-t-butylcatechol (5.0 g, 0.045 mol) acetic anhydride (18.54 g, 0.1816 mol) and montmorillonite KSF (700 mg) was added. After being stirred at room temperature for 20 h, the catalyst was removed by filtration and washed with diethyl ether. The solvent was evaporated under reduced pressure. The residue was pure enough for general purposes and further purification was achieved by recrystallization from diethyl ether. The pure compound appeared as white crystalline powder (yield>99.0%).

Example 10: Synthesis of 4-methyl-1,2-phenylene diacetate (ID10)

To a mixture of 4-methylcatechol (5.0 g, 0.030 mol) acetic anhydride (12.3 g, 0.12 mol) and montmorillonite KSF (2.0 g) was added. After being stirred at room temperature for 20 h, the catalyst was removed by filtration and washed with diethyl ether. The solvent was evaporated under reduced pressure. The residue was pure enough for general purposes and further purification was achieved by recrystallization from diethyl ether. The pure compound appeared as white crystalline powder (yield>99.0%).

Example 11: Preparation of Solid Catalyst System

Preparation of solid catalyst system was carried out as follows: into a three neck 500 ml jacketed reactor, added 43.7 mmol of magnesium ethoxide followed by addition of 60 ml of chlorobenzene. To this stirred solution, 60 ml of $TiCl_4$ was added gradually followed by 13.4 mmol of internal donor. This mixture was heated to 110° C. for 30 min after which decantation was carried out followed by further addition of 60 ml of chlorobenzene and 60 ml of $TiCl_4$.

After 15 min reaction time, this mixture was decanted further after 15 min and then again 60 ml chlorobenzene was added followed by 60 ml of $TiCl_4$. The decantation followed after 30 min. This mixture was washed with hexane (~120 ml) at 70° C. followed by drying under nitrogen flow.

Solid catalyst composition synthesized by the above procedure has been tabulated in Table 1.

TABLE 1

| Cat no | ID-A | ID-B | Ti (wt %) | ID-A (wt %) |
|---|---|---|---|---|
| ZN#38 | — | DIBP | 4.4 | 13.6 |
| ZN#39 | ID1 | — | 3.2 | 12.9 |
| ZN#54 | — | DIBP | 6.4 | 13.4 |
| ZN#55 | — | — | 6.4 | — |
| ZN#56 | ID1 | — | 3.5 | 7.6 |
| ZN#71 | ID3 | — | 3.5 | 6.4 |
| ZN#72 | ID3 | — | 4.1 | 5.7 |
| ZN#73 | ID3 | — | 3.8 | 9.0 |
| ZN#77 | ID5 | — | 3.8 | 9.3 |
| ZN#93 | ID9 | — | 2.8 | 2.2 |
| ZN#95 | ID9 | — | 2.9 | 8.3 |
| ZN#96 | ID8 | — | 2.6 | 9.6 |
| ZN#124 | ID2 | — | 3.3 | 21.1 |
| ZN#125 | ID6 | — | 4.1 | 15.0 |
| ZN#126 | ID4 | — | 5.1 | 6.9 |
| ZN#127 | ID1 | DIBP | 3.8 | 12.8 |
| ZN# 258 | Diethyl n-butylmalonate (DEBM) | — | 2.5 | 9.1 |

Example 12: Polymerization of Ethylene

Polymerization of ethylene was carried out in 500 ml Buchi reactor which was previously conditioned under nitrogen. The reactor was charged with 250 ml of dry hexane containing solution of 10 wt % triethylaluminum and calculated amount of solid catalyst. The reactor was pressurized with hydrogen to 14.2 psi then charged with 71 psi of ethylene under stirring at 750 rpm. The reactor was heated to and then held at 70° C. for 2 hour. At the end, the reactor was vented and the polymer was recovered at ambient conditions.

Catalyst performance and polymer properties are tabulated in Table 2.

TABLE 2

| Cat no | Cat wt (mg) | Al/Ti | H2 | Activity (kg/g-h) | MFI (g/10 min) | Hex Sol (%) | $T_M$ (° C.) |
|---|---|---|---|---|---|---|---|
| ZN#38 | 28.9 | 250 | 1 | 2.1 | — | 1.3 | 130.5 |
| ZN#39 | 30.6 | 250 | 1 | 0.4 | — | 0.2 | 131.1 |
|  | 30.4 | 15 | 1 | 0.1 | — | 0.1 | 131.0 |
|  | 32.0 | 25 | 1 | 0.1 | — | 0.1 | 131.0 |
|  | 31.1 | 100 | 1 | 1.5 | — | 0.5 | 130.4 |
|  | 31.6 | 150 | 1 | 3.5 | 0.01 | 0.5 | 130.6 |
|  | 22.1 | 150 | 1 | 4.2 | 0.01 | 0.4 | 130.6 |
|  | 22.2 | 200 | 1 | 3.6 | 0.11 | 0.6 | 130.7 |
|  | 22.4 | 150 | 2 | 2.6 | 0.93 | 0.7 | 130.2 |
|  | 22.4 | 150 | 3 | 1.7 | 0.95 | 0.8 | 130.6 |
|  | 22.4 | 150 | 4 | 0.1 | 1.02 | 0.9 | 130.1 |
| ZN#73 | 23.4 | 150 | 1 | 1.9 | — | 0.8 | 130.2 |

Example 13: Polymerization of Propylene

Propylene polymerization was carried out in 1 L buchi reactor which was previously conditioned under nitrogen. The reactor was charged with 250 ml of dry hexane containing solution of 10 wt % triethylaluminum followed by 100 ml of dry hexane containing 10 wt % solution of triethylaluminum, 5 wt % solution of cyclohexylmethyldimethoxysilane (CHMDMS) and weighed amount of catalyst. The reactor was pressurized with hydrogen to 60 ml then charged with 71 psi of propylene under stirring at 750 rpm. The reactor was heated to and then held at 70° C. for 2 hour. At the end, the reactor was vented and the polymer was recovered at ambient conditions.

Catalyst performance and polymer properties are tabulated in Table 3.

Comparative Example 14: Properties of Polymer Thus Obtained

Performance of the catalysts prepared in accordance with the present invention i.e. incorporating the internal donor as per the teachings of the present invention are compared with a catalyst that incorporates DIBP as the internal donor (which is the conventional internal donor commercially used).

Catalyst performance and polymer properties are tabulated in Table 3.

TABLE 4

| Cat no | ID | MFI (g/10 min) | XS (%) | $T_M$ (° C.) |
|---|---|---|---|---|
| ZN#54 | DIBP | 59 | 2.5 | 160.3 |
| ZN#39 | ID1 | 43 | 21.1 | 161.5 |
| ZN#73 | ID3 | 31 | 6.5 | 160.6 |
| ZN#77 | ID5 | 12 | 5.5 | 160.3 |
| ZN#95 | ID9 | 40 | 8.3 | 161.1 |
| ZN#96 | ID8 | 48 | 7.7 | 160.2 |
| ZN#124 | ID2 | 2.0 | 5.1 | 161.4 |
| ZN#125 | ID6 | 2.4 | 4.3 | 160.8 |
| ZN#126 | ID4 | 2.2 | 7.7 | 160.2 |
| ZN#127 | ID1 | 1.1 | 3.4 | 159.9 |
| ZN#258 | DEBM | 3.6 | 7.2 | 169.4 |

It may be noted that the embodiments illustrated and discussed in this specification are intended only to teach to those skilled in the art the best way known to the Inventors to make and use the invention. In describing embodiments of the Invention, specific terminology is employed merely for the sake of clarity. However, the invention is not intended to be restricted to specific terminology so-used. The above-described embodiments of the invention may be modified or varied, without departing from the invention, as appreciated by those skilled in the art in light of the above teachings. It is therefore understood that, within the scope of the claims and their equivalents, the invention may be practiced otherwise than as specifically described.

TABLE 3

| Cat no | Cat wt (mg) | Al/Ti | ED | Al/Do | H2 ml | Activity (kg/g-h) | MFI (g/10 min) | XS (%) | $T_M$ (° C.) |
|---|---|---|---|---|---|---|---|---|---|
| ZN#54 | 31.8 | 250 | CHMDMS | 20 | 60 | 4.6 | 59 | 2.5 | 160.3 |
| ZN#39 | 57.5 | 500 | CHMDMS | 20 | 60 | 1.8 | 337 | 21.1 | 161.5 |
|  | 56.8 | 250 | CHMDMS | 20 | 60 | 2.5 | 53 | 7.9 | 160.4 |
|  | 32.8 | 250 | CHMDMS | 20 | 60 | 3.7 | 95 | 7.1 | 160.3 |
|  | 30.0 | 250 | CHMDMS | 20 | 60 | 4.0 | 94 | 6.9 | 159.6 |
|  | 31.8 | 250 | CHMDMS | 20 | 30 | 3.6 | 83 | 6.1 | 159.6 |
|  | 31.8 | 250 | CHMDMS | 20 | 10 | 4.1 | 43 | 6.9 | 160.6 |
|  | 32.3 | 250 | CHMDMS | 20 | 0 | 3.7 | 3 | 8.5 | 161.5 |
|  | 31.9 | 250 | CHMDMS | 20 | 30 | 3.3 | 81 | 6.2 | 160.7 |
|  | 30.0 | 250 | ID1 | 10 | 0 | 1.6 | 45 | 10.9 | 160.9 |
|  | 28.4 | 250 | CHMDMS | 0 | 10 | 4.4 | 40.1 | 37.4 | 159.8 |
|  | 22.2 | 250 | CHMDMS | 10 | 10 | 4.7 | 0.8 | 4.7 | 161.1 |
|  | 10.5 | 500 | PEEB | 2.5 | 10 | 0.7 | — | — | — |
| ZN#73 | 26.3 | 250 | CHMDMS | 20 | 20 | 5.1 | 31 | 6.5 | 160.6 |
|  | 30.6 | 250 | CHMDMS | 20 | 0 | 3.6 | 15 | 9.1 | 160.2 |
|  | 35.1 | 250 | CHMDMS | 10 | 0 | 2.6 | 19 | 5.1 | 160.5 |
| ZN#77 | 33.8 | 250 | CHMDMS | 20 | 0 | 2.1 | 12 | 5.5 | 160.3 |
|  | 23.6 | 250 | CHMDMS | 20 | 20 | 4.5 | 56 | 6.0 | 161.7 |
| ZN#95 | 23.8 | 250 | CHMDMS | 20 | 20 | 5.4 | 40 | 8.3 | 161.1 |
| ZN#96 | 24.1 | 250 | CHMDMS | 20 | 20 | 3.8 | 48 | 7.7 | 160.2 |
| ZN#124 | 22.4 | 250 | CHMDMS | 20 | 10 | 3.9 | 2.0 | 5.1 | 161.4 |
| ZN#125 | 21.7 | 250 | CHMDMS | 20 | 10 | 1.6 | 2.4 | 4.3 | 160.8 |
| ZN#126 | 22.3 | 250 | CHMDMS | 20 | 10 | 3.3 | 2.2 | 7.7 | 160.2 |
| ZN#127 | 22.2 | 250 | CHMDMS | 20 | 10 | 5.1 | 1.1 | 3.4 | 159.9 |
| ZN#258 | 22.1 | 250 | CHMDMS | 20 | 10 | 6.5 | 3.6 | 7.2 | 169.4 |

We claim:

1. A catalyst composition for use as precursor for Ziegler-Natta catalyst system, said catalyst composition comprising a combination of magnesium moiety, titanium moiety and an internal donor containing at least one 1,2-phenylenedioate compound of structure (A)

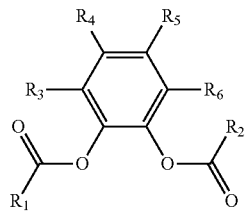

wherein $R_1$-$R_6$ groups are equal or different from each other and each of $R_1$-$R_6$ are selected from a group consisting of hydrogen, halogen, $C_1$-$C_{20}$ linear or branched alkyl group optionally linked with cyclic rings, $C_6$-$C_{14}$ aryl groups, $C_3$-$C_{15}$ cycloalkyl groups, $C_1$-$C_{20}$ alkoxy group, a heteroatom, arylalkyl or alkylaryl groups and combinations thereof, provided that $R_1$ and $R_2$ are not both a methyl group, aryl group, or alkoxy group; and if either $R_1$ or $R_2$ is phenyl or substituted phenyl, the other $R_1$ or $R_2$ is not a $C_1$-$C_{15}$ alkoxy group, provided $R_3$-$R_6$ groups are selected from hydrogen or $C_1$-$C_{10}$ hydrocarbon groups.

2. The catalyst composition as claimed in claim 1, wherein the magnesium moiety is selected from a group consisting of anhydrous magnesium, halogen containing anhydrous magnesium compound, an alkylmagnesium halide compound, an alkoxy magnesium halide compound, an aryloxy magnesium halide compound, dialkoxymagnesium compound, an aryloxy magnesium compound, dialkylmagnesium compound, alcohol complexes of magnesium dihalide, and mixtures thereof.

3. The catalyst composition as claimed in claim 1, wherein the titanium moiety is selected from a group consisting of titanium tetrahalide compound, alkoxytitanium trihalide compound, dialkoxy titanium dihalide compound, trialkoxytitanium monohalide compound, tetraalkoxytitanium compound, and mixtures thereof.

4. The catalyst composition as claimed in claim 1, wherein the structure (A) includes at least one of $R_3$-$R_6$ selected from a group consisting of hydrogen, halogen, $C_1$-$C_{20}$ linear or branched alkyl group optionally linked with cyclic ring, $C_6$-$C_{14}$ aryl groups, $C_3$-$C_{15}$ cycloalkyl groups, $C_1$-$C_{20}$ alkoxy group, a heteroatom, arylalkyl or alkylaryl groups and combinations thereof and at least one of $R_1$-$R_2$ selected from a group consisting of hydrogen, halogen, $C_1$-$C_{20}$ linear or branched alkyl group optionally linked with cyclic ring, $C_3$-$C_{15}$ cycloalkyl groups, a heteroatom, arylalkyl or alkylaryl, alkylalkoxy or alkoxyalkyl, arylalkoxy or alkoxyaryl, alkylcycloalkyl or cycloalkylalkyl groups and combinations thereof, provided that $R_1$ and $R_2$ are not both a methyl group, aryl group, or alkoxy group; and if either $R_1$ or $R_2$ is phenyl or substituted phenyl, the other $R_1$ or $R_2$ is not a $C_1$-$C_{15}$ alkoxy group, provided $R_3$-$R_6$ groups are selected from hydrogen or $C_1$-$C_{10}$ hydrocarbon groups.

5. The catalyst composition as claimed in claim 1, wherein in the structure (A), $R_1$-$R_6$ groups are equal or different and are selected from a group consisting of hydrogen, $C_1$-$C_{20}$ linear or branched alkyl group optionally linked with cyclic rings, $C_6$-$C_{14}$ aryl groups, $C_3$-$C_{15}$ cycloalkyl groups, $C_1$-$C_{10}$ alkoxy group, a heteroatom, arylalkyl or alkylaryl groups and combinations thereof, provided that $R_1$ and $R_2$ are not both a methyl group, aryl group, or alkoxy group; and if either $R_1$ or $R_2$ is phenyl or substituted phenyl, the other $R_1$ or $R_2$ is not a $C_1$-$C_{15}$ alkoxy group, provided $R_3$-$R_6$ groups are selected from hydrogen or $C_1$-$C_{10}$ hydrocarbon groups.

6. The catalyst composition as claimed in claim 5, wherein in the structure (A), $R_3$ to $R_6$ are hydrogen and $R_1$ and $R_2$ are same and are selected from a group consisting of $C_1$-$C_{20}$ linear or branched alkyl group optionally linked with cyclic ring, $C_3$-$C_{15}$ cycloalkyl groups, and a heteroatom, provided that $R_1$ and $R_2$ are not both a methyl group, aryl group, or alkoxy group; and if either $R_1$ or $R_2$ is phenyl or substituted phenyl, the other $R_1$ or $R_2$ is not a $C_1$-$C_{15}$ alkoxy group, provided $R_3$-$R_6$ groups are selected from hydrogen or $C_1$-$C_{10}$ hydrocarbon groups.

7. The catalyst composition as claimed in claim 1, wherein in the structure (A), at least one of $R_3$-$R_6$ is selected as hydrogen, and $R_1$-$R_2$ are different and at least one of $R_1$-$R_2$ is selected from a group consisting of $C_1$-$C_{20}$ linear or branched alkyl group which optionally linked with cyclic ring, $C_3$-$C_{15}$ cycloalkyl groups, a heteroatom, arylalkyl or alkylaryl, alkylalkoxy or alkoxyalkyl, arylalkoxy or alkoxyaryl, alkylcycloalkyl or cycloalkylalkyl groups and combinations thereof.

8. The catalyst composition as claimed in claim 1, wherein in the structure (A), at least one of $R_3$-$R_6$ is selected from a group consisting of hydrogen, halogen, $C_1$-$C_{20}$ linear or branched alkyl group optionally linked with cyclic ring, $C_6$-$C_{14}$ aryl groups, $C_3$-$C_{15}$ cycloalkyl groups, $C_1$-$C_{20}$ alkoxy group, a heteroatom, arylalkyl or alkylaryl groups and combinations thereof and at least one of $R_1$-$R_2$ is selected from a group consisting of $C_1$-$C_{20}$ linear or branched alkyl group optionally linked with cyclic ring, $C_3$-$C_{15}$ cycloalkyl groups, a heteroatom, arylalkyl or alkylaryl, alkylalkoxy or alkoxyalkyl, arylalkoxy or alkoxyaryl, alkylcycloalkyl or cycloalkylalkyl groups and combinations thereof, wherein $R_1$-$R_2$ is same, provided that $R_1$ and $R_2$ are not both a methyl group, aryl group, or alkoxy group; and if either $R_1$ or $R_2$ is phenyl or substituted phenyl, the other $R_1$ or $R_2$ is not a $C_1$-$C_{15}$ alkoxy group, provided $R_3$-$R_6$ groups are selected from hydrogen or $C_1$-$C_{10}$ hydrocarbon groups.

9. The catalyst composition as claimed in claim 1, optionally comprising a second internal electron donor component different from the internal donor containing at least one 1,2-phenylenedioate compound.

10. The catalyst composition as claimed in claim 9, wherein the second internal electron donor component includes phthalates, benzoates, diethers, succinates, malonates, carbonates, silyl esters, amide esters and combinations thereof.

11. The catalyst composition as claimed in claim 9, wherein the second internal electron donor component is selected from a group consisting of di-n-butyl phthalate, di-i-butyl phthalate, di-2-ethylhexyl phthalate, methyl benzoate, ethyl benzoate, propyl benzoate, phenyl benzoate, cyclohexyl benzoate, methyl toluate, ethyl toluate, p-ethoxy ethyl benzoate, p-isopropoxy ethyl benzoate, diethyl succinate, di-propyl succinate, diisopropyl succinate, dibutyl succinate, diisobutyl succinate, diethyl malonate, diethyl ethylmalonate, diethyl propyl malonate, diethyl isopropylmalonate, diethyl butylmalonate, diethyl 1,2-cyclohexanedicarboxylate, di-2-ethylhexyl 1,2-cyclohexanedicarboxylate, di-2-isononyl 1,2-cyclohexanedicarboxylate, methyl anisate, ethyl anisate and diether compounds and the diether compounds is selected from the group consisting of 9,9-bis(methoxymethyl)fluorene, 2-isopropyl-2-isopentyl-1, 3-dimethoxypropane, 2,2-diisobutyl-1,3-dimethoxypropane, 2,2-diisopentyl-1,3-dimethoxypropane and 2-isopropyl-2-cyclohexyl-1,3-dimethoxypropane.

12. A Ziegler-Natta catalyst system, said catalyst system comprising a combination of at least one organoaluminum compound, at least one external electron donor and a catalyst composition comprising a combination of magnesium moiety, titanium moiety and an internal donor containing at least one 1,2-phenylenedioate compound of structure (A)

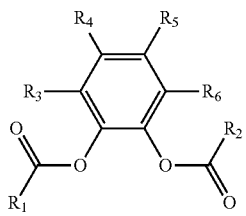

wherein $R_1$-$R_6$ groups are equal or different from each other and each of $R_1$-$R_6$ are selected from a group consisting of hydrogen, halogen, $C_1$-$C_{20}$ linear or branched alkyl group optionally linked with cyclic rings, $C_6$-$C_{14}$ aryl groups, $C_3$-$C_{15}$ cycloalkyl groups, $C_1$-$C_{20}$ alkoxy group, a heteroatom, arylalkyl or alkylaryl groups and combinations thereof, provided that $R_1$ and $R_2$ together are not comprised of methyl group, aryl group or alkoxy group.

13. The Ziegler-Natta catalyst system as claimed in claim 12, wherein a ratio between titanium (from the catalyst composition): aluminum (from organoaluminum compound): external donor is in the range of 1:5-1000:0-250.

14. The catalyst composition as claimed in claim 1, comprising from 5.0 to 20 wt % of the internal donor having at least one 1,2-phenylenedioate compound, 1.0 to 6.0 wt % of titanium moiety and 15 to 20 wt % of magnesium moiety.

15. The Ziegler-Natta catalyst system as claimed in claim 12, wherein the external electron donor and the internal donor are same or different.

16. A process for preparing a catalyst composition comprising a combination of magnesium moiety, titanium moiety and an internal donor containing at least one 1,2-phenylenedioate compound of structure (A)

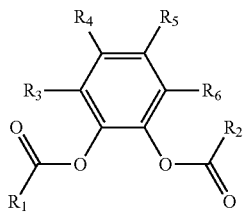

wherein $R_1$-$R_6$ groups are equal or different from each other and each of $R_1$-$R_6$ are selected from a group consisting of hydrogen, halogen, $C_1$-$C_{20}$ linear or branched alkyl group optionally linked with cyclic rings, $C_6$-$C_{14}$ aryl groups, $C_3$-$C_{15}$ cycloalkyl groups, $C_1$-$C_{20}$ alkoxy group, a heteroatom, arylalkyl or alkylaryl groups and combinations thereof, provided that $R_1$ and $R_2$ are not both a methyl group, aryl group or alkoxy group; and if either $R_1$ or $R_2$ is phenyl or substituted phenyl, the other $R_1$ or $R_2$ is not a $C_1$-$C_{15}$ alkoxy group, provided $R_3$-$R_6$ groups are selected from hydrogen or $C_1$-$C_{10}$ hydrocarbon groups, said process comprising the step of:
contacting a magnesium moiety with a titanium moiety along with a source of the internal donor comprising at least one 1,2-phenylenedioate compound.

17. The process as claimed in claim 16, wherein the step of contacting comprises forming a magnesium based catalyst support optionally with the titanium compound and optionally with the internal electron donor compound having at least one 1,2-phenylenedioate compound of structure (A), and contacting the magnesium based catalyst support with the titanium compound and the internal electron donor compound.

18. The process as claimed in claim 16, wherein an amount of magnesium moiety, an amount of the titanium moiety and an amount of the source of internal donor is such that the catalyst composition thus obtained includes from about 5.0 to 20 wt % of the internal donor having at least one 1,2-phenylenedioate compound of structure (A), about 1.0 to 6.0 wt % of titanium moiety and about 15 to 20 wt % of magnesium moiety.

19. The process as claimed in claim 16, wherein the step of contacting comprises reacting a magnesium moiety represented by $Mg(OR)_n$, where R being a carbon moiety having 2 to 12 carbon atoms and n=2 with a titanium moiety represented by $TiX_4$ where X be a halogen in presence of a solvent selected from a group consisting of chlorinated aromatic compound, non chlorinated aromatic compound, chlorinated aliphatic compound and non chlorinated aliphatic compound at temperature in a range of 80 and 120° C. and further reacting the same with an internal donor having at least one 1,2-phenylenedioate compound of structure (A) at temperature in a range of 50 and 95° C. to obtain a product and treating the thus obtained product at least once with excess $TiCl_4$ solvent followed by washing with hydrocarbon solvent.

20. The process as claimed in claim 19, wherein the hydrocarbon solvent is an aliphatic hydrocarbon selected from a group consisting of isopentane, isooctane, hexane, pentane and isohexane.

21. The process as claimed in claim 19, wherein R is a carbon moiety having 2 carbon atoms and is an ethyl group.

22. The process as claimed in claim 19, wherein the titanium moiety is $TiCl_4$.

23. The process as claimed in claim 19, wherein the solvent is selected from a group consisting of benzene, chlorobenzene, dichlorobenzene, toluene, o-chlorotoluene, xylene, dichloromethane, chloroform, and mixture thereof.

24. The process as claimed in claim 16, wherein the step of contacting comprising:
a. reacting a titanium moiety represented by $TiX_4$, where X is a halogen, with a magnesium chloride alcohol adduct represented by $MgCl_2.nROH$ where n=3 and R is an alkyl moiety having 2 to 18 carbon atoms to obtain a reaction mixture;
b. heating the reaction mixture to a temperature in a rage of 90-130° C. and maininting the same for at least 0.5 hour followed by adding the internal donor having at least one 1,2-phenylenedioate compound of structure (A) to obtain a product; and
c. treating the product thus obtained product at least once with excess $TiCl_4$ solvent followed by washing with hydrocarbon solvent.

* * * * *